US012793209B1

(12) United States Patent
Najdawi et al.

(10) Patent No.: US 12,793,209 B1
(45) Date of Patent: Nov. 10, 2026

(54) SYSTEMS AND METHODS FOR PREDICTING DISEASE SEVERITY IN ULCERATIVE COLITIS

(71) Applicant: PathAI, Inc., Boston, MA (US)

(72) Inventors: Fedaa Najdawi, Brookline, MA (US); Kathleen Sucipto, Brookline, MA (US); Archit Khosla, New York, NY (US); Michael Drage, Wellesley, MA (US); Amaro N. Taylor-Weiner, Brooklyn, NY (US); Michael C. Montalto, Brielle, NJ (US); Murray Resnick, Sharon, MA (US); Maryam Pouryahya, Bethesda, MD (US); Stephanie Hennek, Medford, MA (US); Ilan N. Wapinski, Brookline, MA (US); Andrew H. Beck, Brookline, MA (US); Christina Jayson, Somerville, MA (US); Chintan Shah, Woburn, MA (US); Waleed Tahir, Dorchester, MA (US); John Shamshoian, Somerville, MA (US); Michael Griffin, Georgetown, TX (US); Zahil Shanis, Claymont, DE (US); Carlos Gaitán, Kirkland, WA (US); Jin Li, New York, NY (US); George Hu, Boston, MA (US); Andrew Walker, Hopkins, MN (US); Harshith Padigela, Medford, MA (US); Harsha Vardhan Pokkalla, Sudbury, MA (US); Yibo Zhang, Lynnfield, MA (US); Emma Krause, Newburyport, MA (US); Jimish Mehta, Ardmore, PA (US)

(73) Assignee: PathAI, Inc., Boston, MA (US)

( * ) Notice: Subject to any disclaimer, the term of this patent is extended or adjusted under 35 U.S.C. 154(b) by 251 days.

(21) Appl. No.: 17/955,301

(22) Filed: Sep. 28, 2022

Related U.S. Application Data

(63) Continuation-in-part of application No. 17/375,694, filed on Jul. 14, 2021.

(Continued)

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20081* (2013.01); *G06T 2207/30024* (2013.01); *G06T 2207/30028* (2013.01)

(58) Field of Classification Search
CPC ......... G06T 7/0012; G06T 2207/20081; G06T 2207/20084; G06T 2207/10024;

(Continued)

(56) References Cited

U.S. PATENT DOCUMENTS

| | | | | |
|---|---|---|---|---|
| 8,712,142 B2 * | 4/2014 | Rajpoot | G06T 7/0012 435/6.14 |
| 9,873,742 B2 * | 1/2018 | Keir | C07K 16/2839 |

(Continued)

FOREIGN PATENT DOCUMENTS

| | | |
|---|---|---|
| CN | 108471949 A | 8/2018 |
| WO | WO 2017/074505 A1 | 5/2017 |

(Continued)

OTHER PUBLICATIONS

M. T. McCann, R. Bhagavatula, M. C. Fickus, J. A. Ozolek and J. Kovačević, "Automated colitis detection from endoscopic biopsies as a tissue screening tool in diagnostic pathology," 2012 19th IEEE International Conference on Image Processing, Orlando, FL, USA, 2012, pp. 2809-2812, doi: 10.1109/ICIP.2012.6467483. (Year: 2012).*

(Continued)

*Primary Examiner* — Courtney Joan Nelson
(74) *Attorney, Agent, or Firm* — Wolf, Greenfield & Sacks, P.C.

(57) ABSTRACT

In some aspects, a method, a system, or a non-transitory computer-readable storage medium are described for training one or more models to predict ulcerative colitis (UC) severity based on human-interpretable image features extracted from a whole-slide image, including acts of accessing a plurality of annotated whole-slide images asso- (Continued)

ciated with a plurality of UC patients, wherein each of the plurality of annotated whole-slide images includes at least one annotation describing a cell-type label or a tissue-type segmentation for a portion of the whole-slide image, extracting a plurality of human-interpretable image features based on cell-type labels and tissue-type segmentations associated with the plurality of annotated whole-slide images, training a statistical model based on the plurality of human-interpretable image features to predict the UC severity for a whole-slide image, and storing the trained model on at least one storage device.

26 Claims, 35 Drawing Sheets

Related U.S. Application Data

(60) Provisional application No. 63/252,506, filed on Oct. 5, 2021, provisional application No. 63/052,316, filed on Jul. 15, 2020.

(58) Field of Classification Search
CPC . G06T 2207/30024; G06T 2207/10056; G06T 2207/30028; G06T 7/10; G06T 9/002; G06T 3/4046; G06T 2207/30004; G06T 2210/41; G06T 11/00; G06T 2207/30092; G06T 7/33; G06T 7/00; G06T 2207/30032; G06T 7/11; G16H 50/20; G16H 30/40; G16H 50/30; G16H 30/20; G16H 10/40; G16H 30/00; G06N 3/045; G06N 3/08; G06N 20/00; G06N 3/04; G06N 3/0464; G06N 3/044; G06N 3/088; G06N 3/02; G06V 10/82; G06V 10/764; G06V 2201/03; G06V 10/40; G06V 10/806; G06V 10/25; A61B 5/7267; A61B 5/7264; A61B 6/5217; A61B 5/4842; A61B 10/02; A61B 5/4255; A61B 5/1128; G06F 18/214; G06F 18/241; G06F 18/24
See application file for complete search history.

(56) References Cited

U.S. PATENT DOCUMENTS

| | | | | |
|---|---|---|---|---|
| 11,170,199 | B1 | 11/2021 | Ramella-Roman | |
| 12,048,414 | B2 * | 7/2024 | Sasada | G06T 11/00 |
| 12,475,193 | B1 | 11/2025 | Shoshan et al. | |
| 2006/0233797 | A1 | 10/2006 | Gujrathi | |
| 2009/0137908 | A1 | 5/2009 | Patwardhan | |
| 2009/0323059 | A1 | 12/2009 | Sun | |
| 2013/0030305 | A1 | 1/2013 | Yu | |
| 2013/0094733 | A1 | 4/2013 | Nosato et al. | |
| 2013/0203053 | A1 * | 8/2013 | Princen | C12Q 1/6883 435/6.11 |
| 2015/0294459 | A1 * | 10/2015 | Rutenberg | G06F 18/2415 382/133 |
| 2017/0076448 | A1 | 3/2017 | Chen et al. | |
| 2019/0108912 | A1 * | 4/2019 | Spurlock, III | A61P 25/28 |
| 2020/0208114 | A1 | 7/2020 | Baryawno et al. | |
| 2020/0276144 | A1 | 9/2020 | Damore | |
| 2020/0372640 | A1 | 11/2020 | Petitjean | |
| 2021/0056688 | A1 | 2/2021 | Xu et al. | |
| 2022/0036971 | A1 | 2/2022 | Yoo et al. | |
| 2022/0058776 | A1 | 2/2022 | Ozcan et al. | |
| 2022/0058803 | A1 | 2/2022 | Bhattacharya et al. | |
| 2022/0108123 | A1 | 4/2022 | Bhargava et al. | |
| 2022/0125280 | A1 | 4/2022 | Tyan et al. | |
| 2022/0343537 | A1 | 10/2022 | Taamazyan et al. | |
| 2022/0414928 | A1 | 12/2022 | Venkataraman et al. | |
| 2023/0030424 | A1 | 2/2023 | Ozcan et al. | |
| 2024/0153288 | A1 | 5/2024 | Lee et al. | |
| 2024/0153616 | A1 | 5/2024 | Lee et al. | |
| 2025/0246010 | A1 | 7/2025 | Jesudason | |

FOREIGN PATENT DOCUMENTS

| | | | | |
|---|---|---|---|---|
| WO | WO-2019025533 | A1 * | 2/2019 | G06F 16/535 |
| WO | WO 2021/257710 | A1 | 12/2021 | |
| WO | WO 2022/093510 | A1 | 5/2022 | |
| WO | WO 2022/159887 | A1 | 7/2022 | |
| WO | WO 2023/203380 | A1 | 10/2023 | |

OTHER PUBLICATIONS

Chaddad A, Niazi T, Probst S, Bladou F, Anidjar M, Bahoric B. Predicting Gleason Score of Prostate Cancer Patients Using Radiomic Analysis. Front Oncol. Dec. 18, 2018;8:630. doi: 10.3389/fonc.2018.00630. PMID: 30619764; PMCID: PMC6305278 (Year: 2018).*

Marchal-Bressenot A, Salleron J, Boulagnon-Rombi C, et alDevelopment and validation of the Nancy histological index for UCGut 2017;66:43-49. (Year: 2017).*

Campanella et al., Clinical-grade computational pathology using weakly supervised deep learning on whole slide images. Nature Medicine. Aug. 2019; 25:1301-1309.

Coudray et al. Classification and mutation prediction from non-small cell lung cancer histopathology images using deep learning. Nature Medicine. Oct. 2018; 24:1559-1567.

Ehteshami Bejnordi et al., Diagnostic Assessment of Deep Learning Algorithms for Detection of Lymph Node Metastases in Women With Breast Cancer. JAMA. 2017;318 (22):2199-2210.

He et al., Histology image analysis for carcinoma detection and grading. Computer Methods and Programs in Biomedicine. 2012; 107:538-556.

Kalra et al., Pan-cancer diagnostic consensus through searching archival histopathology images using artificial intelligence. NPJ Digital Medicine. 2020; 3:31.

Khosravi et al., Deep Convolutional Neural Networks Enable Discrimination of Heterogeneous Digital Pathology Images. EbioMedicine. 2018; 27:317-328.

Korbar et al., Deep Learning for Classification of Colorectal Polyps on Whole-slide Images. Journal of Pathology Informatics. Jul. 25, 2017; 8:30.

Madabhushi et al., Image analysis and machine learning in digital pathology: Challenges and opportunities. Medical Image Analysis. 2016; 33:170-175.

Nagpal et al., Development and validation of a deep learning algorithm for improving Gleason scoring of prostate cancer. NPJ Digital Medicine. 2019: 2:48.

Rostam et al., Image based Machine Learning for identification of macrophage subsets. Scientific Reports. Jun. 14, 2017; 7:3521.

Sadimin et al., Pathology Imaging Informatics for Clinical Practice and Investigative and Translational Research. N. Am. J. Med. Sci. Apr. 2012; 5(2):103-109.

Saltz et al., Spatial Organization and Molecular Correlation of Tumor-Infiltrating Lymphocytes Using Deep Learning on Pathology Images. Cell Reports. Apr. 3, 2018; 23:181-200.

Sha et al., Multi-Field-of-View Deep Learning Model Predicts Nonsmall Cell Lung Cancer Programmed Death-Ligand 1 Status from Whole-Slide Hematoxylin and Eosin Images. Journal of Pathology Informatics. Jul. 23, 2019; 10:24.

Thorstenson et al., Implementation of large-scale routine diagnostics using whole slide imaging in Sweden: Digital pathology experiences 2006-2013. Journal of Patholgy Informatics. Mar. 28, 2014; 5:14.

Wang et al., Comprehensive analysis of lung cancer pathology images to discover tumor shape and boundary features that predict survival outcome. Scientific Reports. Jul. 10, 2018; 8:10393.

Wang et al., Deep Learning for Identifying Metastatic Breast Cancer. arXiv [q-bio.QM] (2016).

Yu et al., Predicting non-small cell lung cancer prognosis by fully automated microscopic pathology image features. Nature Communications. Aug. 16, 2016; 7:12474.

(56) References Cited

OTHER PUBLICATIONS

Bass et al., Investigation of potential early Histologic markers of pediatric inflammatory bowel disease. BMC Gastroenterology. 2015. 15(129). 7 Pages.
Geboes et al., A reproducible grading scale for histological assessment of inflammation in ulcerative colitis. Gut. Sep. 1, 2000;47:404-09.
Althammer et al., Automated image analysis of NSCLC biopsies to predict response to anti-PD-L1 therapy. Research Article. Journal for Immuno Therapy of Cancer. 2019;7:121. 12 Pages.
Janowczyk et al., Deep learning for digital pathology image analysis: A comprehensive tutorial with selected use cases. Journal of Pathology Informatics. Jul. 26, 2016;1:29. 18 Pages.
Wang et al., Computational Staining of Pathology Images to Study the Tumor Microenvironment in Lung Cancer. Cancer Research. 2020;80(10):2056-66.
Zarella et al., A Practical Guide to Whole Slide Imaging: A White Paper From the Digital Pathology Association. Archives of Pathology & Laboratory Medicine. College of American Pathologists. Oct. 11, 2018;143(2):222-34.
[No Author Listed], What is OpenPolScope? 2019. https://openpolscope.org/ [Last accessed Dec. 6, 2023].
Almangush et al., Stromal categorization in early oral tongue cancer. Virchows Archiv.2021;478:925-32.
Carrasco-Zevallos et al., AI-based histologic measurement of NASH (AIM-NASH): A drug development tool for assessing clinical tiral endpoints. Oral Presentation at the International Liver Congree. Jun. 23-26, 2021.
Chandler et al, The double edge sword of fibrosis in cancer. Transl Res. Jul. 2019;209:55-67. doi: 10.1016/j.trsl.2019.02.006. Epub Feb. 21, 2019.
Conway et al., Generation of an atlas characterizing the tumor immune microenvironment via AI-based histologic mapping of multiple cancer types at scale. Poster presented at Pathology Visions. Oct. 15-18, 2022. 1 Page.
Diao et al., Human-interpretable image features derived from densely mapped cancer pathology slides predict diverse molecular phenotypes. Nature Communications. 2021. 17 Pages.
Ding et al., Image analysis reveals molecularly distinct patterns of TILs in NSCLC associated with treatment outcome. Precision Oncology.2022;6:33.15 Pages.
Duanmu et al., Spatial Attention-Based Deep Learning System for Breast Cancer Pathological Complete Response Prediciton with Serial Histopathology Images in Multiple Stains. HHS Public Access. NCBI. Oct. 6, 2022. 14 Pages.
Esbona et al. The Presence of Cyclooxygenase 2, Tumor-Associated Macrophages, and Collagen Alignment as Prognostic Markers for Invasive Breast Carcinoma Patients. Am J Pathol. Mar. 2018;188(3):559-573. doi: 10.1016/j.ajpath.2017.10.025.
Fanous et al., Quantitative phase imaging of stromal prognostic markers in pancreatic ductal adenocarcinoma. Biomed Opt Express. Feb. 12, 2020;11(3):1354-1364. doi: 10.1364/BOE.383242.
Fereidouni et al., Dual-mode emission and transmission microscopy for virtual histochemistry using hematoxylin- and eosin-stained tissue sections. Biomedical Optics Express. Dec. 1, 2019;10(12):6516-30.
Grunwald et al., Spatially confined sub-tumor microenvironments in pancreatic cancer. Cell. Oct. 28, 2021;184(22):5577-5592.e18. doi: 10.1016/j.cell.2021.09.022. Epub Oct. 12, 2021. PMID: 34644529.
Hanley et al., A subset of myofibroblastic cancer-associated fibroblasts regulate collagen fiber elongation, which is prognostic in multiple cancers. Oncotarget. Feb. 2, 2016;7(5):6159-74. doi: 10.18632/oncotarget.6740.
Janjigian et al., Pack Years of Cigarette Smoking as a Prognostic Factor in Patients with Stage IIIB/IV Non-Small Cell Lung Cancer. Cancer.Feb. 1, 2010;116(3):670-75.
Kandel et al., Label-free tissue scanner for colorectal cancer screening. Journal of Biomedical Optics. Jun. 2017;22(6). 15 Pages.
Lampert et al., Strategies for Training Stain Invariant CNNS. Nov. 3, 2018. arXiv:1810.10338v2 5 pages.
Marini et al., H&E-adversarial network: a convolutional neural network to learn stain-invariant features through Hemxatoxylin & Eosin regression. arxiv.org. Jan. 19, 2022. 10 Pages.
Michener et al., AI-Powered analysis of nuclear morphology associated with prognosis in high-grade serous carcinoma. Poster presented at ESMO Congress 2022. Sep. 9-13, 2022. (Abstract 5252).
Nearchou et al., Automated Detection and Classification of Desmoplastic Reaction at the Colorectal Tumour Front Using Deep Learning. Cancers.Mar. 26, 2021:13(1615). 15 pages.
Nost et al., Time trends of persistent organic pollutants in 30 year old sampled in 1986, 1994,2001 and 2007 in Northern Norway: Measurements, mechanistic modeling and a comparison of study designs. Environmental Research.May 2019;172:684-92.
Ouellette et al., Navigating the Collagen Jungle: The Biomedical Potential of Fiber Organization in Cancer. Bioengineering.Jan. 21, 2021;8(17). 19 Pages.
Patil et al., Intratumoral plasma cells predict outcomes to PD-L1 blockade in non-small cell lung cancer. Cancer Cell. Mar. 14, 2022;40:1-12.
Rajan et al., Deep-Learning Based Prediction of c-Met Status From Digitized H&E-Stained Non-Small Cell Lung Cancer Tissue Samples. Poster Presented at the IASLC World Conference on Lung Cancer. Aug. 6-9, 2022. (Abstract P2.07-01).
Salmon et al., Matrix architecture defines the preferential localization and migration of T cells into the stroma of human lung tumors. J Clin Invest. Mar. 2012;122(3):899-910. doi: 10.1172/JCI45817. Epub Feb. 1, 2012.
Simon et al., Cancer-Associated Fibroblast Subpopulations With Diverse and Dynamic Roles in the Tumor Microenvironment. Mol Cancer Res. Feb. 2022;20(2):183-192. doi: 10.1158/1541-7786.MCR-21-0282. Epub Oct. 20, 2021.
Sun et al., Tumour DDR1 promotes collagen fibre alignment to instigate immune exclusion. Nature.2021;599:673-78.
Takahasi et al., Fibrous Stroma Is Associated with Poorer Prognosis in Lung Squamous Cell Carcinoma Patients. Journal of Thoracic Oncology. Sep. 9, 2011;6(9):1460-67.
Ueno et al., Histopathological atlas of desmoplastic reaction characterization in colorectal cancer. Jpn J Clin Oncol. May 28, 2021;51(6):1004-1012. doi: 10.1093/jjco/hyab040.
Wang et al., Smoking History as a Potential Predictor of Immune Checkpoint Inhibitor Efficacy in Metastatic Non-Small Cell Lung Cancer. J Natl Cancer Inst. Nov. 29, 2021;113(12):1761-69.
Wharton et al., Tissue Multiplex Analyte Detection in Anatomic Pathology—Pathways to Clinical Implementation. Front. Mol. Biosci. Jul. 27, 2021. 8:672531. 17 pages.
Yanai et al., Presence of myxoid stromal change and fibrotic focus in pathological examination are prognostic factors of triple-negative breast cancer: Results from a retrospective single center study. 2021. PLoS One 16(2):e0245725.
Zhang et al., Quantitative multimodal anisotropy imagine enables automated fibrosis assessment of H&E-stained tissue, Poster Presented at the International Liver Congress.Jun. 22-26, 2022.

* cited by examiner

| TCGA Datasets | BRCA | LUAD | LUSC | SKCM | STAD | Total |
|---|---|---|---|---|---|---|
| Number of WSIs | 1119 | 501 | 446 | 358 | 407 | 2831 |
| Number of Distinct Patients | 1044 | 444 | 412 | 327 | 407 | 2634 |
| Number of Cell-Level Annotations | 57840 | 21958 | 68548 | 105096 | 69598 | 323040 |
| Number of Tissue-Level Annotations | 7637 | 5555 | 13826 | 19611 | 8917 | 55546 |
| **Proprietary Datasets** | | | | | | |
| Number of WSIs | 698 | 1908 | 438 | 1002 | 112 | 4158 |
| Number of Cell-Level Annotations | 130474 | 257966 | 45061 | 658204 | 27999 | 1119704 |
| Number of Tissue-Level Annotations | 23094 | 39195 | 14345 | 61254 | 8130 | 146018 |

FIG. 1B

Cell-Level
Cluster HIFs (iii) Mean Cluster Size of Fibroblasts in CAS (iv) Mean Cluster Extent of Macrophages Within 80 μm of CSI Cell-Level Proportion and Proximity HIFs (i)

Leukocyte Infiltration

BRCA 3.36

LUAD 3.19

LUSC 0.62

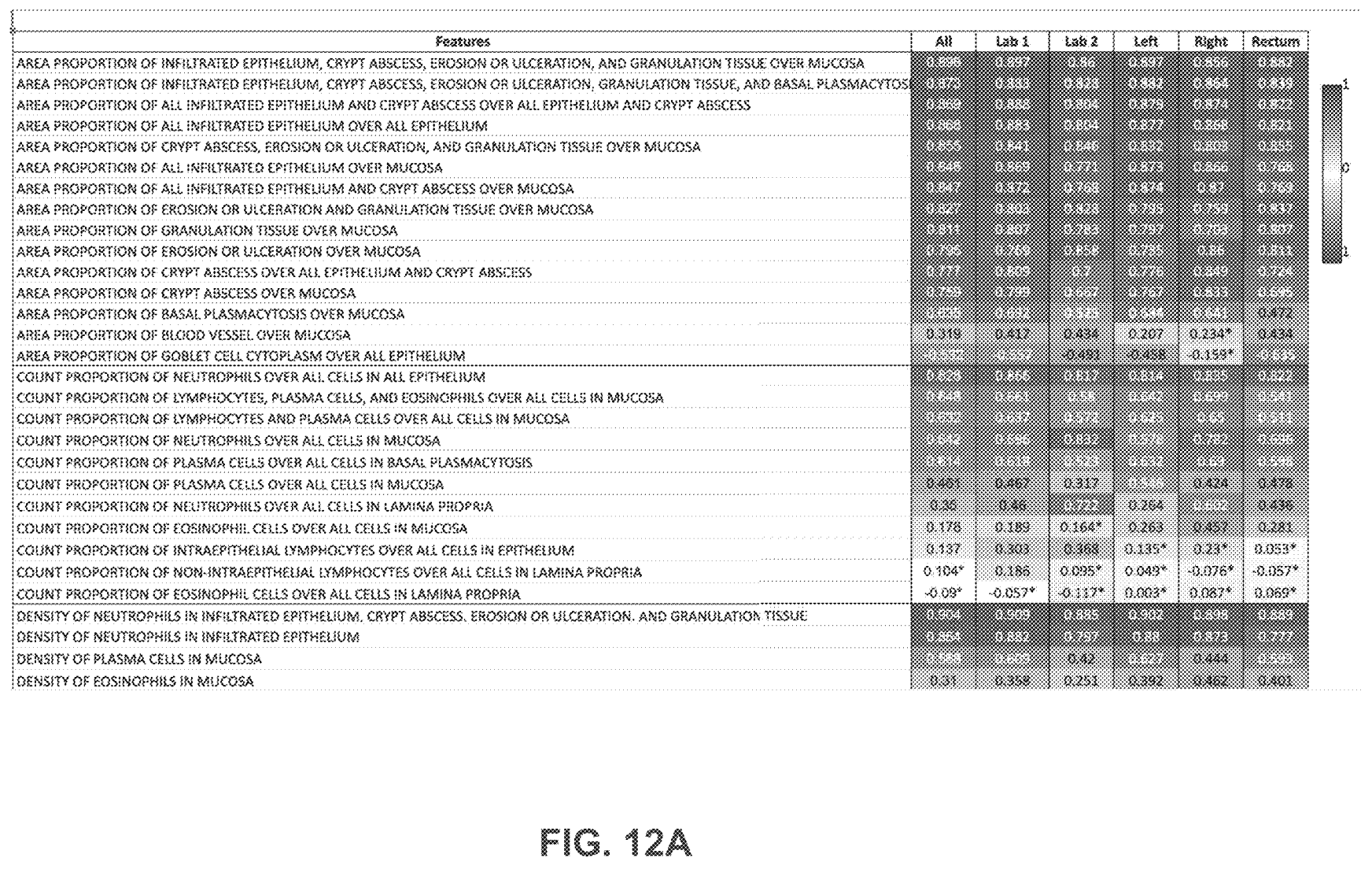

| Features | All | Lab 1 | Lab 2 | Left | Right | Rectum |
|---|---|---|---|---|---|---|
| AREA PROPORTION OF INFILTRATED EPITHELIUM, CRYPT ABSCESS, EROSION OR ULCERATION, AND GRANULATION TISSUE OVER MUCOSA | 0.898 | 0.897 | 0.86 | 0.897 | 0.886 | 0.882 |
| AREA PROPORTION OF INFILTRATED EPITHELIUM, CRYPT ABSCESS, EROSION OR ULCERATION, GRANULATION TISSUE, AND BASAL PLASMACYTOS | 0.872 | 0.883 | 0.838 | 0.842 | 0.864 | 0.839 |
| AREA PROPORTION OF ALL INFILTRATED EPITHELIUM AND CRYPT ABSCESS OVER ALL EPITHELIUM AND CRYPT ABSCESS | 0.869 | 0.886 | 0.904 | 0.876 | 0.874 | 0.822 |
| AREA PROPORTION OF ALL INFILTRATED EPITHELIUM OVER ALL EPITHELIUM | 0.866 | 0.863 | 0.804 | 0.877 | 0.868 | 0.821 |
| AREA PROPORTION OF CRYPT ABSCESS, EROSION OR ULCERATION, AND GRANULATION TISSUE OVER MUCOSA | 0.855 | 0.841 | 0.846 | 0.832 | 0.868 | 0.835 |
| AREA PROPORTION OF ALL INFILTRATED EPITHELIUM OVER MUCOSA | 0.846 | 0.869 | 0.771 | 0.873 | 0.866 | 0.765 |
| AREA PROPORTION OF ALL INFILTRATED EPITHELIUM AND CRYPT ABSCESS OVER MUCOSA | 0.847 | 0.872 | 0.768 | 0.874 | 0.87 | 0.769 |
| AREA PROPORTION OF EROSION OR ULCERATION AND GRANULATION TISSUE OVER MUCOSA | 0.827 | 0.803 | 0.838 | 0.795 | 0.799 | 0.837 |
| AREA PROPORTION OF GRANULATION TISSUE OVER MUCOSA | 0.811 | 0.807 | 0.783 | 0.797 | 0.785 | 0.807 |
| AREA PROPORTION OF EROSION OR ULCERATION OVER MUCOSA | 0.796 | 0.769 | 0.858 | 0.755 | 0.86 | 0.811 |
| AREA PROPORTION OF CRYPT ABSCESS OVER ALL EPITHELIUM AND CRYPT ABSCESS | 0.777 | 0.809 | 0.7 | 0.776 | 0.849 | 0.724 |
| AREA PROPORTION OF CRYPT ABSCESS OVER MUCOSA | 0.759 | 0.799 | 0.667 | 0.767 | 0.835 | 0.695 |
| AREA PROPORTION OF BASAL PLASMACYTOSIS OVER MUCOSA | [illegible] | [illegible] | [illegible] | [illegible] | [illegible] | 0.472 |
| AREA PROPORTION OF BLOOD VESSEL OVER MUCOSA | 0.319 | 0.417 | 0.434 | 0.207 | 0.234* | 0.434 |
| AREA PROPORTION OF GOBLET CELL CYTOPLASM OVER ALL EPITHELIUM | [illegible] | [illegible] | -0.491 | -0.458 | -0.159* | [illegible] |
| COUNT PROPORTION OF NEUTROPHILS OVER ALL CELLS IN ALL EPITHELIUM | 0.829 | 0.866 | 0.817 | 0.814 | 0.835 | 0.822 |
| COUNT PROPORTION OF LYMPHOCYTES, PLASMA CELLS, AND EOSINOPHILS OVER ALL CELLS IN MUCOSA | [illegible] | [illegible] | [illegible] | [illegible] | [illegible] | [illegible] |
| COUNT PROPORTION OF LYMPHOCYTES AND PLASMA CELLS OVER ALL CELLS IN MUCOSA | [illegible] | [illegible] | [illegible] | [illegible] | [illegible] | [illegible] |
| COUNT PROPORTION OF NEUTROPHILS OVER ALL CELLS IN MUCOSA | [illegible] | [illegible] | [illegible] | [illegible] | [illegible] | [illegible] |
| COUNT PROPORTION OF PLASMA CELLS OVER ALL CELLS IN BASAL PLASMACYTOSIS | [illegible] | [illegible] | [illegible] | [illegible] | [illegible] | [illegible] |
| COUNT PROPORTION OF PLASMA CELLS OVER ALL CELLS IN MUCOSA | 0.401 | 0.467 | 0.317 | [illegible] | 0.424 | 0.478 |
| COUNT PROPORTION OF NEUTROPHILS OVER ALL CELLS IN LAMINA PROPRIA | 0.36 | 0.46 | [illegible] | 0.264 | [illegible] | 0.438 |
| COUNT PROPORTION OF EOSINOPHIL CELLS OVER ALL CELLS IN MUCOSA | 0.178 | 0.189 | 0.164* | 0.263 | 0.457 | 0.281 |
| COUNT PROPORTION OF INTRAEPITHELIAL LYMPHOCYTES OVER ALL CELLS IN EPITHELIUM | 0.137 | 0.303 | 0.468 | 0.135* | 0.23* | 0.053* |
| COUNT PROPORTION OF NON-INTRAEPITHELIAL LYMPHOCYTES OVER ALL CELLS IN LAMINA PROPRIA | 0.104* | 0.186 | 0.095* | 0.049* | -0.076* | -0.057* |
| COUNT PROPORTION OF EOSINOPHIL CELLS OVER ALL CELLS IN LAMINA PROPRIA | -0.09* | -0.057* | -0.117* | 0.003* | 0.087* | 0.069* |
| DENSITY OF NEUTROPHILS IN INFILTRATED EPITHELIUM, CRYPT ABSCESS, EROSION OR ULCERATION, AND GRANULATION TISSUE | 0.904 | 0.909 | 0.885 | 0.902 | 0.898 | 0.889 |
| DENSITY OF NEUTROPHILS IN INFILTRATED EPITHELIUM | 0.864 | 0.882 | 0.757 | 0.88 | 0.873 | 0.777 |
| DENSITY OF PLASMA CELLS IN MUCOSA | [illegible] | [illegible] | 0.42 | [illegible] | 0.444 | [illegible] |
| DENSITY OF EOSINOPHILS IN MUCOSA | 0.31 | 0.358 | 0.251 | 0.392 | 0.462 | 0.401 |

1

0

-1

FIG. 12A

SYSTEMS AND METHODS FOR PREDICTING DISEASE SEVERITY IN ULCERATIVE COLITIS

CROSS REFERENCE TO RELATED APPLICATIONS

This application is a continuation-in-part of U.S. patent application Ser. No. 17/375,694, entitled "SYSTEMS AND METHODS FOR PREDICTING MOLECULAR PHENOTYPES FROM WHOLE-SLIDE IMAGES" filed Jul. 14, 2021, which claims priority under 35 U.S.C. § 119(e) to U.S. Provisional Patent Application Ser. No. 63/052,316, entitled "SYSTEMS AND METHODS FOR PREDICTING MOLECULAR PHENOTYPES FROM PATHOLOGY IMAGES" filed Jul. 15, 2020. This application also claims priority under 35 U.S.C. § 119(e) to U.S. Provisional Patent Application Ser. No. 63/252,506, entitled "MACHINE LEARNING-BASED QUANTITATIVE EVALUATION OF HISTOLOGICAL DISEASE SEVERITY IN ULCERATIVE COLITIS" filed Oct. 5, 2021. All of these application are hereby incorporated by reference in their entirety.

BACKGROUND

Ulcerative colitis (UC) is a chronic inflammatory bowel disease that is characterized by a relapsing and remitting course. Appropriate assessment of disease activity such as UC severity is critical for adequate treatment decisions. In addition to endoscopic remission, histologic remission is emerging as a treatment target and a key factor in the evaluation of disease activity and therapeutic efficacy. However, there is no standardized definition of histologic remission, limiting the utility of histologic scoring. Further, manual pathologist evaluation is subject to intra- and inter-observer variability. As such, there is a need to quantify histologic features of UC and assess disease severity utilizing histologic scoring.

SUMMARY

The present disclosure relates to techniques for predicting disease severity, such as ulcerative colitis. The techniques provide a computerized method for training one or more models to predict a ulcerative colitis (UC) severity based on human-interpretable image features (HIFs) extracted from a whole-slide image. The method includes, by at least one processor: accessing a plurality of training whole-slide images associated with a plurality of UC patients, each of the training whole-slide images includes an associated UC severity obtained from one or more pathologists; determining a plurality of human-interpretable image features based on cell-type labels and/or tissue-type segmentations associated with the plurality of training whole-slide images; training a first statistical model based on the plurality of human-interpretable image features to predict UC severity for a whole-slide image; and storing the trained model on at least one storage device.

In an embodiment, the techniques provide a system for training one or more models to predict a ulcerative colitis (UC) severity based on human-interpretable image features extracted from a whole-slide image. The system comprises at least one processor configured to: access a plurality of training whole-slide images associated with a plurality of UC patients, each of the training whole-slide images includes an associated UC severity obtained from one or more pathologists; determine a plurality of human-interpretable image features based on cell-type labels and/or tissue-type segmentations associated with the plurality of training whole-slide images; train a first statistical model based on the plurality of human-interpretable image features to predict UC severity for a whole-slide image; and store the trained model on at least one storage device.

In an embodiment, the techniques provide a method for predicting a ulcerative colitis (UC) severity based on human-interpretable image features extracted from a whole-slide image, the method comprises: using a first statistical model to determine one or more cell-type labels and/or one or more tissue-type segmentations associated with the whole-slide image; determining a plurality of human-interpretable image features based on the one or more cell-type labels and/or the one or more tissue-type segmentations associated with the whole-slide images; and using a second statistical model to predict UC severity for the whole-slide image based on the plurality of human-interpretable image features.

Further aspects of the technology may be understood based on the non-limiting illustrative embodiments described herein. While some embodiments described herein are described with respect to prediction of UC severity from whole-slide images, these embodiments may be equally suitable for other histopathology, histology, or pathology applications, such as prediction of molecular phenotypes. While some embodiments described herein are described with respect to prediction of particular molecular phenotypes, these embodiments may be equally suitable for prediction of any molecular phenotype.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence is intended to have any limiting effect on the scope of any claim elements. For purposes of clarity, not every component may be labeled in every figure. The figures are provided for the purposes of illustration and explanation and are not intended as a definition of the limits of the systems and methods described herein. In the figures:

FIGS. 1B and 1C show aspects of a dataset for use with the system for predicting molecular phenotypes, in accordance with some embodiments of the technology described herein.

FIGS. 6A-1-6B-2 show aspects of human-interpretable image feature-based prediction of molecular phenotypes, in accordance with some embodiments of the technology described herein.

FIG. 12A shows correlations with pathologist NHI scores for certain exemplary human-interpretable image features in accordance with some embodiments of the technology described herein. Darker colors represent stronger correlation p-values and those marked with (*) do not have p-value <0.001.

DETAILED DESCRIPTION

Figure 1A:
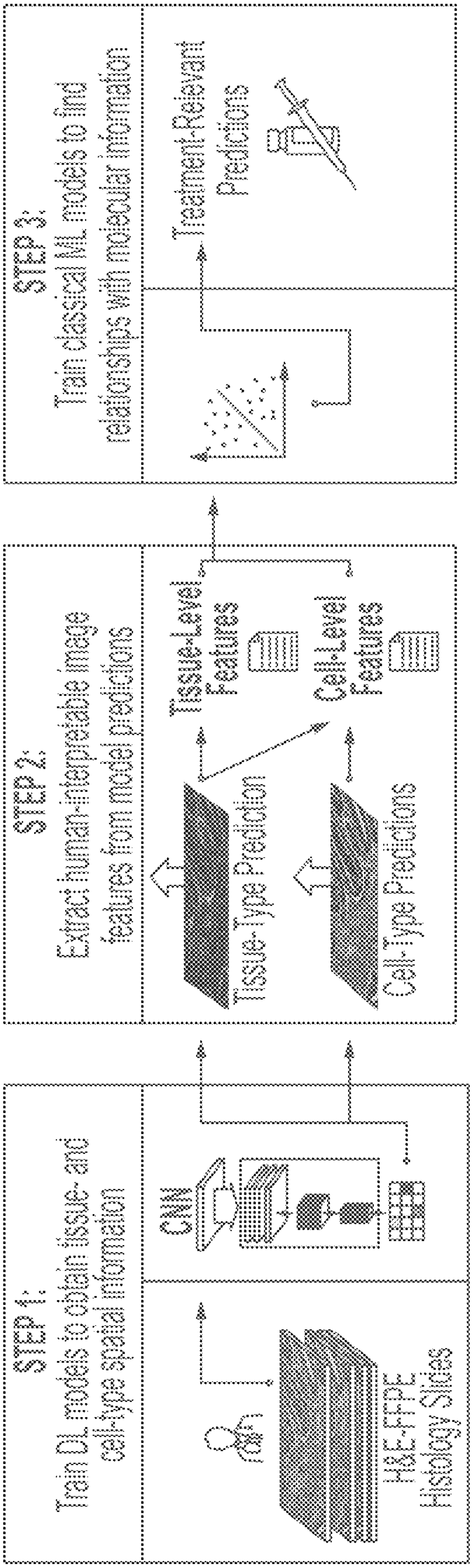
FIG. 1A shows aspects of a pipeline overview for a system for predicting molecular phenotypes or predicting UC severity from whole-slide images, in accordance with some embodiments of the technology described herein.

Modern computer vision methods present the potential for rapid, reproducible, and cost-effective clinical and molecular predictions. Over the past decade, the quantity and resolution of digitized histology slides has dramatically improved. At the same time, the field of computer vision has made significant strides in pathology image analysis, including automated prediction of Gleason scoring in prostate cancer, and mutational subtypes in non-small cell lung cancer. In addition to achieving diagnostic sensitivity and specificity metrics that match or exceed those of human pathologists, automated computational pathology can also scale to service resource-constrained settings where few pathologists are available. As a result, there may be opportunities to integrate these technologies into the clinical workflows of developing countries.

However, end-to-end deep learning models that infer outputs directly from raw images present significant risks for clinical settings, including fragility of machine learning models to dataset shift, adversarial attack, and systematic biases present in training data. Many of these risks stem from the well-known problem of poor model interpretability. "Black-box" model predictions are difficult for users to interrogate and understand, leading to user distrust. Without reliable means for understanding when and how vulnerabilities may become failures, computational methods may face difficulty achieving widespread adoption in clinical settings.

To address issues with the conventional approaches, the inventors have developed solutions for automated computation of human-interpretable image features (HIFs) to predict disease severity. The described HIF-based prediction models may mirror the pathology workflow of searching for distinctive, stage-defining features under a microscope and offer opportunities for pathologists to validate intermediate steps and identify failure points. In addition, the described HIF-based solutions may enable incorporation of histological knowledge and expert pixel-level annotations which increases predictive power. Studied HIFs span a wide range of visual features, including cell and nucleus morphologies, shapes and sizes of tissue regions of normal colon as well as pathological tissue regions characteristic of inflammatory bowel disease, tissue textures and the spatial distributions of inflammatory cells.

The inventors have appreciated that HIFs may be used in diagnosis and care of inflammatory bowel disease (IBD) patients. Ulcerative colitis (UC) is a chronic inflammatory bowel disease that is characterized by a relapsing and remitting course. Appropriate assessment of disease activity is critical for adequate treatment decisions. In addition to endoscopic remission, histologic remission is emerging as a treatment target and a key factor in the evaluation of disease activity and therapeutic efficacy. The inventors have appreciated and acknowledged that there is no standardized definition of histologic remission, limiting the utility of histologic scoring, and manual pathologist evaluation is subject to intra- and inter-observer variability. Thus, the inventors have developed machine learning models for identification and quantification of UC histological features directly from hematoxylin and eosin (H&E)-stained whole slide images.

In a non-limiting example, a method, system or a non-transitory computer readable medium is provided that is configured to train a statistical model to predict ulcerative colitis (UC) severity based on human-interpretable image features extracted from a whole-slide image. The training includes: accessing a plurality of training whole-slide images associated with a plurality of UC patients, determining a plurality of human-interpretable image features based on cell-type labels and/or tissue-type segmentations associated with the plurality of training whole-slide images, and training a statistical model based on the plurality of human-interpretable image features to predict a UC severity for a whole-slide image. Each of the training whole-slide images may include an associated UC severity obtained from one or more pathologists, such as a severity score. In some embodiments, the trained statistical model for predicting the UC severity may be a random forest classifier, or other suitable statistical models.

In some embodiments, the plurality of human-interpretable image features may be determined based on UC histologic features, e.g., cell-type labels and/or tissue-type segmentations associated with the plurality of training whole-slide images. In some non-limiting examples, the cell-type labels may include one or more of: neutrophils, plasma cells, intraepithelial lymphocytes, non-intraepithelial lymphocytes, eosinophils, goblet cell nuclei, enterocytes, or a combination thereof. In some non-limiting examples, the tissue-type segmentations include one or more of: normal epithelium, neutrophil-infiltrated epithelium, goblet cell cytoplasm, crypt abscess, inter-gland lumen, blood vessels, lamina propria, muscularis mucosa, basal plasmacytosis, erosion/ulceration, granulation tissue, or a combination thereof. As will be discussed further in detail in the present disclosure, these various cell-type labels and tissue-type segmentations may be used to determine the plurality of human-interpretable features for predicting the UC severity.

In some embodiments, the various cell-type labels and tissue-type segmentations may be determined using a second statistical model. For example, the second statistical model may include a cell model and/or a tissue-model, which may be trained using a plurality of annotated whole-slide images. In a non-limiting example, the statistical model may be a convolutional neural network (CNN). The CNN may be implemented as a deep-learning neural network, e.g., the CNN may include 20 or more layers with millions of trained weights. In training the CNN model, the plurality of annotated whole-slide images may each include one or more annotations that are annotated by one or more pathologists, where an annotation may describe a cell-type label or a tissue-type segmentation for a portion of the whole-slide image associated with the annotation. It is appreciated that an annotated whole-slide image may include one or more cell-type labels and/or one or more tissue-type segmentations.

In some embodiments, the training whole-slide images may be processed for image augmentation before the training images are used for extracting the cell-type labels and/or tissue-type segmentations. For example, the training whole-slide images may be processed to improve brightness, contract, or alter the image orientation. Alternatively, and/or additionally, artifacts (such as debris, tissue folds, and areas of poor focus) in the training whole-slide images may be removed. Additionally, background (e.g., non-tissue containing regions) may be removed.

In some embodiments, the image augmentation may be performed using a third statistical model, e.g., another CNN trained on multiple organs, where the third statistical model is configured to determine the background and/or artifacts in the images. Additionally, the training dataset may be filtered based on the determination of the artifacts. For example, slides that consist of artifacts that exceed a threshold (e.g., >10%), slides in which a usable tissue area (non-background) in an image is below a threshold (e.g., <1%), or slides with ink markings present at the edge of tissues may be eliminated from the training dataset automatically or sent to a pathologist for manual review. In the manual review, if the image is deemed uninterpretable by the pathologist, and/or ink markings are present in the image, the image may be removed from the training dataset.

In some embodiments, the plurality of human-interpretable image features for use with predicting UC severity for a whole-slide image are determined based on the cell-type labels and/or tissue-type segmentations. In some embodiments, the plurality of human-interpretable image features may include one or more categories, such as cell-level count and density, cell-level cluster, cell-level proportion and proximity, tissue-level area and multiplicity, tissue-level architecture, and/or tissue-level morphological features. Details of these human-interpretable image features will be described further herein in the present disclosure. These human-interpretable image features may be selected based on one or more criteria. For example, the human-interpretable image feature(s) may be reflective of active inflammation and epithelial injury, chronic inflammation, cell features related to neutrophils and resulting tissue features of active inflammation, and/or plasma cell features.

In some embodiments, the plurality of human-interpretable image features may be selected based on evaluation for correlation with one or more pathologist scores associated with the plurality of training whole-slide images. For example, the training whole-slide images are each associated with a respective UC severity obtained from one or more pathologists. The evaluation for correlation may be used to identify human-interpretable image features that are correlated with certain UC severity, such as histologic patterns associated with UC disease. In some examples, the UC associated histologic patterns may include normal colon, focal active colitis, inactive chronic colitis, or chronic colitis with mild, moderate, or severe histologic activity. In some examples, the various UC severity may be represented by a UC severity score label which may correspond to some or all of the histologic patterns. For example, the UC severity score may include a Nancy Histological Index (NHI) score which may include an overall label, e.g., [0, 4] for the UC severity, where NHI (4) may indicate severe active colitis, NHI (1) chronic inactive colitis. In other examples, the UC severity may include a score in other scoring systems, such as a Geboes score or a Robarts Histopathology Index score.

In some embodiments, a human-interpretable image feature may correlate with an overall range of NHI scores to the extent in which the feature has a linear relationship with a pathologist score. In such case, the human-interpretable image feature would have discriminating power between different UC severities, and thus, can be used at least in part to predict the UC severity. In a non-limiting example, area proportion of infiltrated epithelium (neutrophilic infiltration) has strong correlation with increasing NHI score and can be used at least in part to predict UC severity. For example, the disease severity is expected to increase as the infiltrated epithelium increases in area portion.

In some embodiments, selected human-interpretable image features which correlate with an overall range of NHI scores may be reflective of active inflammation and epithelial injury, such as combined area proportion of infiltrated epithelium (neutrophilic infiltration), crypt abscess, erosion, ulceration and associated granulation tissue over mucosa, area proportion of epithelium with neutrophilic infiltration over all epithelium, count proportion and density of neutrophils in epithelium, ulcer or their combination, or a combination thereof. In some embodiments, Goblet cell cytoplasm mucin area proportion in the epithelium is also inversely correlated with the overall range of NHI scores and may be selected.

In some embodiments, a human-interpretable image feature may correlate with a partial range of NHI scores. For example, selected human-interpretable image features may correlate with severe UC disease (e.g., high NHI scores such as NHI (3) and NHI (4)). Examples of these human-interpretable image features may include area proportion of erosion, ulceration and granulation tissue in mucosa, neutrophil density within infiltrated epithelium, crypt abscess, erosion, ulceration and granulation tissue, or a combination thereof. In some embodiments, certain human-interpretable image features which correlate with an overall NHI score are reflective of chronic inflammation, such as area proportion of basal plasmacytosis, and/or plasma cell features.

In some embodiments, selected human-interpretable image features which correlate with chronic inactive colitis (e.g., low NHI score) may be reflective of chronic inflammation, such as basal plasmacytosis area proportion in mucosa, and combined count proportions of chronic inflammatory cells (plasma cells, lymphocytes).

In some embodiments, selected human-interpretable image features that correlate with the overall range of NHI scores may not be components of the NHI scoring index, or may be used in a limited fashion in the NHI scoring index (e.g., used in assigning the score of NHI 1). Examples of such features include plasma cell features, such as basal plasmacytosis area proportion as well as plasma cell count and density within mucosa and basal plasmacytosis.

In some embodiments, model generated human-interpretable image features as described herein in the present disclosure may not be components of the NHI scoring index, but may be essential components of other scoring systems such as the Geboes, RHI, and PHRI score. In some embodiments, selected human-interpretable image features may include additional features that are not part of any formalized scoring systems mentioned above. In some embodiments, additional features may inversely correlate with a pathologist's NHI score. For example, goblet cell mucin depletion, a known histologic feature of epithelial injury in UC, is quantified to show that area proportion of epithelium occupied by goblet cell mucin in a slide is inversely correlated with disease severity assigned to the slide by pathologists using the NHI scoring index.

In some embodiments, certain human-interpretable image features may correlate with discriminating power between groups of severity that delineate cases with active inflammation from those with chronic inactive disease, such as discriminating between NHI scores NHI 0-1 and NHI scores NHI 2-4. For example, the human-interpretable image features such as cell features related to neutrophils and resulting tissue features of active inflammation correlate with discriminating power among severity groups NHI (0,1) and NHI (2-4).

Figure 12B:
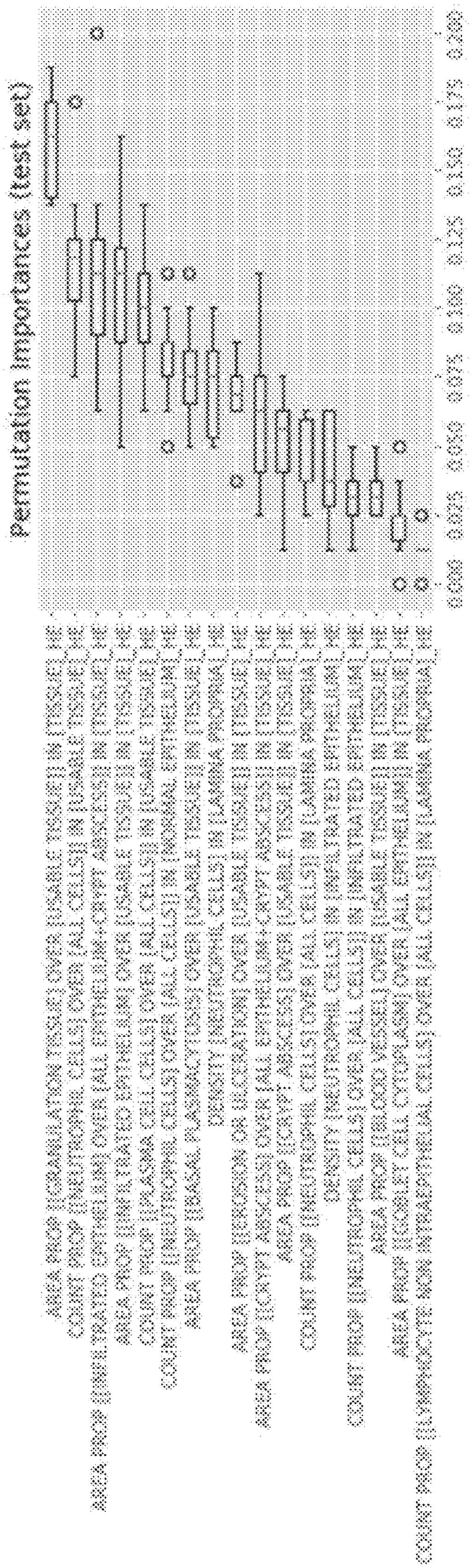
FIG. 12B shows a subset of the human-interpretable features of FIG. 12A that are selected as relevant to NHI scoring and as input for training a statistical model, in accordance with some embodiments herein.
Figure 12C:
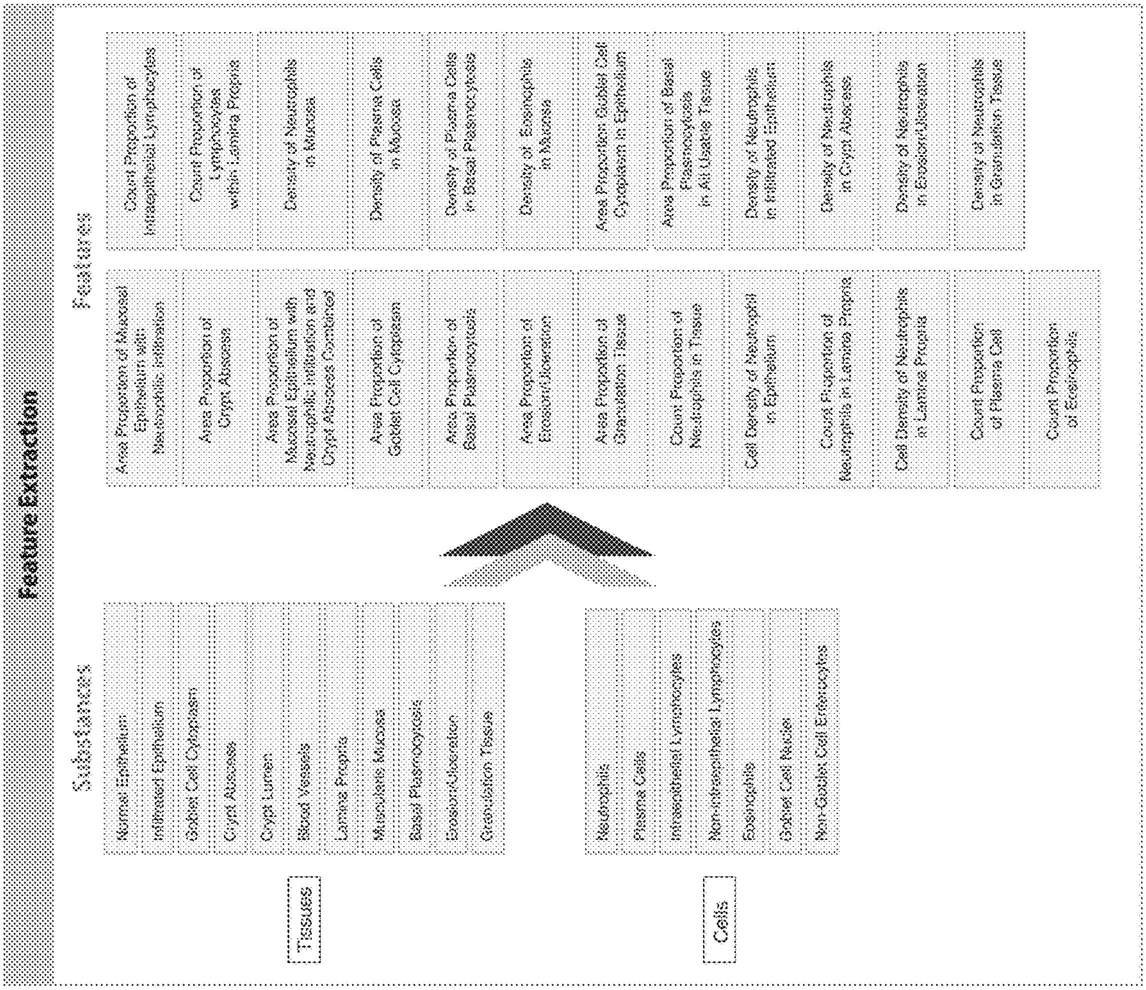
FIG. 12C shows examples of cell and tissue features that may be extracted and human-interpretable features that may be selected as input for training a statistical model, in accordance with some embodiments herein.

Various human-interpretable image features as described above which are evaluated to correlate with certain UC severity or severity groups may thus be selected for training the statistical model to predict UC severity. In some embodiments, a number of human-interpretable image features may be used as input to the statistical model to predict the UC severity. Examples of such human-interpretable image features are shown in FIGS. 12A-12C. It is appreciated that any number of suitable human-interpretable features may be selected.

In some embodiments, the statistical model may be a classifier, such as a random forest classifier. In training the classifier, the training whole-slide images each is associated with a UC severity as obtained from one or more pathologists. These training whole-slide images are processed to extract cell-type labels and/or tissue-type segmentations using a previously trained statistical model (e.g., cell-type model and/or tissue-type model) as described herein. HIFs can be determined based on the extracted cell-type labels and/or tissue-type segmentations and subsequently provided for training the statistical model. As described herein, the HIFs in the training are automatically determined using another statistical model (e.g., cell-type model and/or tissue-type model, such as one or more CNNs). The UC severity (e.g., NHI scores) obtained by the pathologists may be used as ground truth for the training. As the result, the trained statistical model may be trained to predict UC severity from a given whole-slide image.

Once the training is complete, the trained model may be stored for prediction.

In a non-limiting example, a method, system or a non-transitory computer readable medium is provided that is configured to perform one or more operations to predict ulcerative colitis (UC) severity based on human-interpretable image features extracted from a whole-slide image. The one or more operations may include using a first statistical model to determine one or more cell-type labels and/or one or more tissue-type segmentations associated with the whole-slide image; determining a plurality of human-interpretable image features based on the one or more cell-type labels and/or the one or more tissue-type segmentations associated with the whole-slide images; and using a second statistical model to predict a UC severity for the whole-slide image based on the plurality of human-interpretable image features.

In some embodiments, the first statistical model may be previously trained and stored in a non-transitory computer readable medium and accessed to extract cell-type labels and/or tissue-type segmentations. For example, the first statistical model may include a cell-type model and/or tissue-type model as described herein in the present disclosure. In a non-limiting example, the first statistical model may be a CNN. The first statistical model may be trained to extract one or more cell-type labels and/or one or more tissue-type segmentations associated with a plurality of whole-slide images. The training may use a plurality of annotated whole-slide images in the manner as described herein in the present disclosure, where annotations are made by one or more pathologists and may each describe a cell-type label or a tissue-type segmentation for a portion of a whole-slide image associated with the annotation.

In some embodiments, the second statistical model may be trained and stored in a non-transitory computer readable medium for the prediction task. The second statistical model may be previously trained, using the various methods as described above and further herein, to predict a UC severity for the whole-slide image based on the plurality of human-interpretable image features. For example, the second statistical model may include a random forest classifier. It is appreciated that the second statistical model may include other statistical model(s), such as a support vector machine, a neural network, a regression model, a clustering model, a Bayesian network, reinforcement learning, metric learning, a genetic algorithm, or any suitable statistical model. As described in the present disclosure, a selected number of human-interpretable image features may be used in training the second statistical model. In predicting a UC severity type, the same human-interpretable image features that are used in training the second statistical model may be used.

In some embodiments, the human-interpretable image features may be selected in a manner as described herein in the present disclosure (e.g., based on evaluation for correlation with one or more pathologist scores associated with a plurality of training whole-slide images or manually selected by a pathologist). For example, as described in the present disclosure, a number of human-interpretable image features, such as shown in FIGS. 12A-12C, may be selected based on the evaluation. It is appreciated that any other suitable of human-interpretable image features may be selected.

In some embodiments, in predicting the UC severity, a given input whole-image slide may be processed to extract cell-type labels and/or tissue-type segmentations using the first statistical model, e.g., a CNN. The first statistical model may be previously trained and stored. Subsequently, a plurality of human-interpretable image features are determined based on the extracted cell-type labels and/or tissue-type segmentations, wherein the plurality of human-interpretable are selected in the manner as described herein in the present disclosure. The determined human-interpretable image features are provided to the second statistical model to predict a UC severity. The second statistical model may be previously trained and stored, and accessed for use in the prediction. As described previously, the UC severity may include a UC severity score (e.g., a NHI score, or a UC severity score in other scoring systems such as Geboes Score or Robarts Histopathology Index systems).

Throughout this disclosure, a convolutional neural network is used as an exemplary basis for a statistical model (e.g., a deep learning model) that may be used in accordance with some embodiments. However, it should be appreciated that other types of statistical models may alternatively be used, and embodiments are not limited in this respect. Other types of statistical models that may be used include a support vector machine, a neural network, a regression model, a random forest, a clustering model, a Bayesian network, reinforcement learning, metric learning, a genetic algorithm, or another suitable statistical model. More details for training the convolutional neural network are provided with respect to FIG. 7.

Figure 8:
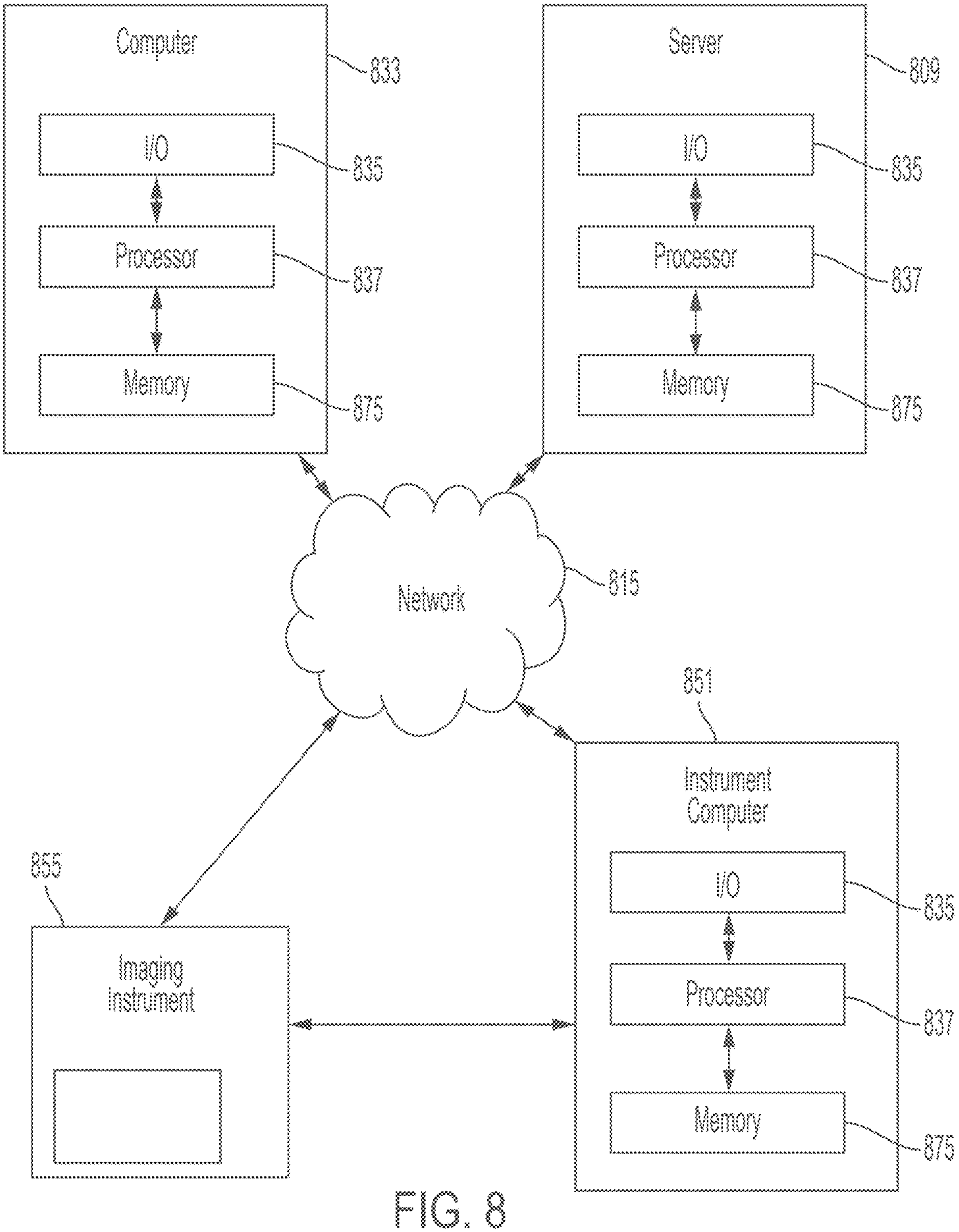
FIG. 8 shows a block diagram of a computer system on which various embodiments of the technology described herein may be practiced.

In some aspects, the described systems and methods provide for training or using one or more models to predict UC severity may be implemented on a computer system, such as the system discussed with respect to FIG. 8, or another suitable computer system, or a combination thereof.

Exemplary Implementation I—HIF-Based Approach for Predicting Molecular Phenotypes The inventors have appreciated the increasingly clear relationship between the TME and patient response to targeted therapies. For instance, immuno-supportive phenotypes, which exhibit greater baseline antitumor immunity and improved immunotherapy response, have been linked to the presence of TILs and elevated expression of programmed death-ligand 1 (PD-L1) on tumor-associated immune cells. In contrast, immuno-suppressive phenotypes have been linked to the presence of tumor-associated macrophages and fibroblasts, as well as reduced PD-L1 expression. HIF-based approaches have the potential to provide an interpretable window into the composition and spatial architecture of the TME in a manner that is complementary to conventional genomic approaches.

While some prior HIF-based studies have identified feature classes, most have been limited in scope. Such studies often involve a single cell or tissue type; none have explored features that combine both cell and tissue properties. In addition, the majority of reported HIFs have only been vetted on a single cancer type, often non-small-cell lung cancer (NSCLC).

The inventors have developed a computational pathology pipeline that can integrate high-resolution cell- and tissue-level information from WSIs to predict treatment-relevant, molecularly-derived phenotypes across different cancer types. In doing so, in a non-limiting example, the inventors introduce a diverse collection of HIFs ranging from simple cell (e.g. density of lymphocytes in cancer tissue) and tissue quantities (e.g. area of necrotic tissue) to complex spatial features capturing tissue architecture, tissue morphology, and cell-cell proximity. Notably, such features can generalize across cancer types and provide a quantitative and interpretable link to specific and biologically-relevant characteristics of each TME.

Further aspects of the technology may be understood based on the non-limiting illustrative embodiments described further below. Examples of specific implementations are provided herein for illustrative purposes only and are not intended to be limiting. While some embodiments described herein are described with respect to prediction of molecular phenotypes from whole-slide images, these embodiments may be equally suitable for other histopathology, histology, or pathology applications. While some embodiments described herein are described with respect to prediction of particular molecular phenotypes, these embodiments may be equally suitable for prediction of any molecular phenotype.

Dataset Characteristics and Fully-Automated Pipeline Design

In some embodiments, in order to test the approach on a diverse array of histopathology images, hematoxylin and eosin (H&E) stained, formalin-fixed and paraffin-embedded (FFPE) WSIs corresponding to distinct patients were obtained. These images, each scanned at either 20× or 40× magnification or another suitable magnification, represented patients with skin cutaneous melanoma (SKCM), stomach adenocarcinoma (STAD), breast cancer (BRCA), lung adenocarcinoma (LUAD), and lung squamous cell carcinoma (LUSC) from distinct clinical sites. To supplement the analysis cohort, additional WSIs for the cancer types may be obtained to improve model robustness.

To maximize capture of this information, images (e.g., n=5 or another suitable number) may be excluded only if they failed basic quality control checks as determined by expert pathologists. Criteria for quality control were limited to mislabeling of tissue, excessive blur, or insufficient staining, but the described systems and methods are not so limited. The cell- and tissue-level annotations may be collected from a network of pathologists.

The inventors used the resulting slides and annotations to design a fully automated pipeline to extract HIFs from these slides (summarized in FIG. 1A; Methodology for extracting HIFs from high-resolution, digitized H&E images). First, deep learning models were trained to label cells ("cell-type models") and segment tissue regions ("tissue-type models"). Training and validation of models was conducted on a development set of WSIs, supplemented by the additional WSIs (FIG. 1B; Summary statistics on the number of WSIs (e.g., from the Cancer Genome Atlas (TCGA), distinct patients, and annotations), but the described systems and methods are not so limited. Next, cell- and tissue-type model predictions were exhaustively generated for WSIs, which were then used to compute a diverse array of HIFs per WSI. Finally, classical linear machine learning models that could use these HIFs to predict treatment-relevant molecular expression phenotypes were trained.

Cell- and Tissue-Type Predictions Yield a Wide Spectrum of HIFs

Figure 1C:
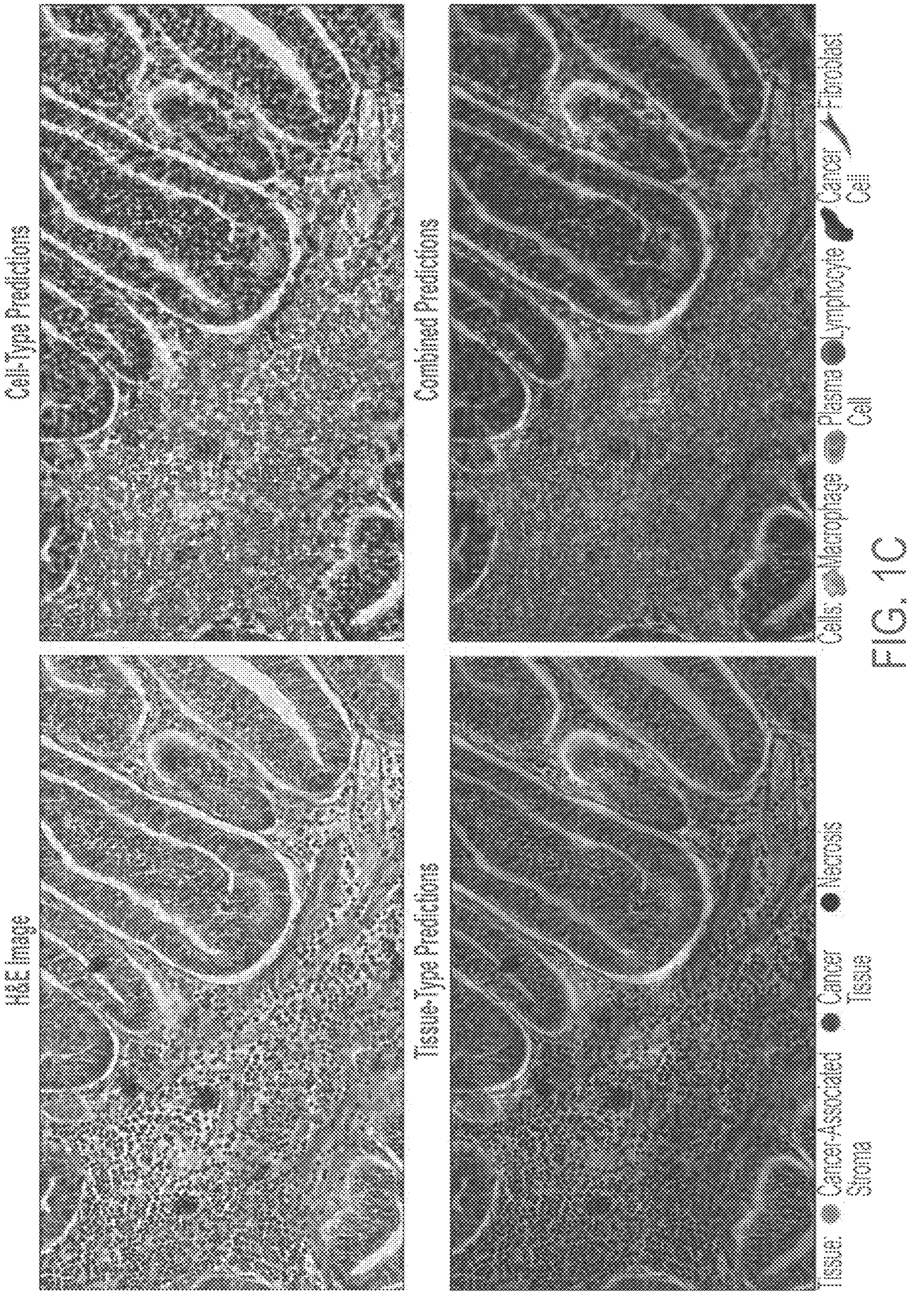

In some embodiments, in the first step of the pipeline, two Convolutional Neural Networks (CNNs) were trained per cancer type: (1) tissue-type models trained to segment cancer tissue, cancer-associated stroma, necrotic tissue regions, and (2) cell-type models trained to detect lymphocytes, plasma cells, fibroblasts, macrophages, and cancer cells. These models were improved iteratively through a series of quality control steps, including significant input from board-certified pathologists (Methods). These CNNs were then used to exhaustively generate cell-type labels and tissue-type segmentations for each WSI. These predictions may be visualized as colored heatmaps projected onto the original WSIs (FIG. 1C; Unprocessed portions of STAD H&E-stained slides alongside corresponding heatmap visualizations of cell- and tissue-type predictions. Slide regions are classified into tissue types: cancer tissue (red), cancer-associated stroma (orange), necrosis (black), or normal (transparent). Pixels in cancer tissue or cancer-associated stroma areas are classified into cell types: lymphocyte (green), plasma cell (lime), fibroblast (orange), macrophage (aqua), cancer cell (red), or background (transparent)). When quantified, these predictions may capture broad multivariate information about the spatial distribution of cells and tissues in each slide.

Figure 2:
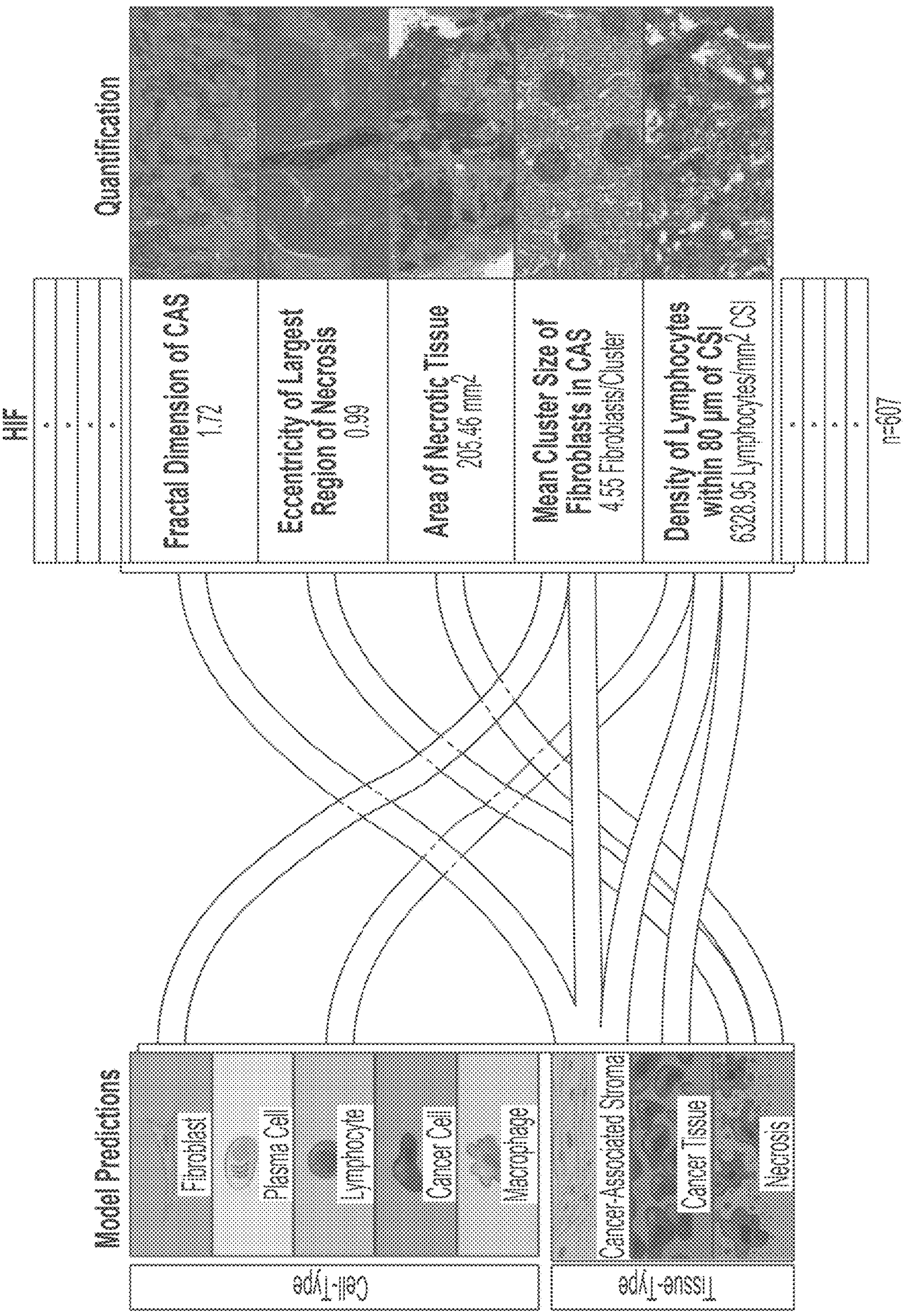
FIG. 2 shows aspects of a human-interpretable image feature extraction workflow, in accordance with some embodiments of the technology described herein.

In an illustrative example, model predictions were used to extract HIFs (FIG. 2; Flow diagram of HIF extraction from model predictions for five example HIFs. For each HIF, an H&E snapshot with the corresponding cell- or tissue-type heatmap overlaid and the associated quantity are shown), which can be understood in terms of one or more categories (FIGS. 3A-3F; Graphical overview of the HIFs grouped into six categories: cell-level count and density, cell-level cluster, cell-level proportion and proximity, tissue-level area and multiplicity, tissue-level architecture, and tissue-level morphological. For each HIF, a histogram of the HIF quantified in all patient samples across the different cancer types, and H&E snapshots corresponding to high and low values with the corresponding cell- or tissue-type heatmap overlaid are shown. Both snapshots are taken from patient samples of the same cancer type. Cell- and tissue-type heatmaps adhere to the same color scheme described in FIG. 1C. In (iii), fibroblast clusters are annotated, contrasting one large cluster against multiple smaller clusters. In (iv), macrophage clusters and extents are annotated. Cluster extent is defined as the maximum distance between a cluster exemplar (defined via Birch clustering) and a cell within that cluster. Significant regions (viii) are defined as connected components (identified at the pixel-level) of a given tissue type with at least 10% the size of the largest connected component in the slide. A solidity (ix) of one corresponds to a fully solid object, while values less than one correspond to objects containing holes or with irregular boundaries. Fractal dimension (x) can efficiently estimate the geometrical complexity and irregularity of shapes and patterns, thus capturing tissue architecture. A fractal dimension of one corresponds to a tissue border that is virtually smooth (a perfect line), while increasing fractal dimension corresponds to increasing roughness and irregularity, which translates into more extensive physical contact between adjacent tissue types. The fractal dimension of the cancer-stroma interface (CSI) may be associated with dysfunction in antigen presentation. Perimeter$^2$/Area (xi) is a unitless measure of shape roughness (e.g. square=16, circle=4π). Across all HIFs, tumor regions include cancer tissue (CT), cancer-associated stroma (CAS), and a combined CT+CAS).

Figure 3A:
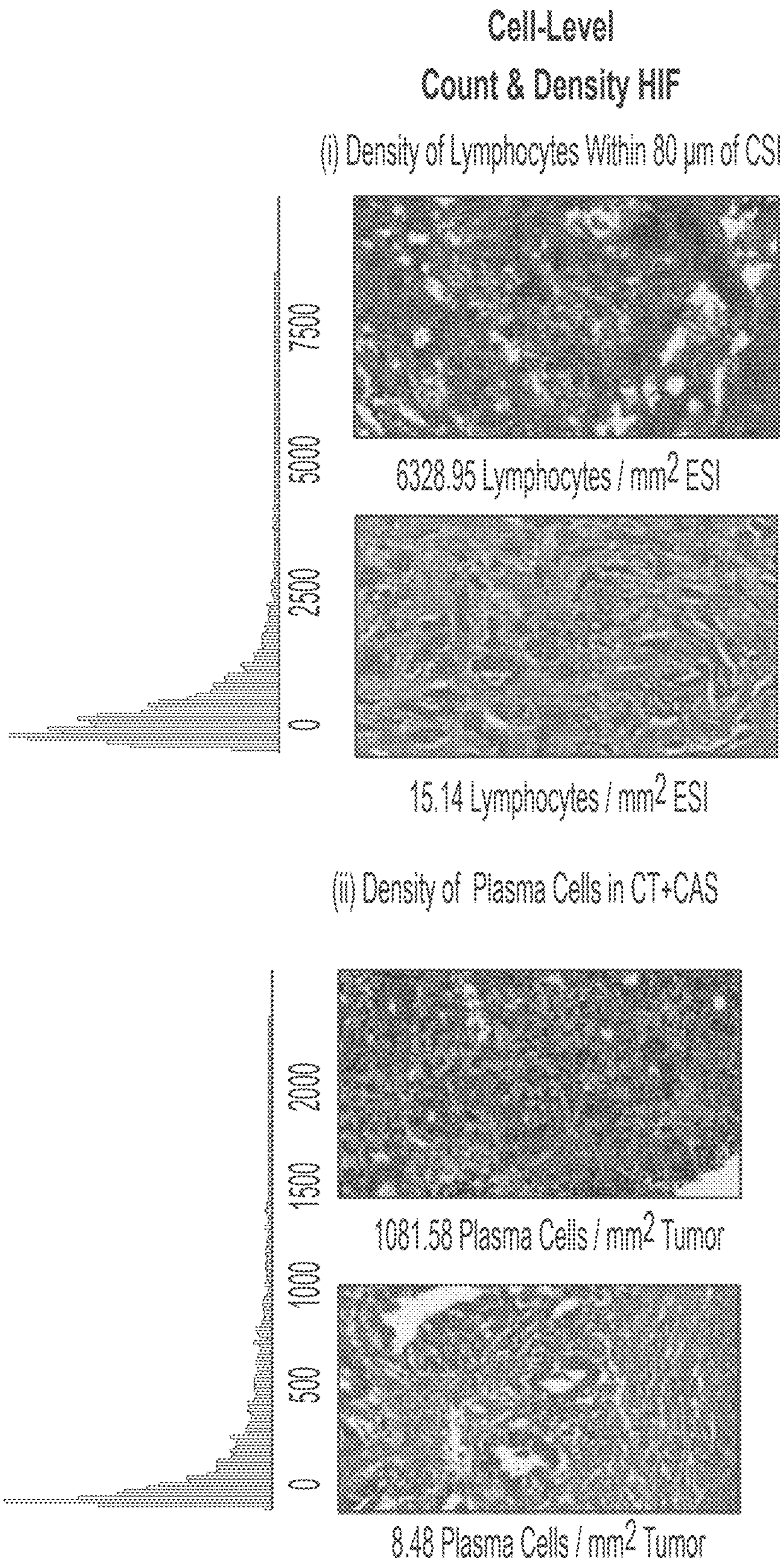
FIGS. 3A-3F show aspects of an overview of human-interpretable image features, in accordance with some embodiments of the technology described herein.
Figure 3B:
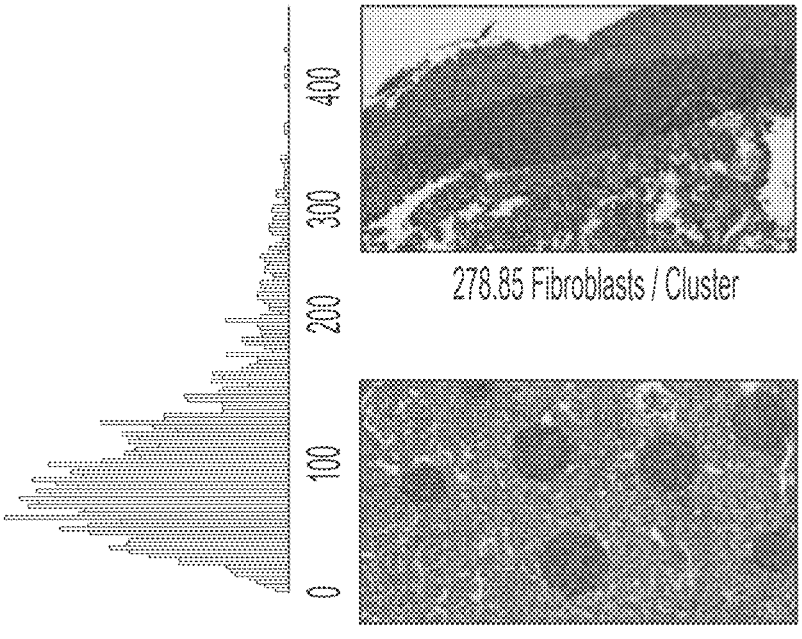
Figure 3B:
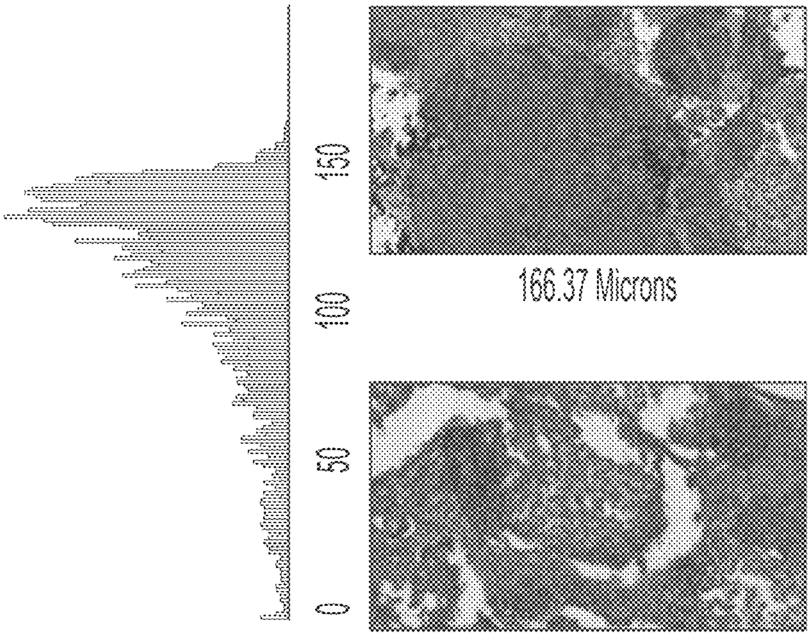
Figure 3C:
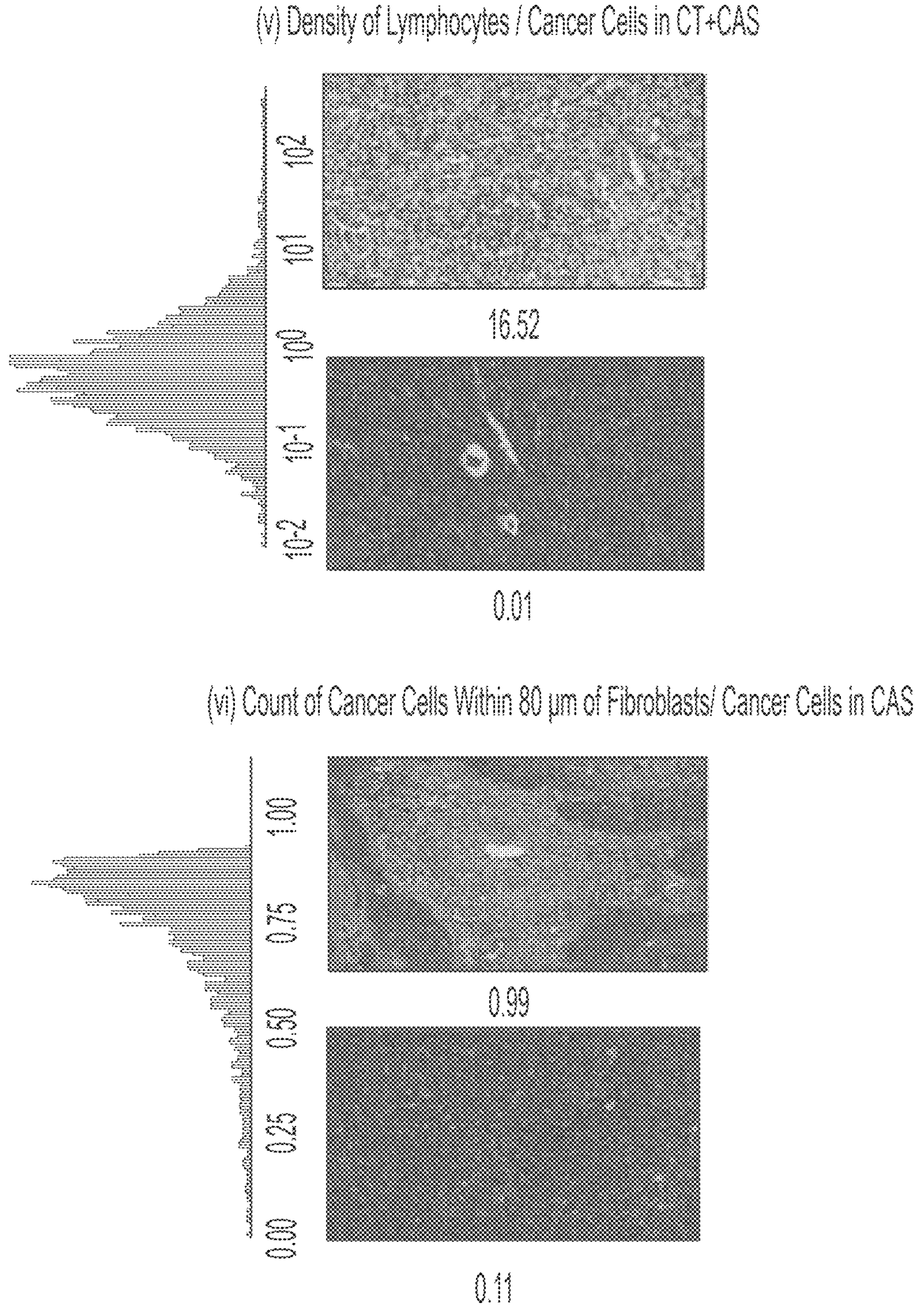
Figure 3D:
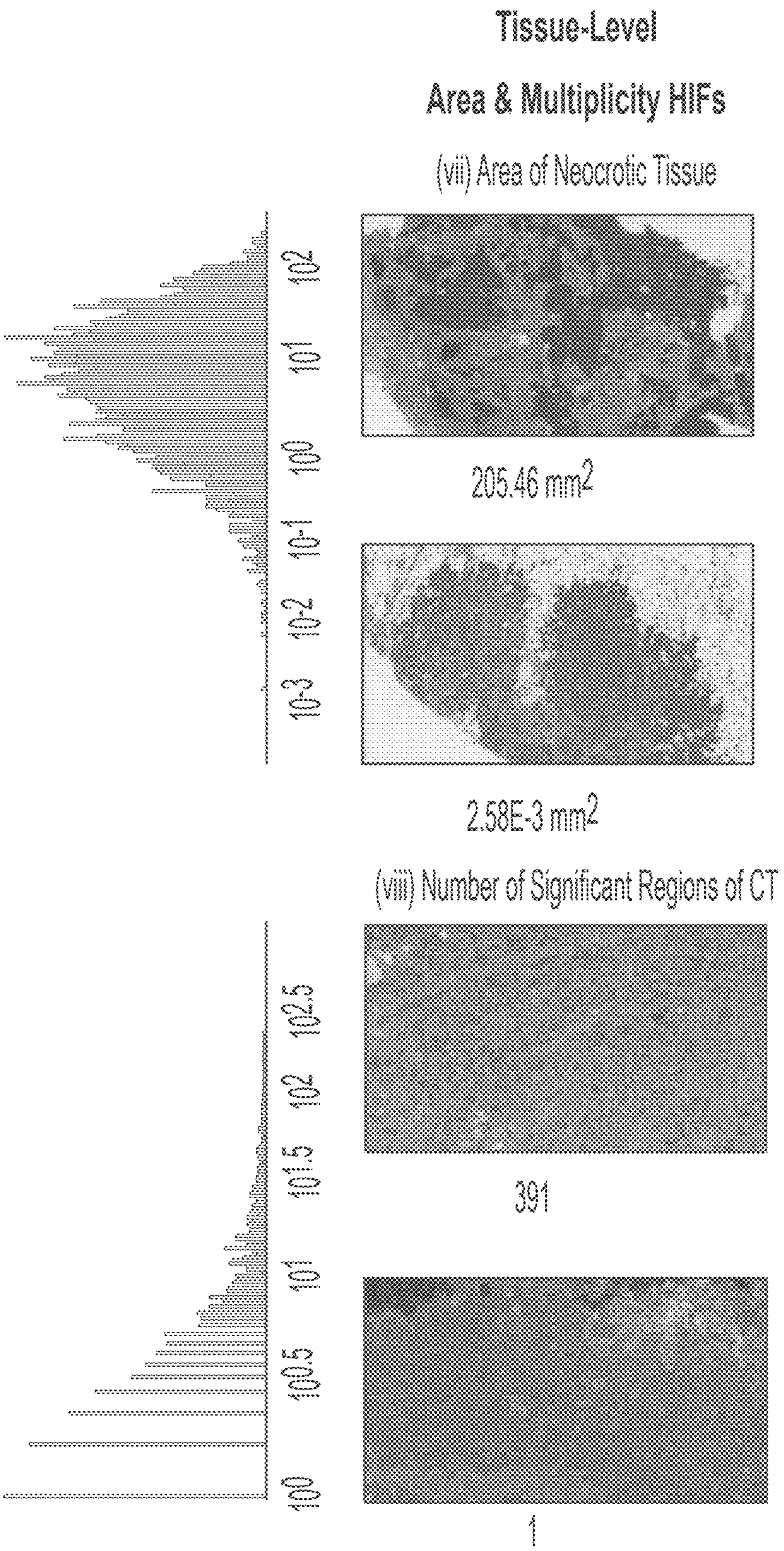
Figure 3E:
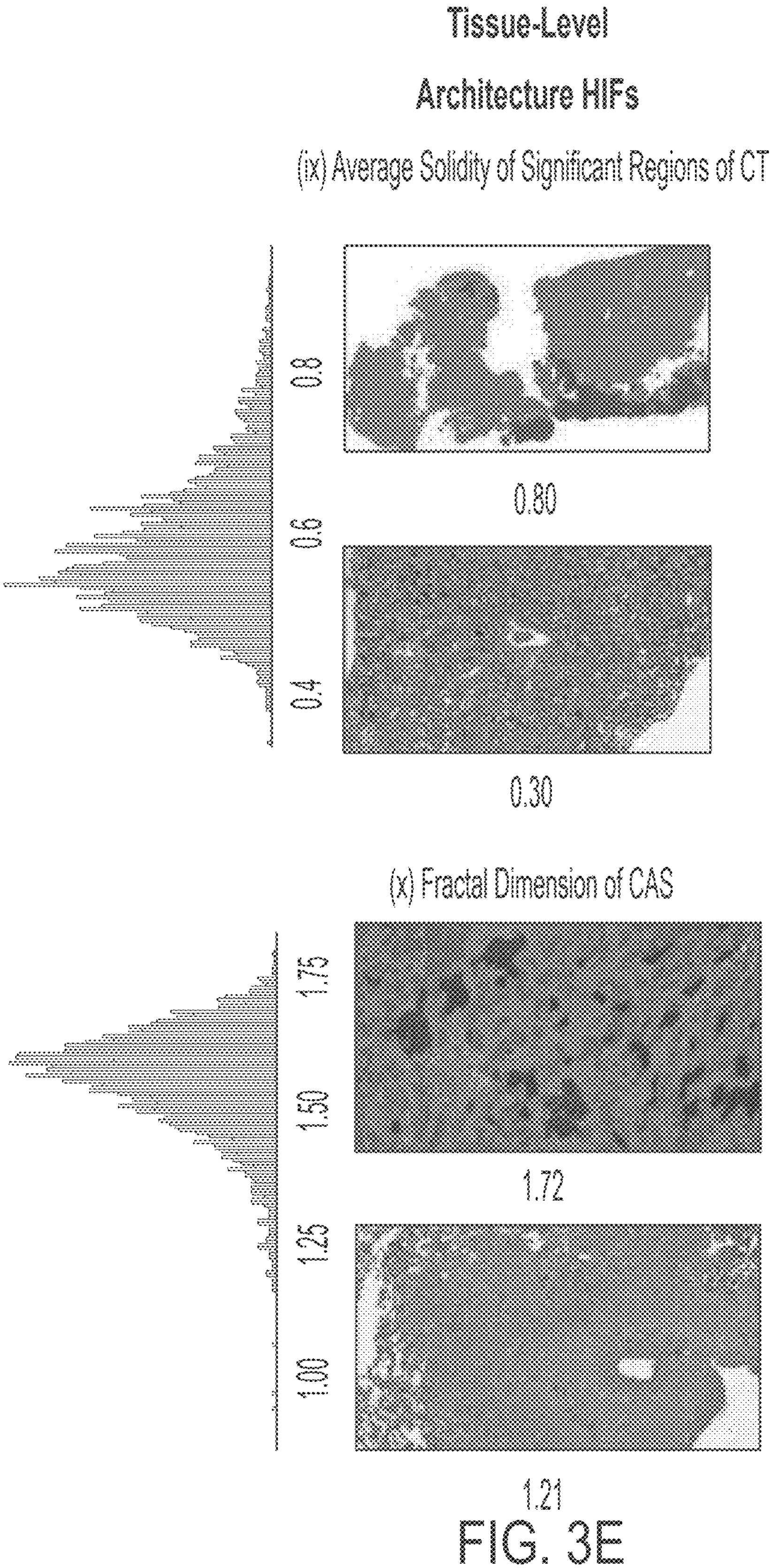
Figure 3F:
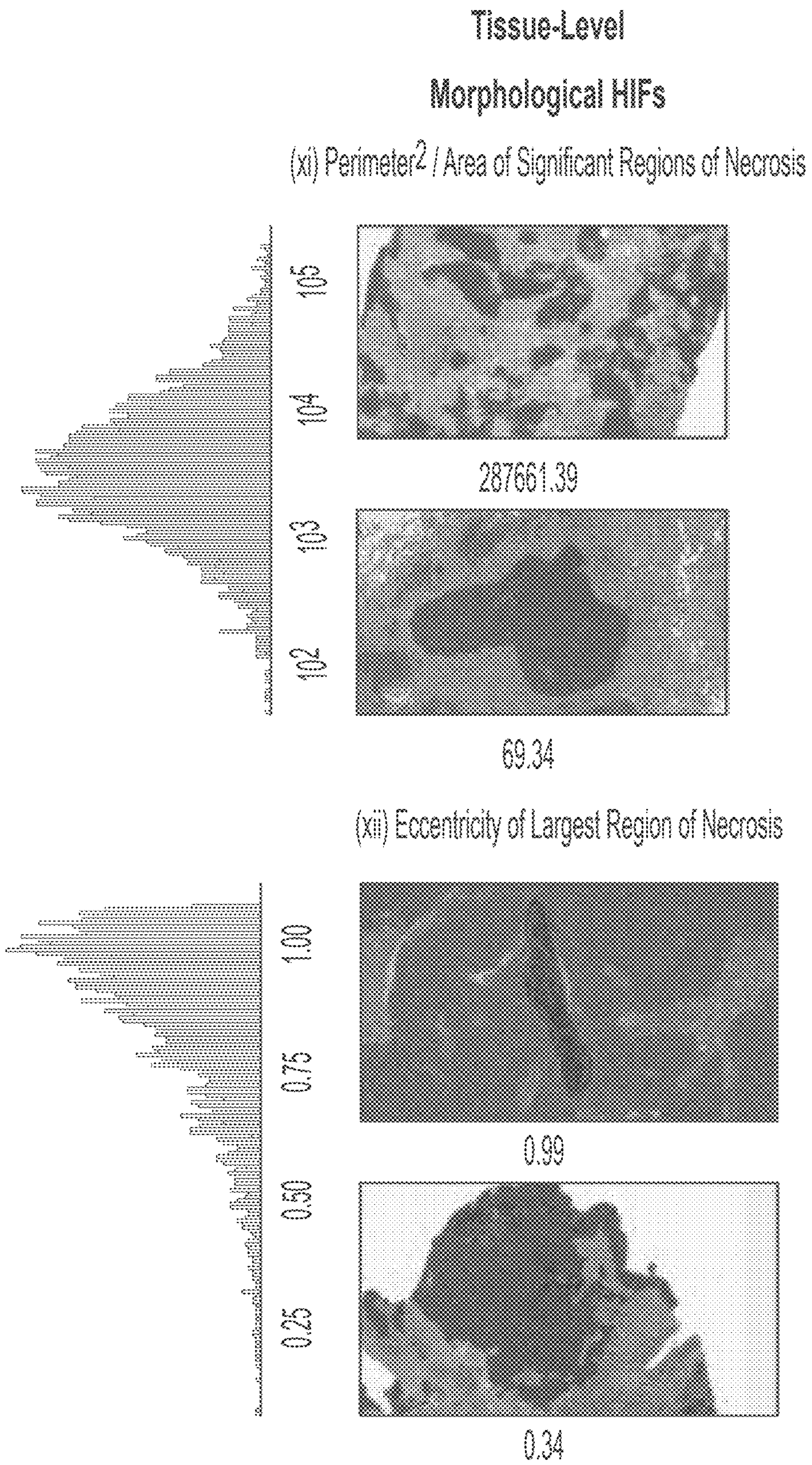

In some embodiments, the first category includes cell type counts and densities across different tissue regions (e.g. density of plasma cells in cancer tissue) (FIG. 3A i-ii). The next category includes cell-level cluster features that capture inter-cellular spatial relationships, such as cluster dispersion, size, and extent (e.g. mean cluster size of fibroblasts in cancer-associated stroma) (FIG. 3B iii-iv). The third category captures cell-level proportion and proximity features, such as the proportional count of lymphocytes versus fibroblasts within 80 microns (μm) of the cancer-stroma interface (CSI) (FIG. 3C v-vi). The fourth category includes tissue area (e.g. mm$^2$ of necrotic tissue) and multiplicity counts (e.g. number of significant regions of cancer tissue) (FIG. 3D vii-viii). The fifth category includes tissue architecture features, such as the average solidity ("solidness") of cancer tissue regions or the fractal dimension (geometrical complexity) of cancer-associated stroma (FIG. 3E ix-x). The final category captures tissue-level morphology using metrics such as perimeter$^2$ over area (shape roughness), lacunarity ("gappiness"), and eccentricity (FIG. 3F xi-xii). This broad enumeration of biologically-relevant HIFs may enable unbiased exploration of mechanisms underlying histopathology across diverse cancer types.

HIFs Capture Sufficient Information to Stratify Cancer Types

Figure 4A:
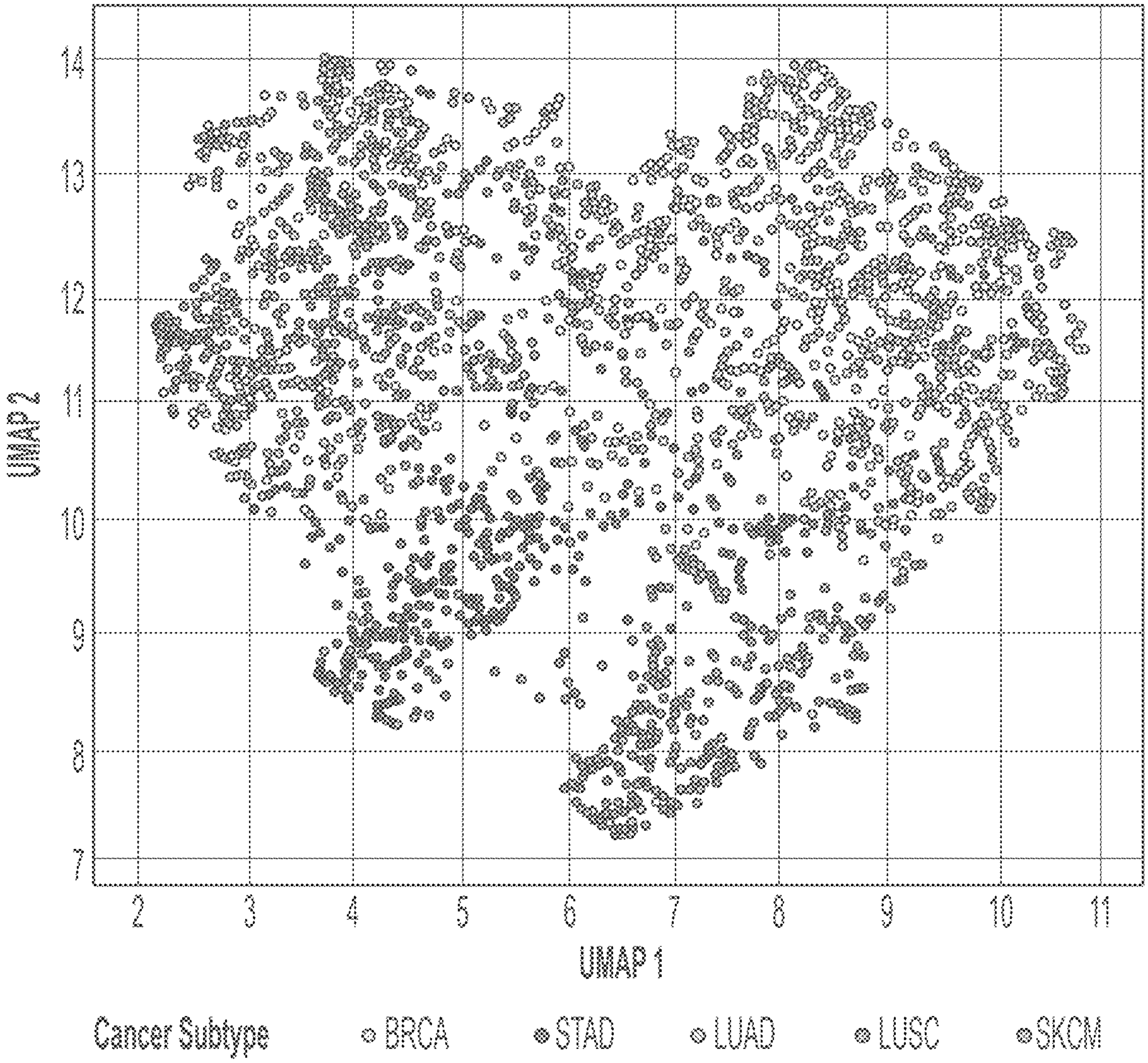
FIGS. 4A-4B show aspects of human-interpretable image feature differences across cancer types, in accordance with some embodiments of the technology described herein.

In some embodiments, to visualize the global structure of the HIF feature matrix Uniform Manifold Approximation and Projection (UMAP) was used to reduce the HIF space into two dimensions (FIG. 4A; UMAP projection and visualization of different cancer types reduced from the HIF space into two dimensions. Each point represents a patient sample colored by cancer type). The 2-D manifold projection of HIFs was able to separate BRCA, SKCM, and STAD into distinct clusters, while merging NSCLC subtypes LUAD and LUSC into one overlapping cluster.

Figure 4B:
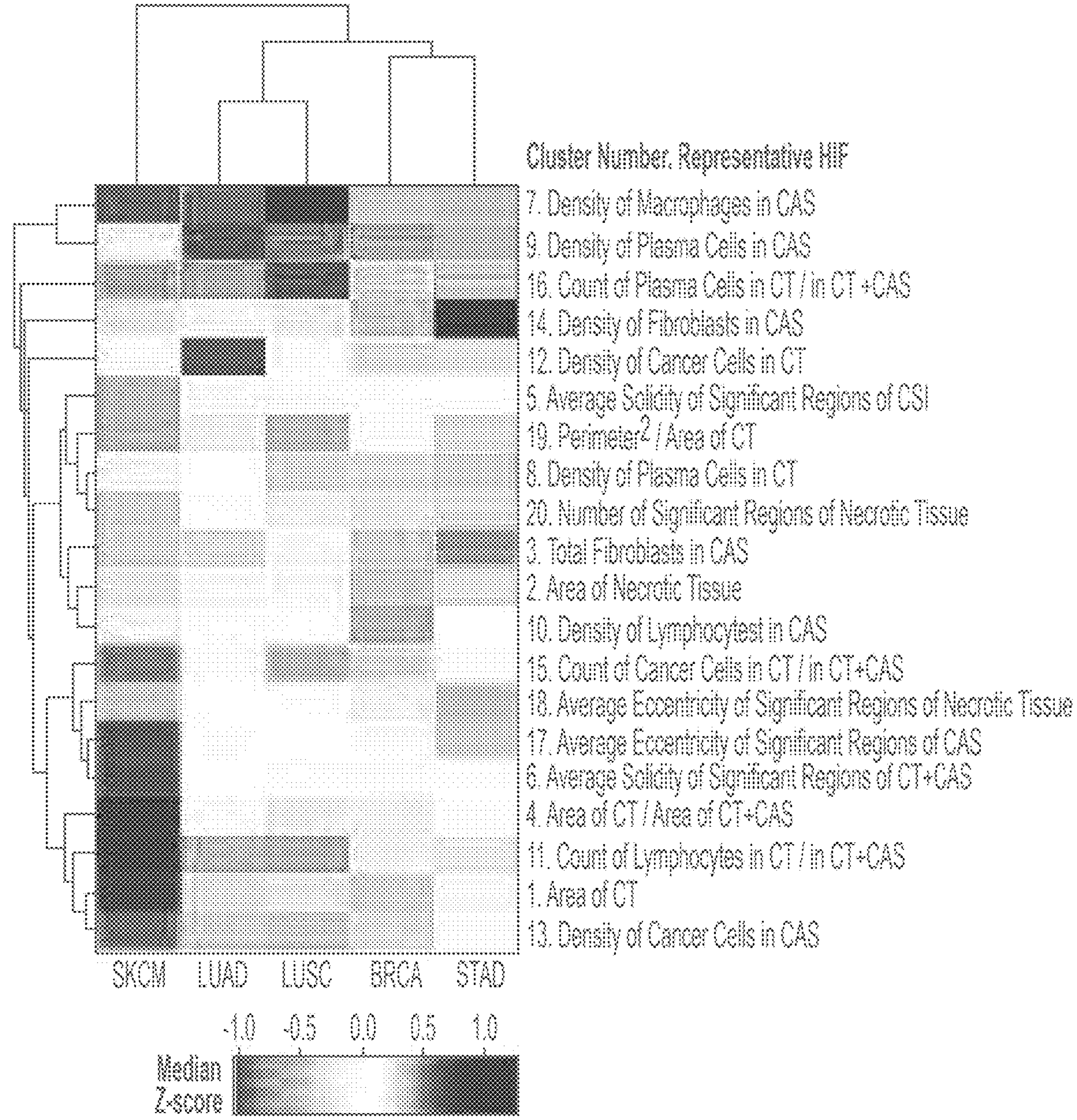

Cancer type differences could be traced to specific and interpretable cell- and tissue-level features within the TME (FIG. 4B; Clustered heatmap of median Z-scores (computed pan-cancer) across cancer types for twenty HIFs, each representing one HIF cluster (defined pan-cancer). Hierarchical clustering was done using average linkage and euclidean distance. Clusters are annotated with a representative HIF chosen based on interpretability and high variance across cancer types). SKCM samples exhibited higher densities of cancer cells in cancer-associated stroma and greater cancer tissue area per slide relative to other cancer types. These findings reflect biopsy protocols for SKCM, in which the excised region involves predominantly cancer tissue and minimal normal tissue. NSCLC subtypes LUAD and LUSC exhibited higher densities of macrophages in cancer-associated stroma, reflecting the large population of macrophages infiltrating alveolar and interstitial compartments during lung inflammation. NSCLC subtypes also exhibited higher densities of plasma cells in cancer-associated stroma, in agreement with prior findings in which proliferating B cells were observed in ~35% of lung cancers. STAD exhibited the highest density of lymphocytes in cancer-associated stroma, corroborating prior findings which identified STAD as having the largest fraction of TIL-positive patches per WSI among thirteen TCGA cancer types, including the five examined thus far. Notably, HIFs are able to stratify cancer types by known histological differences without explicit tuning for cancer type detection.

HIFs are Concordant with Sequencing-Based Cell and Immune Marker Quantifications In some embodiments, to further validate the deep learning-based cell quantifications, the abundance of the same cell type predicted by the cell-type models were compared with those based on RNA sequencing. Image-based cell counts were correlated with sequencing-based cell quantifications across all patient samples and cancer types (pan-cancer) in one or more cell types, e.g., leukocyte fraction, lymphocyte fraction, and plasma cell fraction. Notably, perfect correlation is not expected as tissue samples used for RNA sequencing and histology imaging are extracted from different portions of the patient's tumor, and thus vary in TME due to spatial heterogeneity.

Figure 5A:
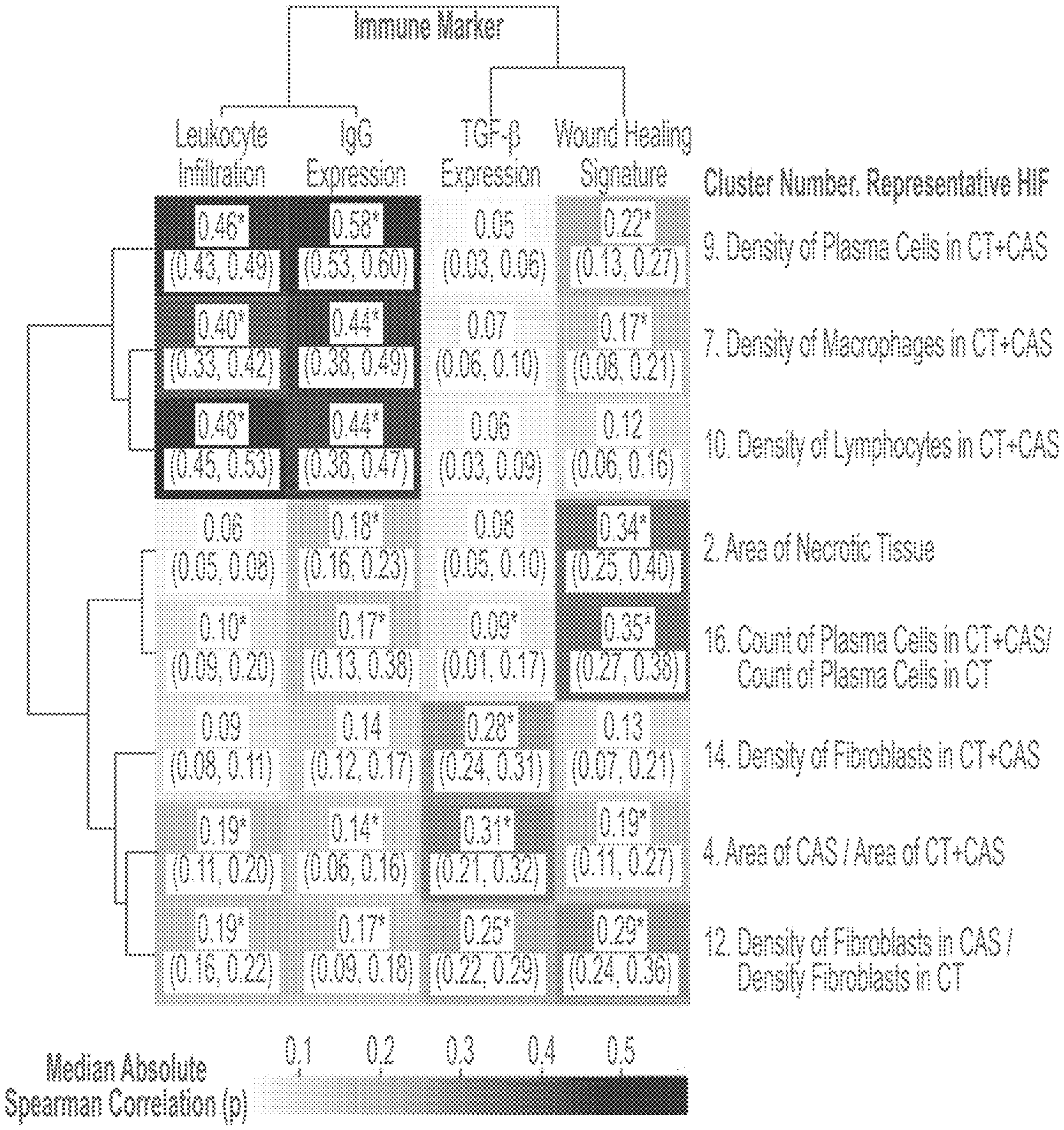
FIGS. 5A-5C-4 show aspects of validation of human-interpretable image features against immune markers, in accordance with some embodiments of the technology described herein.

The inventors discovered there is significant correlation structure among individual HIFs due to the process by which feature sets are generated, as well as inherent correlations in the underlying biological phenomena. For example, proportion, density, and spatial features of a given cell or tissue type all rely on the same underlying model predictions. In order to identify mechanistically-relevant and inter-correlated groups of HIFs, hierarchical agglomerative clustering was conducted (Methods). This clustering also enables more accurate multiple-hypothesis-testing corrections, which account for feature correlation. Pan-cancer HIF clusters strongly correlated with immune markers of leukocyte infiltration, IgG expression, TGF-β expression, and wound healing (FIG. 5A; Clustered heatmap of median absolute Spearman correlation coefficients (ρ) computed across all patient samples between eight HIF clusters (defined pan-cancer) and four canonical immune markers. Hierarchical clustering was done using average linkage and euclidean distance. Median absolute Spearman correlation coefficients with a combined (via the Empirical Brown's method) and corrected (via the Benjamini-Hochberg procedure) P value lower than the machine precision level ($1\times10^{-30}$) are annotated with an asterisk. Tumor regions include cancer tissue (CT), cancer-associated stroma (CAS), and a combined CT+CAS), each quantified by scoring bulk RNA sequencing reads for known immune expression signatures. The same correlational analysis was conducted for each cancer type individually, and high concordance was observed among the top-correlated HIF clusters per immune marker.

Figure 5B:
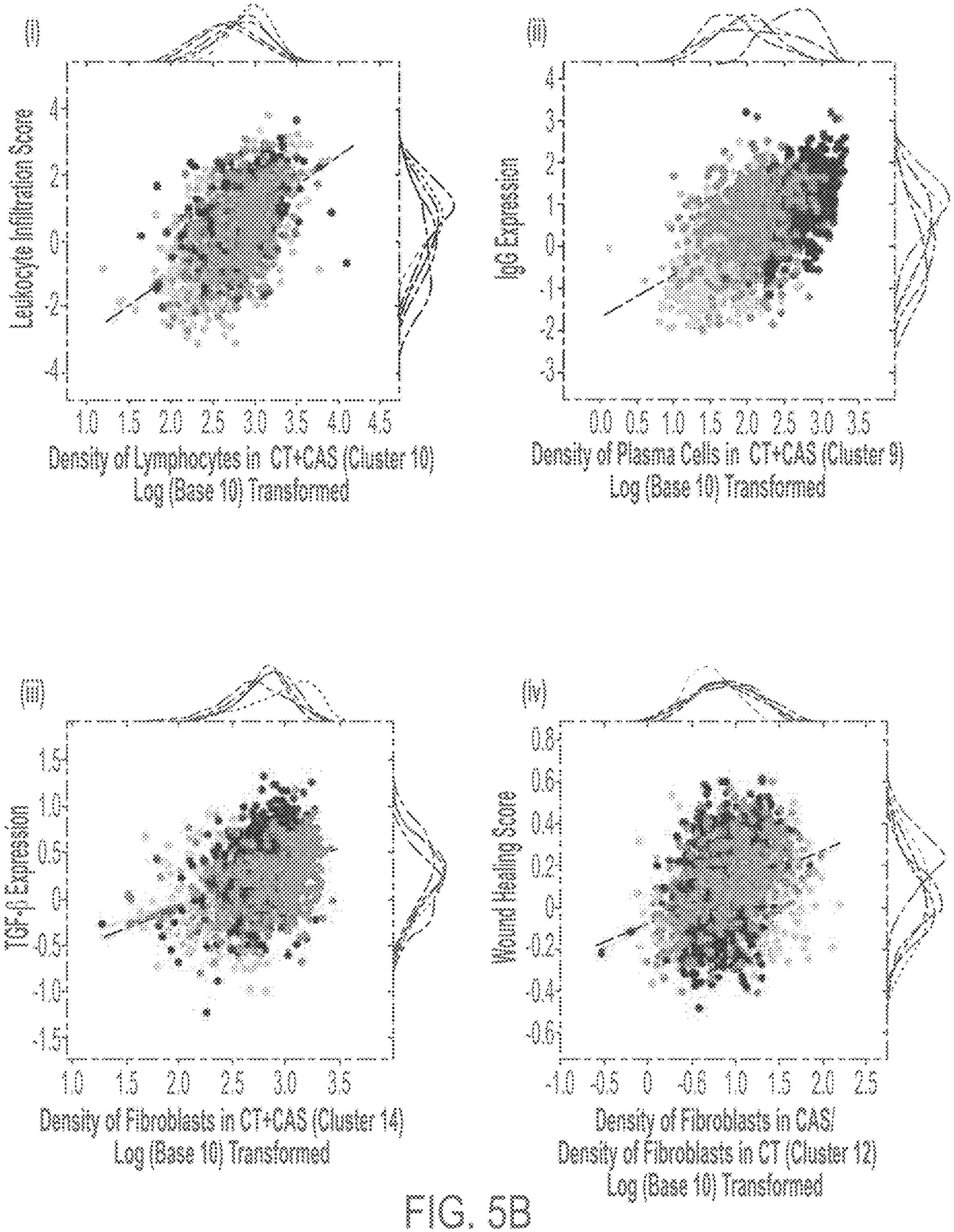
Figure 5C:
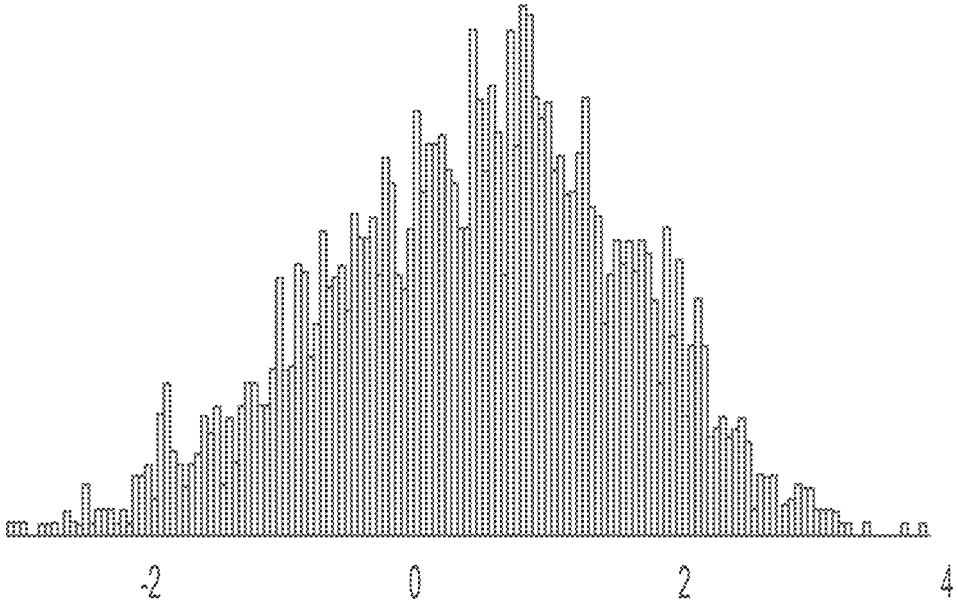
Figure 1:
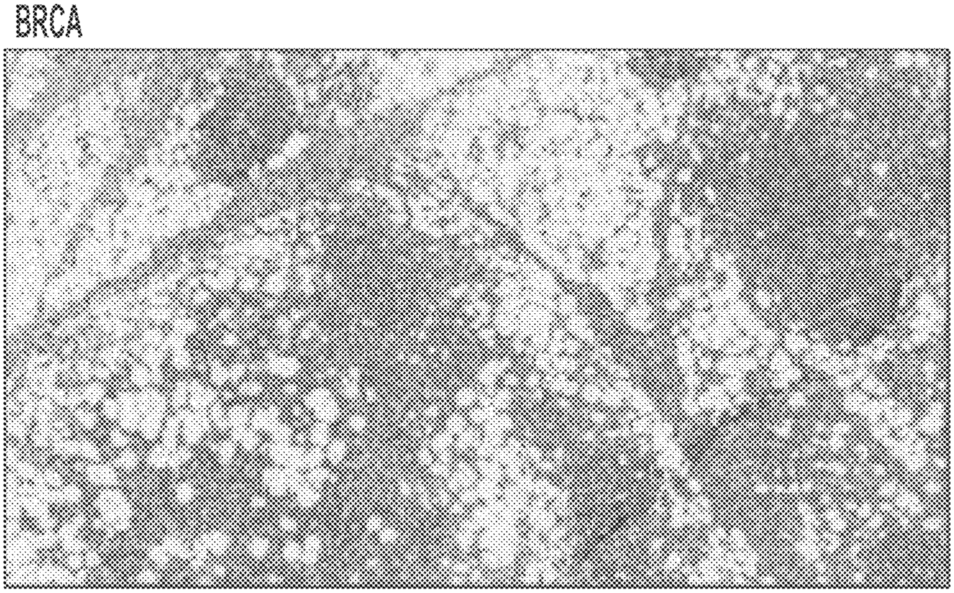
Figure 5C:
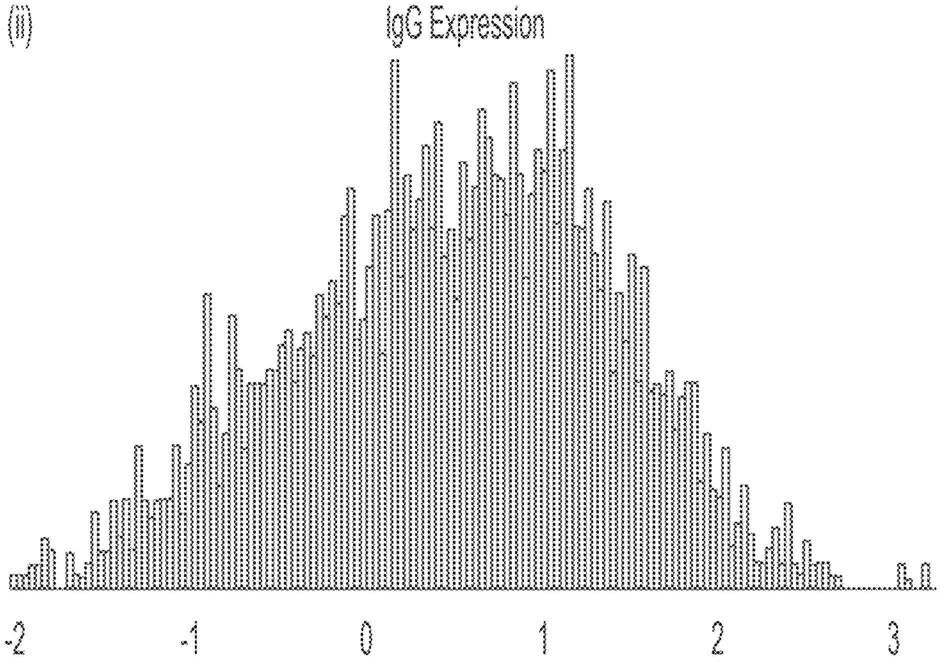
Figure 2:
Figures 3, 5C:
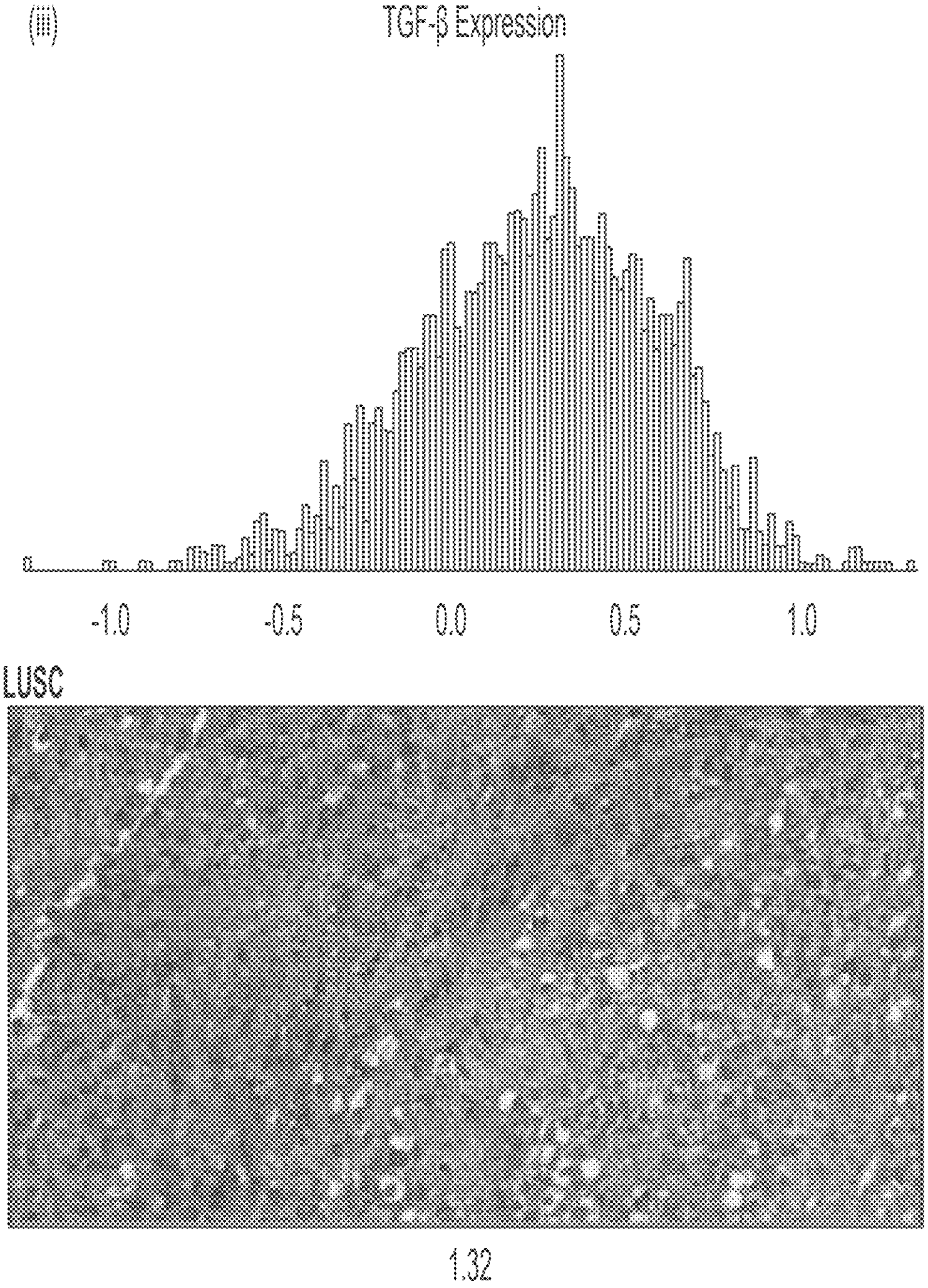
Figure 5C:
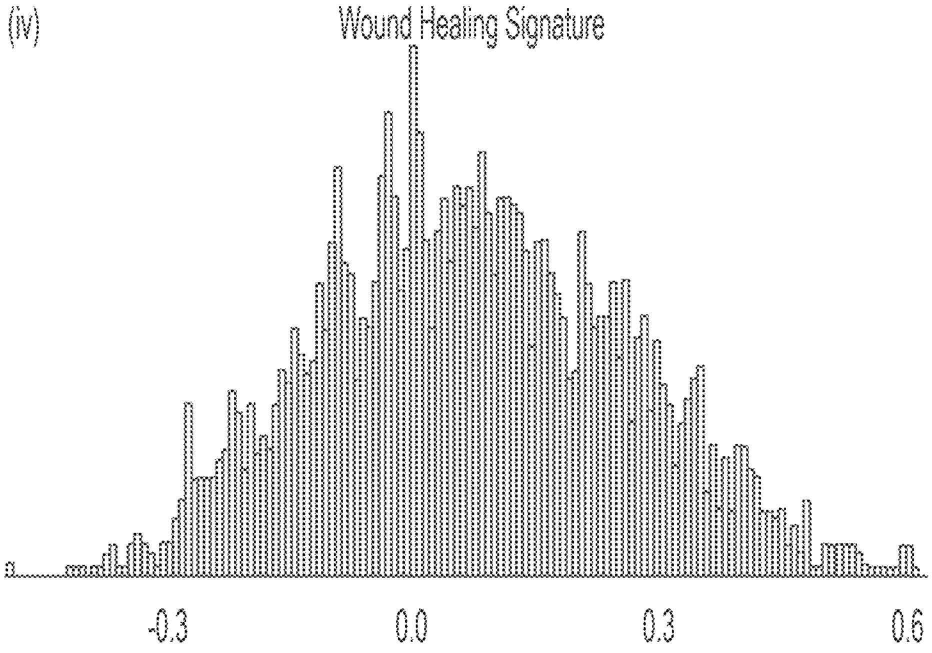
Figure 4:

Molecular quantification of leukocyte infiltration was concordant with the density of leukocyte-lineage cells in cancer tissue plus cancer-associated stroma (CT+CAS) quantified by the deep learning pipeline (FIG. 5B; Correlation and kernel density estimation plots between representative HIFs and immune markers. Points are colored by cancer type. X-axes are log-transformed (base ten). Trendlines are plotted on the log-transformed data. Cell densities are reported in count/$mm^2$ and tissue areas are reported in $mm^2$, including lymphocytes (FIG. 5B i), plasma cells, and macrophages. Similarly, associations were observed between IgG expression and the density of leukocyte-lineage cells in CT+CAS, with plasma cells being the most strongly correlated, given their role in producing immunoglobulins (FIG. 5B ii). TGF-β expression was associated with the density of fibroblasts in CT+CAS (FIG. 5B iii), building upon prior studies which found that TGF-β1 can promote fibroblast proliferation. TGF-β expression was also correlated with the area of cancer-associated stroma relative to CT+CAS, shedding further light on the role of stromal proteins in modulating TGF-β levels. Wound healing signature was positively associated with the density of fibroblasts in cancer-associated stroma versus in cancer tissue (FIG. 5B iv), which corroborates findings that both tumors and healing wounds alike modulate fibroblast recruitment and proliferation to facilitate extracellular matrix deposition. H&E snapshots corresponding to high expression of each of the four immune markers are shown in FIGS. 5C-1-5C-4 with corresponding cell-type heatmaps overlaid (FIGS. 5C-1-5C-4; Histogram of immune marker expression (Z-score) across all patients, alongside an H&E snapshot with its cell-type heatmap overlaid corresponding to high expression of the given immune marker. Cell-type heatmaps adhere to the same color scheme described in FIG. 1C).

HIFs are Predictive of Clinically-Relevant Phenotypes

In some embodiments, to evaluate the capability of HIFs to predict expression of clinically-relevant, immuno-modulatory genes, supervised prediction of binarized classes for five clinically-relevant phenotypes was conducted: (1) programmed cell death protein 1 (PD-1) expression, (2) PD-L1 expression, (3) cytotoxic T-lymphocyte-associated protein 4 (CTLA-4) expression, (4) HRD score, and (5) T cell immunoreceptor with Ig and ITIM domains (TIGIT) expression (FIGS. 6A-1-6B-2), but the described systems and methods are not so limited. In an illustrative example, using the HIFs computed per WSI, predictions were conducted for cancer types individually as well as pan-cancer. SKCM predictions were conducted only for TIGIT expression due to insufficient sample sizes for the remainder of outcomes (Methods). To demonstrate model generalizability across varying patient demographics and sample collection processes, area under the receiver operating characteristic (AUROC) and area under the precision-recall curve (AUPRC) performance metrics were computed on hold-out sets composed exclusively of patient samples derived from tissue source sites not seen in the training sets.

HIF-based models may not be predictive for every phenotype in each cancer type. In the successful prediction models (e.g., hold-out AUROC range=0.601-0.864; FIGS. 6A-1-6B-2), precision-recall curves revealed that models were robust to class-imbalance, achieving AUPRC performance surpassing positive class prevalence by 0.104-0.306 (FIGS. 6A-1-6A-2; ROC curves for (i) PD-1, (ii) PD-L1, (iii) CTLA-4, (iv) HRD, and (v) TIGIT hold-out predictions across cancer types and pan-cancer. SKCM predictions were conducted only for TIGIT due to low sample sizes. Pan-cancer predictions use binary labels thresholded independently by cancer type. For TIGIT predictions, pan-cancer includes all five cancer types. For the remainder of predictions, pan-cancer includes all cancer types excluding SKCM. Random classifiers correspond to AUROC=0.50). Notably, AUROC performance of the HIF-based linear model for PD-L1 expression in LUAD was comparable to that achieved by "black-box" deep learning models trained on hundreds of thousands of paired H&E and PD-L1 example patches in NSCLC.

Predictive HIFs Provide Interpretable Link to Clinically-Relevant Phenotypes

In some embodiments, interpretable features may enable interrogation and further validation of model parameters as well as generation of new biological hypotheses. Towards this end, in some embodiments, for each prediction task the five most important HIF clusters were identified, as determined by magnitude of model coefficients (FIGS. 6B-1-6B-2; Visualization of predictive HIFs for each molecular phenotype. Boxplots show the top five most predictive HIF clusters for each phenotype in pan-cancer models. For TIGIT predictions, pan-cancer models only included three non-zero HIF clusters. Clusters are ranked by the maximum absolute ensemble beta across HIFs in a given cluster. Ensemble betas are computed per HIF as the average across the three models incorporated into the final ensemble evaluated on the hold-out set. Each boxplot highlights the median and interquartile range for ensemble betas in each cluster. Each cluster is labeled with a representative HIF corresponding to the maximum absolute ensemble beta value. In cases where that HIF is difficult to interpret, a more interpretable HIF within a five-fold difference of the maximum ensemble beta is presented (indicated by a black asterisk). As absolute values were used for ranking, HIFs with negative ensemble betas are denoted by a red asterisk. Radar charts show the normalized magnitude of ensemble betas in pan-cancer models stratified across nine HIF axes, corresponding to the five cell types, three tissue types, and CSI. Normalized magnitudes were computed as the sum of absolute ensemble betas for HIFs associated with each axis divided by the total number of HIFs associated with said axis (e.g. all HIFs involving fibroblasts). Multiple predictive HIFs are visualized with overlaid cell- or tissue-type heatmaps in FIGS. 3A-3F. Tumor regions include cancer tissue (CT), cancer-associated stroma (CAS), and a combined CT+CAS) and computed cluster-level P-values to evaluate significance (Methods).

Figures 1, 6A:
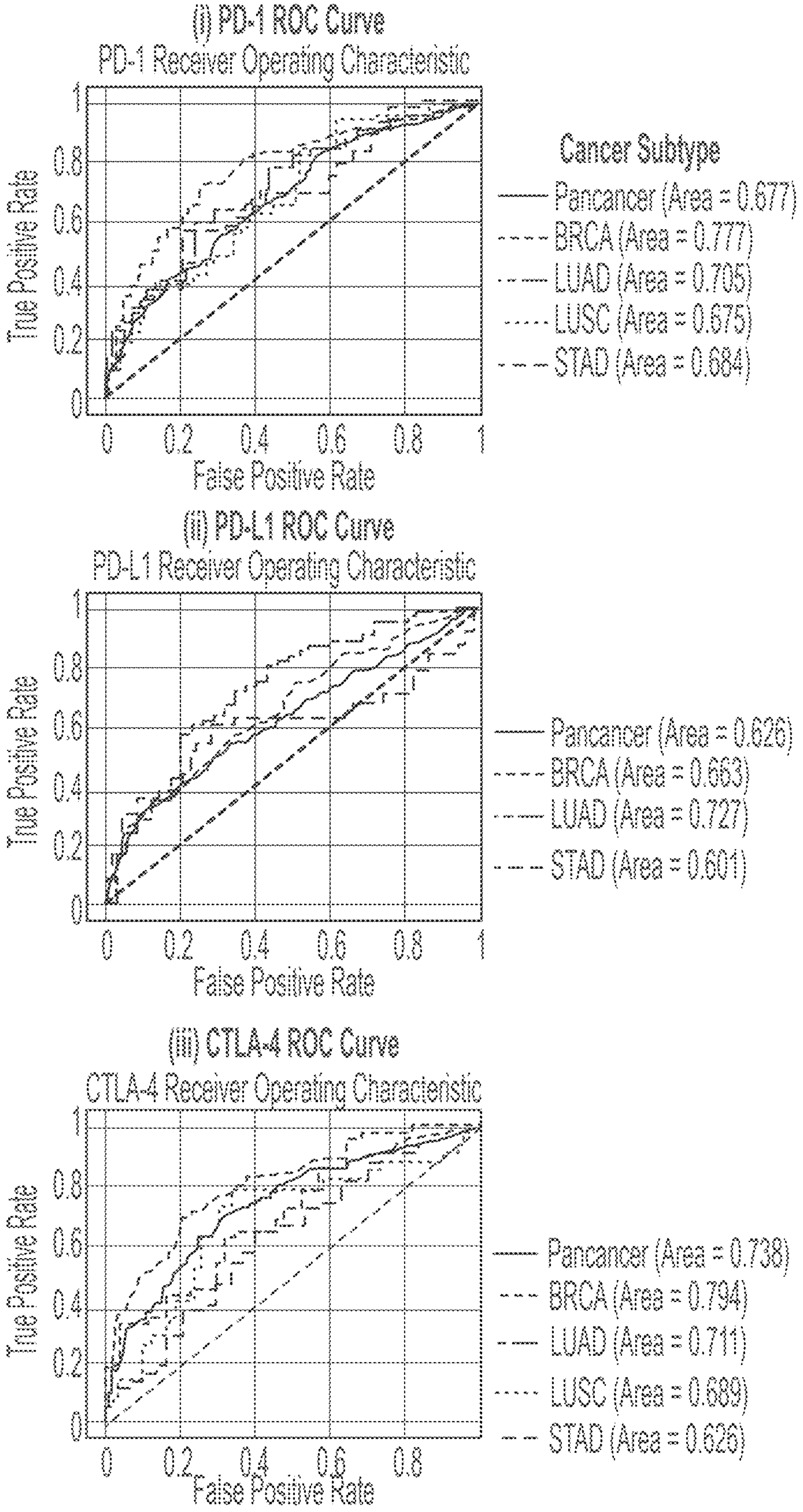
Figures 2, 6A:
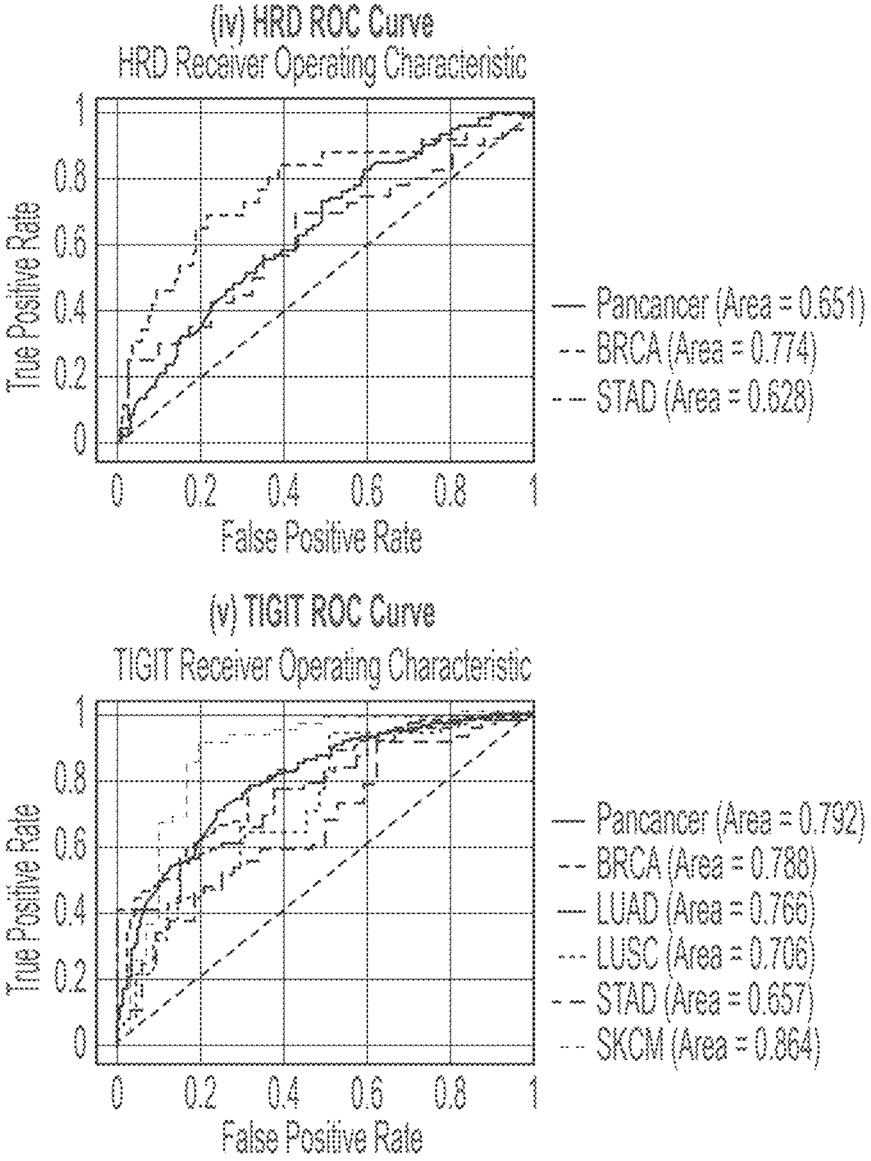
Figures 1, 6B:
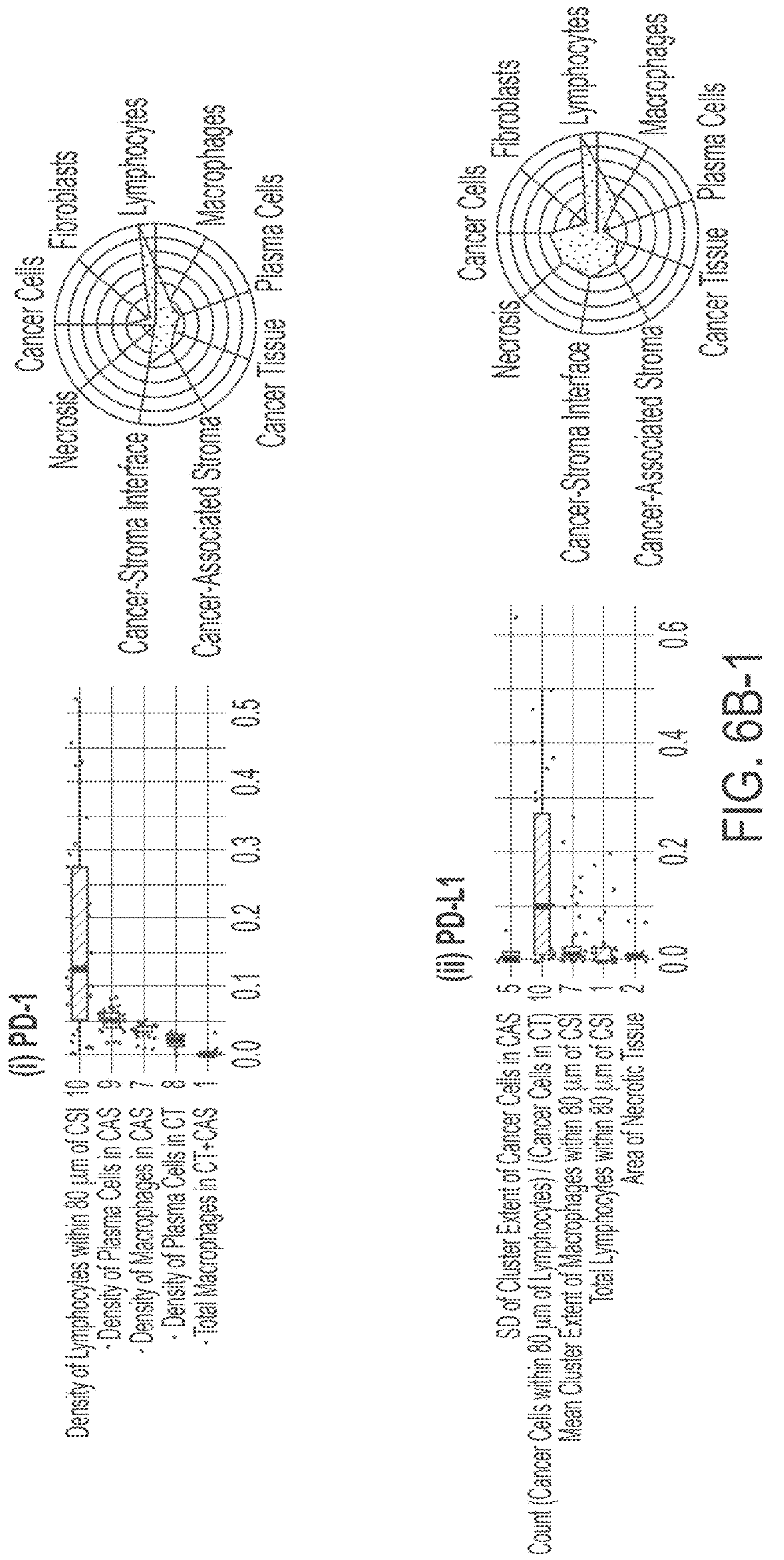
Figures 2, 6B:
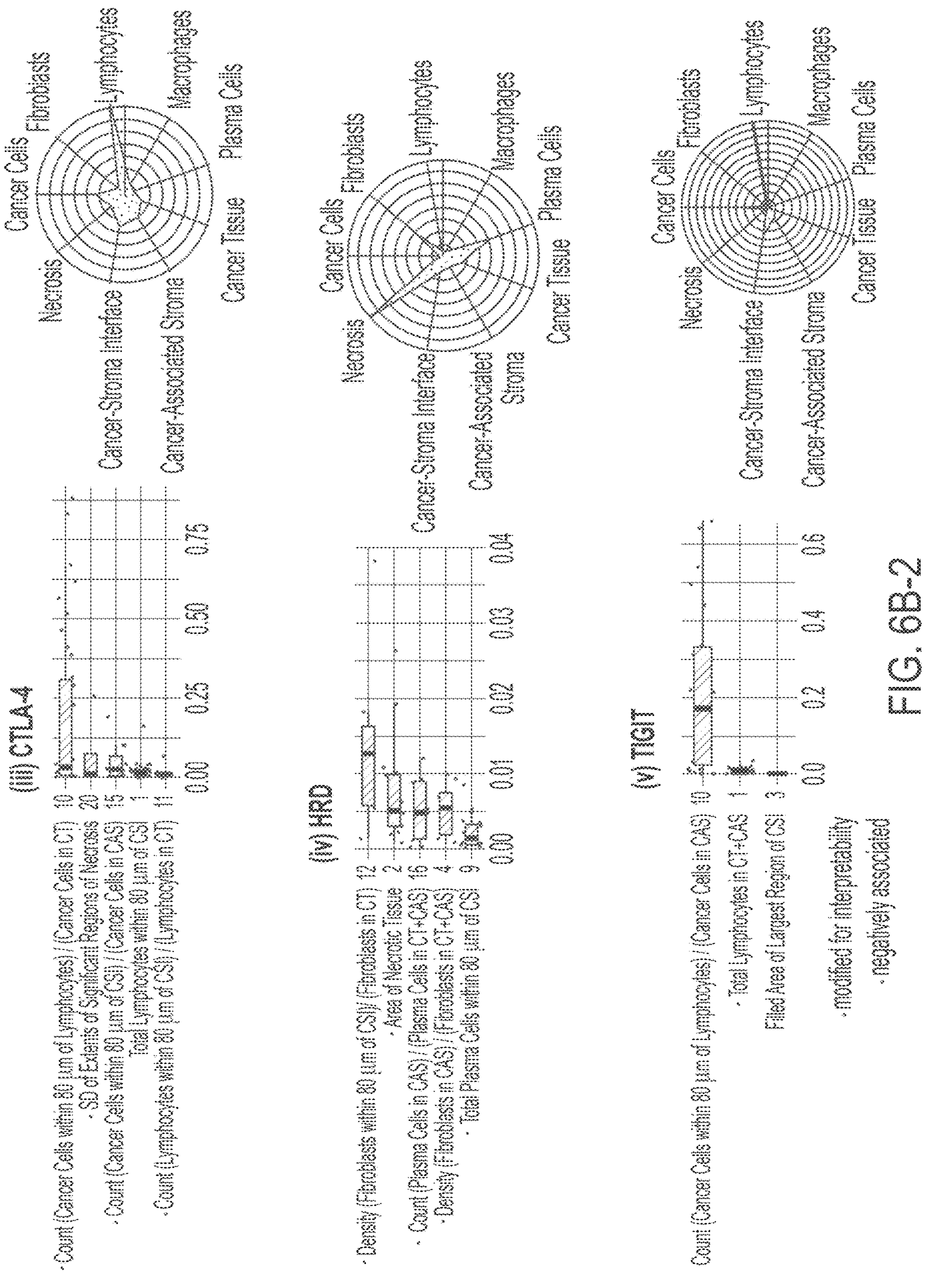

The inventors appreciated that prediction of PD-1 and PD-L1 involved similar HIF clusters. For example, the extent of tumor inflammation, as measured by the count of cancer cells within 80 μm of lymphocytes, as well as the density of lymphocytes in CT+CAS, was significantly selected during model fitting for both of PD-1 and PD-L1 expression in pan-cancer and BRCA models (FIG. 6B-1 i-ii). Furthermore, in both LUAD and LUSC, the count of lymphocytes in CT+CAS was similarly predictive of PD-1 and PD-L1 expression. The importance of these HIFs which capture lymphocyte infiltration between and surrounding cancer cells corroborates prior literature which demonstrated that TILs correlated strongly with higher expression levels of PD-1 and PD-L1 in early breast cancer and NSCLC.

The area, morphology, or multiplicity of necrotic tissue proved predictive of PD-1 expression in LUAD, LUSC, and STAD models and of PD-L1 expression in pan-cancer, BRCA, and LUAD models, expanding upon prior findings that tumor necrosis correlated positively with PD-1 and PD-L1 expression in LUAD. The density, proximity, or clustering properties of plasma cells was predictive of PD-1 expression in all models excluding LUAD, suggesting a role for plasma cells in modulating PD-1 expression. Recent studies in SKCM, renal cell carcinoma, and soft-tissue sarcoma have demonstrated that an enrichment of B-cells in tertiary lymphoid structures was positively predictive of response to immune checkpoint blockade therapy. The density of fibroblasts in cancer-associated stroma or within 80 μm of the CSI was predictive of PD-L1 expression in LUAD and STAD, respectively, corroborating earlier discoveries that cancer-associated fibroblasts promote PD-L1 expression.

Less is known about the relationship between the TME and CTLA-4 expression. By investigating predictive HIFs, features of the TME that correlate with CTLA-4 expression can be enumerated. The proximity of lymphocytes to cancer cells (pan-cancer and BRCA), morphology of necrotic regions (LUAD and LUSC), and density of cancer cells in CT+CAS versus exclusively in cancer-associated stroma (BRCA and STAD) were predictive of CTLA-4 expression across multiple models (FIG. 6B-2 iii).

Area of necrotic tissue (pan-cancer and BRCA) as well as various morphological properties of necrotic regions including perimeter and lacunarity (BRCA and STAD) were predictive of HRD (FIG. 6B-2 iv). In HRD, ineffective DNA damage repair can result in the accumulation of severe DNA damage and subsequent cell death through apoptosis as well as necrosis. The density and count of fibroblasts near or in cancer-associated stroma was also predictive of HRD in the pan-cancer and BRCA models, corroborating prior findings that persistent DNA damage and subsequent accumulation of unrepaired DNA strand breaks can induce reprogramming of normal fibroblasts into cancer-associated fibroblasts.

Like the three other immune checkpoint proteins (PD-1, PD-L1, and CTLA-4), TIGIT expression was also associated with markers of tumor inflammation, including the count of cancer cells within 80 μm of lymphocytes (pan-cancer and BRCA), the total number of lymphocytes in CT+CAS (pan-cancer and BRCA), and the proportional count of lymphocytes to cancer cells within 80 μm of the CSI (LUAD) (FIG. 6B-2 v). These findings corroborate prior findings that TIGIT expression, alongside PD-1 and PD-L1 expression is correlated with TILs. HIF clusters capturing morphology and architecture of necrotic tissue (e.g. fractal dimension, lacunarity, extent, perimeter$^2$/area) were associated with TIGIT expression in LUAD, LUSC, SKCM, and STAD models, although these relationships have yet to be investigated.

Discussion

The inventors' study is the first to demonstrate the value of combining deep learning-based cell- and tissue-type classifications to compute image features that are both biologically-relevant and human-interpretable. The inventors demonstrate that computed HIFs can recapitulate sequencing-based cell quantifications, capture canonical immune markers such as leukocyte infiltration and TGF-β expression, and robustly predict five molecular phenotypes relevant to oncology treatment efficacy and response, but the described systems and methods are not so limited. The inventors also demonstrate the generalizability of the associations, as evidenced by similarly predictive HIF clusters across biopsy images derived from five different cancer types. While prior studies have applied deep learning methodologies to capture cell-level information, such as the spatial configuration of immune and stromal cells, or tissue-level information alone, the combined cell plus tissue approach enables quantification of increasingly complex and expressive features of the TME, ranging from the mean cluster size of fibroblasts in cancer-associated stroma to the proximity of TILs or cancer-associated fibroblasts to the CSI. By training models to make six-class cell-type and four-class tissue-type classifications, the inventors' approach is also able to aggregate more layers of information than prior studies, but the described systems and methods are not so limited. Indeed, while TILs are emerging as a promising biomarker in solid tumors such as triple-negative and HER2-positive breast cancer, TILs differ from stromal lymphocytes, and substantial signal can be obtained by considering multiple cell-tissue combinations.

The inventors' approach of exhaustively generating cell- and tissue-type predictions across entire WSIs at a spatial resolution of two and four μm, respectively is novel and improves upon previous tiling approaches that downsample the image and subsequently remove valuable information. However, the described systems and methods are not so limited and may be equally applicable at other spatial resolutions. The tissue visible in a WSI is already only a fraction of the tumor itself, and using the entire slide (rather than selected tiles) reduces the probability of fixating on non-generalizable local effects and enables quantification of complex characteristics that span multiple tissue regions (e.g. multiplicity, solidity, and fractal dimension of significant necrotic regions).

In addition, the inventors' approach of capturing specific and interpretable features of the tumor and its surroundings can facilitate hypothesis generation and enable a deeper understanding of the TME's influence on drug response. Indeed, recent studies provide evidence that tumor immune architecture can greatly dictate clinical efficacy of immune checkpoint inhibitor and poly (ADP-ribose) polymerase (PARP) inhibitor therapies.

Lastly, during both model development and evaluation, the inventors sought to emphasize robustness to real-world variability. In particular, the WSIs were supplemented with additional diverse datasets during CNN training, pathologist feedback was integrated into model iterations, and HIF-based model performance was evaluated on hold-out sets composed exclusively of samples from unseen tissue source sites, improving upon prior approaches to predicting molecular outcomes from the H&E images, One limitation of machine-learning approaches can be the quality of training data. While the cell and tissue classification models can be trained on a combination of datasets, molecular associations and predictions may be derived solely from TCGA. Biopsy images submitted to the TCGA dataset suffer from selection bias towards more definitive diagnoses and early-stage disease that may not generalize well to ordinary clinical settings. Moreover, the images only contain H&E staining, which can limit the amount of information available. It is possible that integrating multi-modal data containing stains against Ki-67 or immunohistological targets may increase confidence in cell classifications. In addition to the quality of slide images, annotations are also variable in reliability. Macrophages are particularly difficult for pathologists to identify solely under H&E staining. While the accuracy of an individual pathologist identifying macrophages may be poor, the models described herein represent a consensus across hundreds of pathologist annotators which may carry a more reliable signal.

Furthermore, morphologically similar cells (e.g. macrophages, dendritic cells, endothelial cells, pericytes, myeloid derived suppressor cells, and atypical lymphocytes) may all be captured under a single cell-type prediction. Thus, HIFs may, in reality, capture information about a mixture of cell types. For example, in diffuse forms of STAD in which cancer cells invade smooth muscle tissue, the models may misclassify certain smooth muscle cells as fibroblasts. Therefore, fibroblast-label HIFs may reflect a mixture of these two cell types in STAD, limiting interpretability. Iterative model training coupled with pathologist evaluation could have mitigated but likely not eliminated this cell type confusion. Nonetheless, these features were recurrently selected for prediction of PD-L1 and CTLA-4 expression in STAD, possibly demonstrating robustness to misclassification noise. The accuracy of the model predictions can be sufficiently robust depending on that computed HIFs correlate with the true underlying features.

These interpretable sets of HIFs, computed from, e.g., tens-of-thousands of deep learning-based cell- and tissue-type predictions per patient, may be central to the value of HIF-based models. Such models improve upon conventional "black-box" approaches which apply deep learning directly to WSIs, yielding models with millions of parameters and limited interpretability. Recent findings have revealed the weaknesses of low-interpretability models, including brittleness to dataset shift, vulnerabilities to adversarial attack, and susceptibility to the biases of the data-generative process. Beyond suggesting interpretable hypotheses for causal mechanisms (e.g. the anti-tumor effect of high lymphocyte density), the HIF-based approach can be continually validated at several points: pathologists can judge the quality of cell and tissue-type predictions, estimate the values of each relevant feature using traditional manual scoring, and observe whether there is a significant failure given real-world variability in sample preparation and quality. While "black-box" models may opaquely rely on features that are predictive but disconnected from the outcome of interest, such as tissue excision or preparation artifacts (e.g. surgical or pathologist markings), relationships underlying HIF-based predictions can be traced to specific variables, allowing model failures to be explained and addressed. While empirical performance is vitally important in clinical settings and additional studies comparing end-to-end and HIF-based approaches are needed, the improved trust and reliability against unexpected failures make HIF-based models a valuable, and potentially preferable, alternative.

Finally, the ability to predict molecular phenotypes directly from WSIs in an interpretable fashion has numerous potential benefits for clinical oncology. Hospitals, healthcare institutions, and pharmaceutical and biotechnology companies have decades of archival histopathology data captured from routine care and clinical trials. HIF-based models capable of capturing molecular information can supplement molecular assays that are often expensive and time-consuming, enable the discovery of novel patient sub-populations with specific disease processes and treatment susceptibilities, and generate hypotheses that can guide subsequent pre-clinical and clinical research.

Methods

Dense, High-Resolution Prediction of Cell and Tissue Types Using Convolutional Neural Networks In some embodiments, in order to compute histopathological image features for each slide, first cell and tissue predictions per WSI are generated. To this end, a network of board-certified pathologists was asked to label WSIs with both polygonal region annotations based on tissue type (cancer tissue, cancer-associated stroma, necrotic tissue, and normal tissue or background) and point annotations based on cell type (cancer cells, lymphocytes, macrophages, plasma cells, fibroblasts, and other cells or background). This collection of expert annotations was then used to train six-class cell type and four-class tissue-type classifiers.

Several steps were taken to ensure the accuracy and generalizability of the models described herein. First, it was important to recognize that common cell and tissue types, such as cancer-associated stroma or cancer cells, show morphological differences between BRCA, LUAD, LUSC, SKCM, and STAD. As a result, separate cell- and tissue-type detection models were trained for each of these five cancer types, for a total of ten models. Second, it was important to ensure that the models did not overfit to the histological patterns found in the training set. To avoid this, the data was split into training, validation, and test sets, and incorporated annotated slides of the same five cancer types into the model development process. Together, these datasets represented a wide diversity of examples for each class in each cancer type, thus improving the generalizability of these models beyond the TCGA dataset.

Using the combined dataset of annotated TCGA and additional WSIs, deep Convolutional Neural Networks (CNN) were trained to output dense pixelwise cell- and tissue-type predictions at a spatial resolution of two and four μm, respectively (e.g., spatial resolution dictated by stride). To ensure that the models achieved sufficient accuracy for feature extraction, models were trained in an iterative process, with each updated model's predictions visualized as heatmaps to be reviewed by board-certified pathologists. In heatmap visualizations, tissue regions were segmented and filled by different colors, while cell types were represented by different-colored squares. This process continued until there were minimal systematic errors and the pathologists deemed the model sufficiently trustworthy for feature extraction.

Pathologist Validation of Cell- and Tissue-Type Predictions

In some embodiments, during the CNN training process, three board-certified pathologists were asked to iteratively conduct subjective evaluation of model predictions to inform multiple rounds of training. CNN models were initially trained on a set of primary annotations collected from the pathologist network. Following the conclusion of each training round (defined by model convergence), predicted cell and tissue heatmaps were reviewed for systematic errors (e.g. overprediction of fibroblasts, macrophages, and plasma cells, underprediction of necrotic tissue). New annotations would then be collected from the pathologist network focusing on areas of improvement (e.g. mislabeled macrophages) to initiate a subsequent training round.

Tissue-Based Feature Extraction

In some embodiments, using the tissue-type predictions, different region-based features were extracted from each WSI. Each of these features belonged to one of three general categories.

The first category consisted of areas (e.g., n=13 HIFs). By simple pixel summation, the total areas (in $mm^2$) of cancer tissue, cancer-associated stroma, cancer tissue plus cancer-associated stroma, regions at the cancer-stroma interface, and necrosis in each slide were computed. These numbers represent prime examples of features that are interpretable and technically attainable by human pathologists, but would be prohibitively time-consuming and inconsistent across pathologists to calculate in practice.

The second category, which contributed the bulk of the features, made use of the publicly available scikit-image-.measure.regionprops module to find the connected components of each of these tissue types at the pixel-level using eight-connectivity. Once these connected components were found, a series of both library-provided and self-implemented methods were used to extract a series of morphological features (e.g., n=125 HIFs). These HIFs measured a wide variety of tissue characteristics, ranging from quantitative, size-based measures like the number of connected components, major and minor axis lengths, convex areas, and filled areas, to more qualitative, shape-based measures like Euler numbers, lacunarity, and eccentricity. Recognizing the log-distribution of connected component size, these features were computed not just across all connected components, but also for both the largest connected component only and across the most "significant" connected components, defined as components larger than 10% the size of the largest connected component. In aggregating metrics across considered components, both averages and standard deviations of HIFs were incorporated (e.g. standard deviation of eccentricities of significant regions of necrosis), to capture both summary metrics and metrics of intratumor heterogeneity.

The third category of features captures tissue architecture (e.g., n=25 HIFs). The fractal dimensions and solidity measures of different tissue types were calculated, capturing both the roundness and filled-ness of the tissue, under the hypothesis that the ability for these measures to separate different subtypes of lung cancer might translate to a similar ability to predict clinically-relevant phenotypes. In addition, these features allowed for capture of information about how tissue filled up space, rather than just the summative sizes and shapes captured by the first and second categories.

Cell- and Tissue-Based Feature Extraction

In some embodiments, after obtaining six-class cell-type predictions for each pixel of a WSI, generated five binary masks corresponding to each of the five specified cell types were generated. The cell- and tissue-level masks were combined to compute properties of each cell type in each tissue type (e.g. fibroblasts in cancer-associated stroma), extracting HIFs.

An initial group of features that were readily calculable from the model predictions included simple counts and densities of cell types in different tissue types. For example, an overlay of a particular slide's lymphocyte detection mask on top of the same slide's cancer-associated stroma mask could be used to calculate the number of TILs on a given slide. This number could then be divided by the area of cancer-associated stroma to find the associated density of TILs on the slide. By "taking the outer product" of cell and tissue types, a wide array of composite features can be derived. In particular, counts, proportions, and densities of cells across different tissue types were calculated (e.g. density of macrophages in cancer-associated stroma versus in cancer tissue), under the hypothesis that these measures capture information that raw counts could not. To capture information regarding cell-cell proximity and interactions, counts and proportions of each cell type were also calculated within an 80 μm radius of each other cell type (e.g. count of lymphocytes within an 80 μm radius of fibroblasts). Cell-level counts, densities, and proportions comprised 264 HIFs.

For each cell-tissue combination, the Birch clustering method was applied (e.g., as implemented in the sklearn.cluster Python module) to partition cells into clusters. To fit clustering structures as closely as possible to the spatial relationships found between cell types on the slide, a threshold of 100 was set, a branching factor of 10 was set, and the algorithm was allowed to optimize the number of clusters returned. The returned clusters were used to calculate a series of features designed to capture spatial relationships between individual cells types within a given tissue type, including number of clusters, cluster size mean and standard deviation (SD), within-cluster dispersion mean and SD, cluster extent mean and SD, the Ball-Hall Index, and Calinski-Harabasz Index (n=180 HIFs). For metrics where cluster exemplars were needed, the subcluster centers returned by the Birch algorithm were used.

Patient-Level Aggregation

In some embodiments, patients with multiple tissue samples were represented by the single sample with the largest area of cancer tissue plus cancer-associated stroma, computed during tissue-based feature extraction. All subsequent analyses were conducted at the patient level.

HIF Clustering

In some embodiments, due to underlying biological relationships as well as the HIF generation process, there is significant correlation structure between many of the features. This may present a challenge of feature selection as much of the information contained in one feature will also be present in another. It may also make it difficult to control for multiple hypothesis testing, because the underlying number of tested hypotheses is significantly fewer than the number of features computed.

To identify groups of correlated HIFs, features were clustered via hierarchical agglomerative clustering using complete linkage, a cluster cutoff of 0.95, and pairwise (1-absolute Spearman correlation) as the distance metric. A set of HIF clusters was defined for each cancer type independently, as well as another set for pan-cancer analyses. Clustering correlated features allows for summarizing the true underlying number of tested hypotheses.

Visualization of Cancer Types in HIF Space

In some embodiments, Uniform Manifold Approximation and Projection (UMAP) was applied for dimensionality reduction and visualization of patient samples from the HIF space into two dimensions (using parameters, such as number of neighbors=15, training epochs=500, distance metric=euclidean). The V-Measure was computed to compare BRCA, STAD, SKCM, and NSCLC (LUAD and LUSC combined) classes against clusters generated by K-means (k=4) applied to the 2-D UMAP projection. To quantify differences between cancer types, HIF values were normalized pan-cancer into Z-scores. Median Z-scores were then computed per cancer type across twenty HIFs, each representing one of twenty HIF clusters defined pan-cancer. Representative HIFs were selected based on subjective interpretability and high variance across cancer types. To determine the statistical significance of median Z-scores that were greater in one cancer type relative to others, P-values were estimated with the one-sided Mann-Whitney U-test, considering NSCLC subtypes LUAD and LUSC as one type.

Validation of HIFs Against Molecular Markers

To validate the ability of HIFs to capture meaningful cell- and tissue-level information, Spearman correlations between HIFs and four canonical immune markers from the PanImmune dataset were computed: (1) leukocyte infiltration, (2) IgG expression, (3) TGF-β expression, and (4) wound healing. Immune markers were quantified by mapping mRNA sequencing reads against gene sets associated with known immune expression signatures. To estimate the correlation between HIF clusters and immune markers, the median absolute Spearman correlation per cluster and combined dependent P-values associated with individual correlations via the Empirical Brown's method were computed. To control the false discovery rate, combined P-values per cluster were then corrected using the Benjamini-Hochberg procedure. Correlation analyses were conducted for cancer types collectively and individually, using HIF clusters defined across all cancer types for assessment of concordance.

In addition, image-based cell quantifications for leukocyte fraction, lymphocyte fraction, and plasma cell fraction were validated by Spearman correlation to their sequencing-based equivalents from matched TCGA tumor samples, computed using CIBERSORT. CIBERSORT (cell-type identification by estimating relative subsets of RNA transcripts) uses an immune signature matrix to deconvolve observed RNA-Seq read counts into estimates of relative contributions between 22 immune cell profiles.

Molecular Phenotype Label Curation

In some embodiments, PD-1, PD-L1, and CTLA-4 expression data for each cancer type were collected from the PanImmune dataset, while TIGIT expression data was collected from the National Cancer Institute Genomic Data Commons. PD-1, PD-L1, CTLA-4, and TIGIT expression levels were quantified from mapped mRNA reads against genes PDCD1, CD274, CTLA-4, and TIGIT, respectively, and normalized as Z-scores across all cancer types in TCGA. Homologous recombination deficiency (HRD) scores were collected from Knijnenburg et al. The HRD score was calculated as the sum of three components: 1) number of subchromosomal regions with allelic imbalance extending to the telomere, 2) number of chromosomal breaks between adjacent regions of least 10 Mb, and 3) number of loss of heterozygosity regions of intermediate size (>15 Mb, but <whole chromosome length). Continuous immune checkpoint protein expression and HRD scores were binarized to high versus low classes using gaussian mixture model (GMM) clustering with unequal variance. The binary threshold was defined as the intersection of the empirical densities between the two GMM-defined clusters. To evaluate the extent to which prediction tasks were correlated, Pearson correlation and percentage agreement metrics were computed pan-cancer (n=1,893 patients) between the five molecular phenotypes in continuous and binarized form, respectively.

Hold-Out Set Definition by TCGA Tissue Source Site

In some embodiments, TCGA may provide tissue source site information, which denotes the medical institution or company that provided the patient sample. For each prediction task (described below), a hold-out set was defined as approximately 20-30% of patient samples obtained from sites not seen in the training set. This validation methodology enables us to demonstrate model generalizability across varying patient demographics and tissue collection processes intrinsic to different tissue source sites.

Supervised Prediction of Molecule Phenotypes

In some embodiments, supervised prediction of binarized high versus low expression of five clinically-relevant phenotypes was conducted: (1) PD-1 expression, (2) PD-L1 expression, (3) CTLA-4 expression, (4) HRD score, and (5) TIGIT expression. Predictions were conducted pan-cancer as well as for cancer types individually. SKCM was excluded from prediction tasks 1-4 due to insufficient outcome labels (number of observations <100 for tasks 1-3; number of positive labels <10 for task 4). For each prediction task, a logistic sparse group lasso (SGL) model was trained and tuned by nested cross validation (CV) with three outer folds and five inner folds using the corresponding training set. SGL provides regularization at both an individual covariate (as in traditional lasso) and user-defined group level, thus encouraging group-wise and within group sparsity. The HIF clusters defined per cancer type and pan-cancer (previously described) were inputted as groups. HIFs were normalized to mean=0 and SD=1. In accordance with nested CV, hyper-parameter tuning was conducted using the inner loops and mean generalization error and variance were estimated from the outer loops. The three tuned models, each trained on two of the three outer folds and evaluated on the third outer fold, were ensembled by averaging predicted probabilities for final evaluation (reported in FIGS. 6A-1-6A-2) on the hold-out set. Hold-out performance was evaluated by AUROC and AUPRC. To identify predictive features, beta values from the three outer fold models were averaged to obtain ensemble beta values per HIF (see FIGS. 6B-1-6B-2 caption for more details).

Statistical Analysis

In some embodiments, to compute 95% confidence intervals for each prediction task, empirical distributions of AUROC and AUPRC metrics were generated, each consisting of 1000 bootstrapped metrics. Bootstrapped metrics were obtained by sampling with replacement from matched model predictions (probabilities) and true labels for the corresponding hold-out set, and re-computing AUROC and AUPRC on these two bootstrapped vectors. P-values for ensemble beta values of predictive HIFs were computed using a permutation test with 1000 iterations. During each iteration, labels in the training set were permuted and the previously described training process of nested CV and ensembling was re-applied to generate a new set of ensemble beta values per HIF. P-values for individual HIFs were then obtained by comparing beta values in the original ensemble model against the corresponding null distribution of ensemble beta values. Individual HIF P-values were combined into cluster-level P-values via the Empirical Brown's method and corrected using the Benjamini-Hochberg procedure.

Exemplary Implementation II—HIF-Based Approach for Predicting UC Severity

In some embodiments, one or more components of the method and system as described in Exemplary Implementation I may have variations for predicting other diseases, such as UC. In these variations, the statistical models as described in Implementation I may be trained and used for prediction in a similar manner, where the cell-type labels and tissue-type segmentations may be associated with UC disease (or severity). The human-interpretable features may also be associated with UC disease or severity. The details of training and prediction systems and methods for detecting UC disease are further described.

In some embodiments, the inventors have developed a suite of statistical models (e.g., machine learning models) that quantify high-resolution tissue- and cell-level information in WSI of H&E-stained colon biopsies. The inventors have shown that model-generated human-interpretable image features (HIFs) pertinent to UC disease activity show excellent correlation with consensus pathologist assessment of disease activity according to a reference scoring standard. For example, the reference scoring standard may include the NHI system, which may be used to evaluate model performance. The evaluation may focus on the presence or absence of active neutrophilic inflammation, as a primary criteria for evaluating response in clinical trials. The inventors have also shown that the extracted HIFs can be used as input to a statistical model (e.g., a random forest classifier) to assign slide-level NHI scores using HIFs that reflect active neutrophilic inflammation. The exemplary implementation described herein may enable automated and scalable prediction of NHI scores for UC disease with performance similar to subspecialty-trained pathologists. This machine learning-based assessment of HIFs can potentially be integrated as an aid to pathologists in clinical practice for standardized and efficient assessment of UC histopathology, and can provide a foundation for further analyses incorporating multimodal data for prognostication and/or prediction of response to specific therapies to better guide patient treatment decisions.

Methods

Data Set Characteristics

Figure 9A:
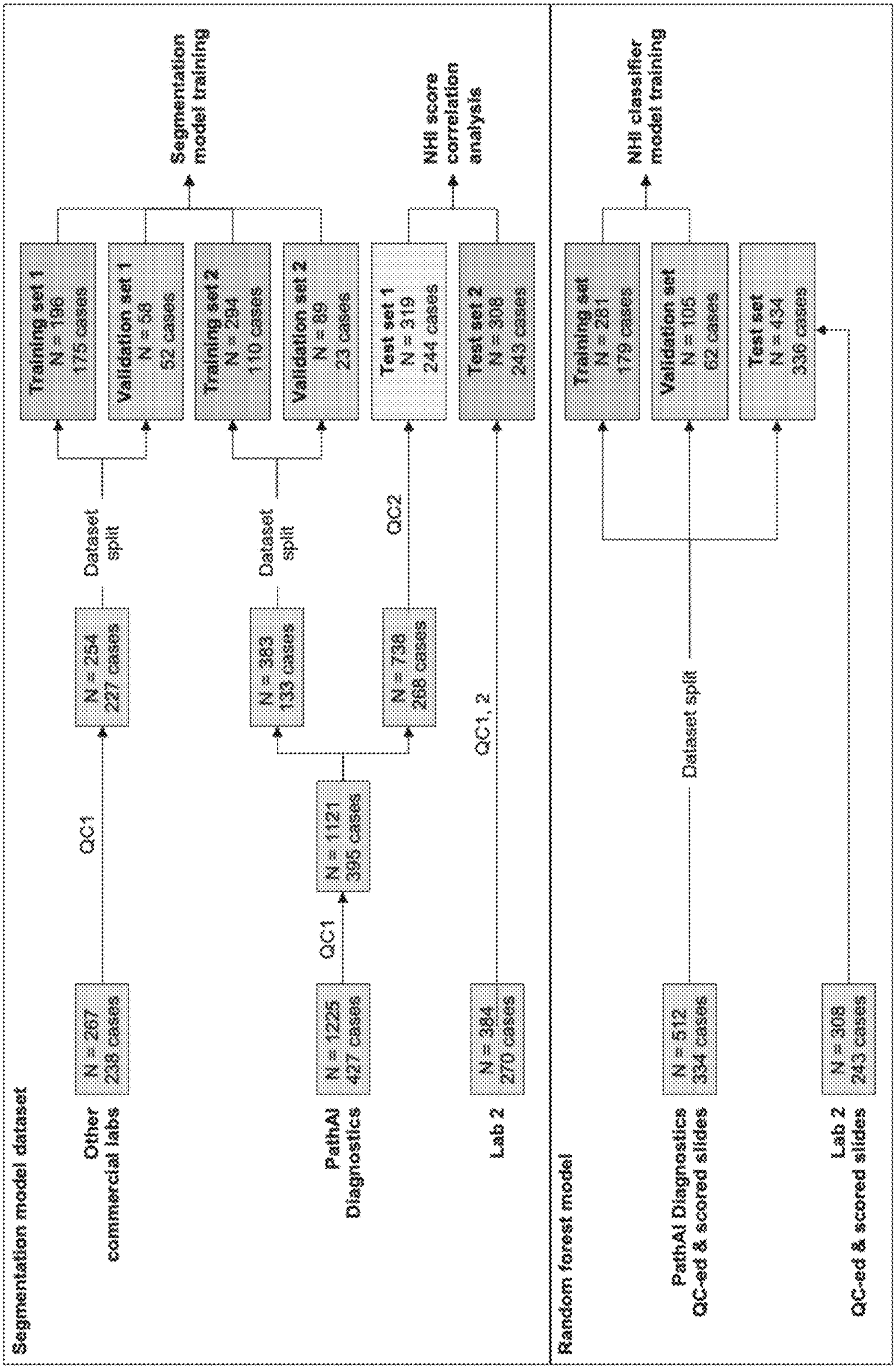
FIG. 9A shows example workflow diagrams of model development in accordance with some embodiments of the technology described herein. (Top) Tissue and cell model. (Bottom) Random forest classifier. QC1: quality control to remove poor quality slides (failed H&E staining, >10% area proportion of artifacts or <1% area proportion of usable tissue over total area, and/or the presence of ink at tissue edges on the slide). QC2: quality control to remove duplicate specimens and slides that do not achieve a consensus Nancy Histological Index (NHI) score.

For tissue and cell model training, hematoxylin and eosin (H&E)-stained WSI from consecutive cases (e.g., n=637) with a diagnosis of UC (based on pathology report or clinical metadata) were collected from PathAI Diagnostics ("Lab 1", FIG. 9A, e.g., n=383) and other commercial laboratories (e.g., n=254). The slides were scanned at 40× objective magnification using Aperio GT450 (e.g., 383 slides) and Aperio AT2 (e.g., 254 slides) scanners, resulting in WSI at 0.25 microns per pixel (mpp). The slides were then split into training (e.g., 490; 77%) and validation sets (e.g., 147; 23%) (FIG. 9A). For evaluation of model performance, the model was deployed on test sets comprising, e.g., an additional 319 held-out slides from the PathAI Diagnostics laboratory (e.g, 312 slides scanned using Aperio GT450 and 7 slides scanned using Aperio AT2 scanners; 0.25 mpp, e.g., n=319) and, for example, 308 slides from an additional, independent pathology laboratory ("Lab 2"; FIG. 9A), all scanned using Aperio AT2. For random forest model development, in some examples, 512 WSI from the PathAI Diagnostics laboratory were used, representing 334 cases. An additional 308 WSI representing 243 cases from Lab 2 were included in the test set (FIG. 9A).

H&E-stained WSI used in tissue and cell model development comprised left colon and rectum biopsies from, for example, 334 adult ulcerative colitis patients with various histologic patterns: normal colon (e.g., n=123), focal active colitis (e.g., n=17), inactive chronic colitis (e.g., n=154), or chronic colitis with mild (e.g., n=142), moderate (e.g, n=117), or severe (e.g, n=84) histologic activity. The held-out test set of WSI from the PathAI Diagnostics laboratory used for evaluation of tissue and cell model performance was comprised of slides representing normal colon (e.g., n=17), inactive chronic colitis (e.g., n=127), and chronic colitis with mild (e.g., n=67), moderate (e.g., n=65), or severe (e.g., n=43) histologic activity. H&E-stained WSI sourced from Lab 2 comprise left colon, right colon, and rectum biopsies from patients with the following diagnoses: normal colon (e.g., n=14), inactive chronic colitis (e.g, n=43), chronic colitis with mild (e.g, n=63), moderate (e.g, n=78), and severe (e.g, n=32) activity, and focal active colitis (e.g., n=64).

Machine Learning-Based Tissue and Cell Model Development

WSI were annotated by American Board of Pathology board-certified pathologists who routinely practice gastrointestinal pathology. In total, ~38,000 tissue-level region annotations and ~124,000 cell-level point annotations were collected. Using these annotations, the PathAI research platform was then applied to train a convolutional neural network with over 20 layers and 8 million parameters to produce pixel-level predictions of ulcerative colitis histology, in a similar manner as shown in FIG. 1A, with the difference being that the statistical model in step 3 may be trained to find relationships with UC severity, as described herein in the present disclosure and will be further described in the exemplary implementation.

Figure 10:
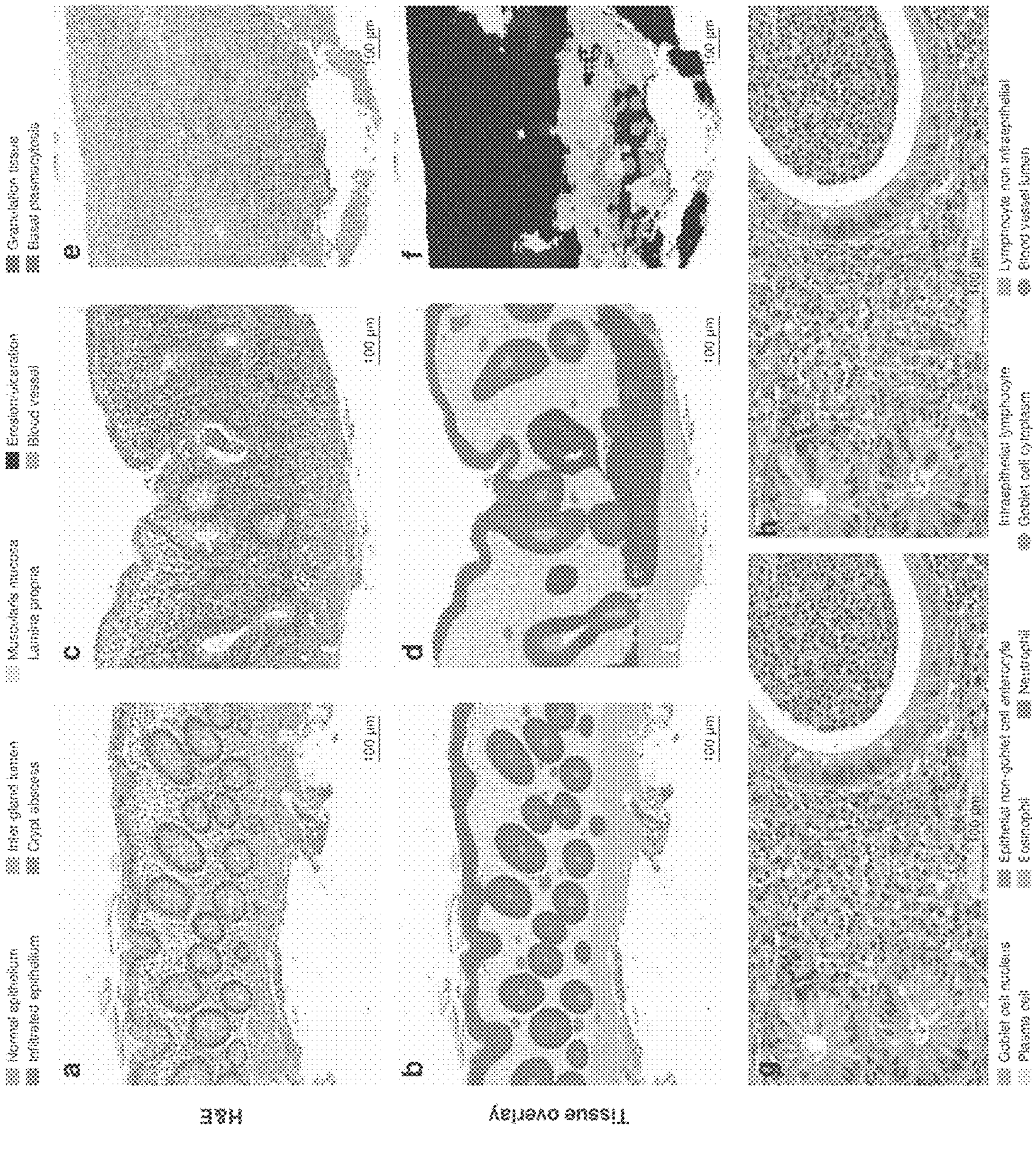
FIG. 10 shows representative fields from colon biopsies showing H&E images and corresponding model-generated tissue and cell overlays in accordance with some embodiments of the technology described herein. (a,b) H&E image and tissue overlay from normal colon (NHI 0, 10× magnification). (c,d) H&E image and tissue overlay from moderate chronic active colitis (NHI 3, 10× magnification). (e,f) H&E image and tissue overlay from severe chronic active colitis (NHI 4, 10× magnification). (g,h) H&E image and cell overlay from moderate chronic active colitis (NHI 3, 40× magnification).

Tissue models were developed to segment areas of normal epithelium, neutrophil-infiltrated epithelium, goblet cell cytoplasm, crypt abscess, inter-gland lumen, blood vessels, lamina propria, muscularis mucosa, basal plasmacytosis, erosion/ulceration, and granulation tissue. The models were also trained to recognize submucosal tissue and lymphoid aggregates (regardless of location), which were excluded from analysis. Cell labeling models were trained to identify neutrophils, plasma cells, intraepithelial lymphocytes, non-intraepithelial lymphocytes, eosinophils, goblet cell nuclei, and enterocytes. A separate class called "other cells" was provided to include cells other than the ones previously mentioned. Tissue and cell model predictions were then visualized as colored overlays on the WSI (FIG. 10).

To enhance model generalizability, image augmentation is performed by introducing varied brightness and contrast and altered image orientations. Model development was carried out in iterative cycles involving annotation collection, annotation quality control, model training, and performance review, and the best performing models were selected by tracking qualitative and quantitative performance metrics (e.g., accuracy, F1 score, loss values) across model iterations.

Slide Background and Artifact Exclusion

Most pixels in a whole slide image of colon biopsies contain background rather than tissue, and tissue-containing regions may contain sample preparation and imaging artifacts, including debris, tissue folds, and/or areas of poor focus. Both background and artifact-containing regions may be excluded from the analysis using an additional convolutional neural network (CNN) trained on multiple organs, which involved the existing tissue annotations and an additional ~10,000 artifact and background annotations to classify pixels as either slide background, tissue with artifact, or usable tissue. Slides that consist of >10% artifact or <1% usable tissue were manually reviewed by pathologists, and if deemed uninterpretable, were removed from the training dataset (indicated as the quality control "QC1" process in FIG. 9A). The tissue and cell models were used to extract features from usable tissue only.

Evaluation of Tissue and Cell Model Predictions of UC Histological Features

Quality control of the annotations was performed and tissue and cell overlays representing model predictions on H&E images on both training and validation slides were qualitatively reviewed. This qualitative review helped guide the iterative model development. To establish ground-truth for the cell model prediction accuracy, image patches 'frames' (320×320 pixels, ~80×80 μm for 40× scanned slides; n=134) were selected across different cell densities and tissue regions to ensure a representation of a range of cell distributions for each cell type. Exhaustive annotations were then collected from five pathologists to produce quantitative estimates of cell identity for epithelial cells, lymphocytes, plasma cells, eosinophils and neutrophils. After the annotations were collected, hierarchical clustering was performed on the pathologists' annotations and the model cell detection results in each frame to identify cell locations. The cluster radius threshold for each frame is defined by the average of five minimum annotation distances by each pathologist to account for different cell sizes in each frame. Clusters with only one annotation or only one predicted cell are excluded. To account for the variability and bias in pathologist annotations, in a non-limiting example, a Bayesian approach is used to estimate the true type of each cell using the pathologists' annotations as the input, which is further described with reference to FIG. 9B.

Figure 9B:
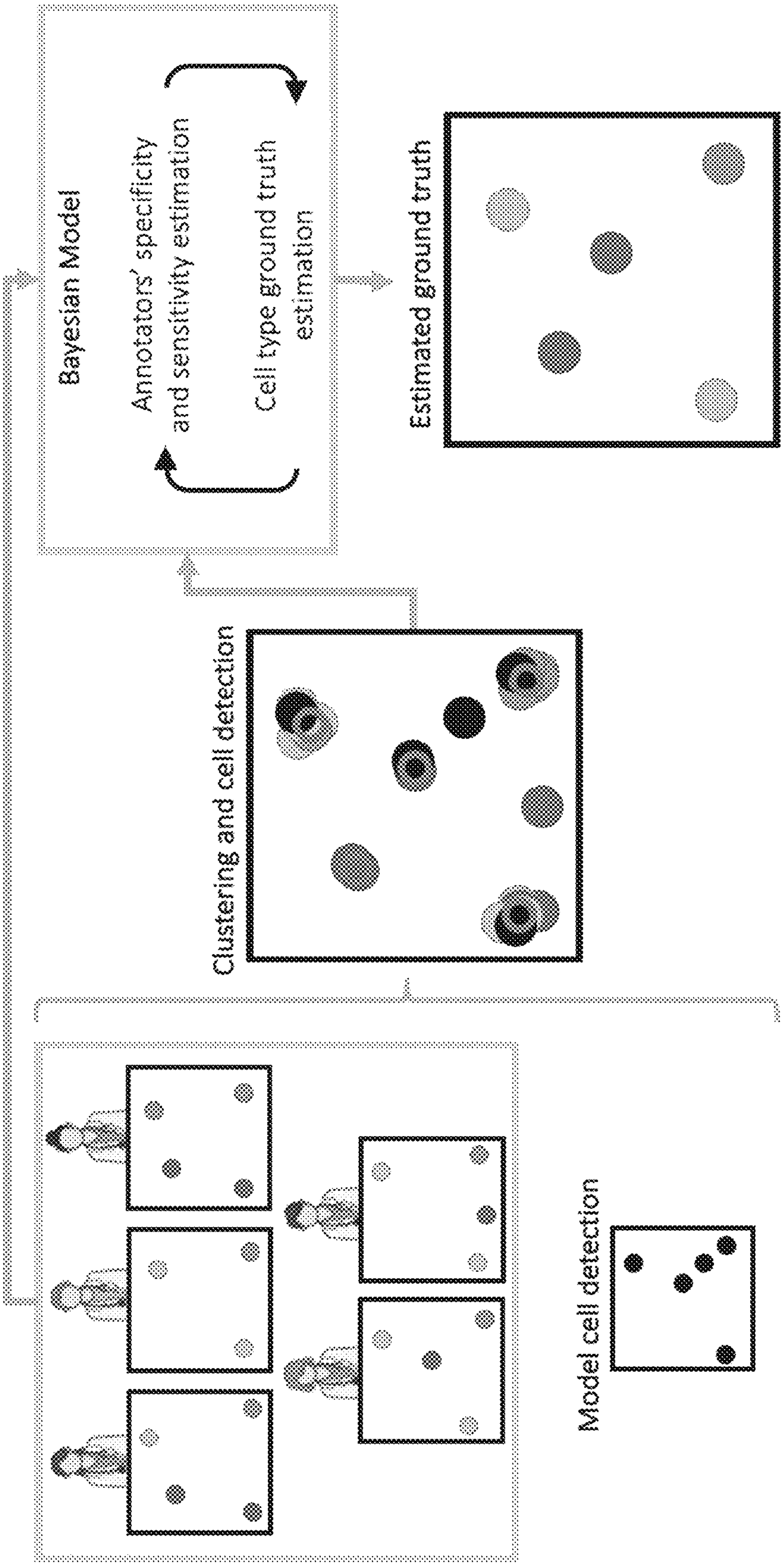
FIG. 9B shows a Bayesian-based cell frame analysis pipeline, in accordance with some embodiments of the technology described herein.

FIG. 9B shows a Bayesian-based cell frame analysis pipeline, in accordance with some embodiments of the technology described herein. Hierarchical clustering was first performed on all pathologists' annotations and the model cell detection results to locate true cells. For each detected true cell, a Bayesian model is used with the pathologists' annotations only as the input to estimate the cell type ground truth based on the estimated annotators' specificity and sensitivity. These estimated ground truths were then used to quantify the overall performance of the annotators and the model. The weighted average of precision and recall (e.g., an F1 score), which equally weights false positive and false negative errors, was calculated for the cell model predictions and each pathologist annotation compared to consensus.

Pathologist Scoring of Digitized WSI

After exclusion of slides from the same specimen (if the block information was provided; indicated as quality control "QC2" process in FIG. 9A), 843 digital WSI from PathAI Diagnostics and Lab 2 were scored manually using the NHI system according to a published guidance (e.g., by five GI-fellowship trained surgical pathologists). Of these three were internal GI-fellowship trained pathologists, and two additional GI-fellowship trained pathologists were selected for manual scoring after exhibiting proficiency in use of the Nancy Histological Index (quadratic weighted kappa score >0.80 concordance with the consensus of the internal GI pathologists' scores). Consensus was defined as agreement between at least three out of five of pathologists. Slides that did not achieve consensus (n=23 (0.03%)) were excluded, leaving 820 WSI.

Evaluation of Model-Derived HIFs Based on Pathologist NHI Scores

Tissue and cell model predictions were used to extract, for example, >600 quantitative human-interpretable features (HIFs), measuring tissue areas, area proportions (e.g., area proportion of erosion/ulceration in all usable tissue), cell counts, cell count proportions (e.g., count proportion of neutrophils in all cells in lamina propria), and cell densities (e.g., density of neutrophils in lamina propria) in each tissue class. Each extracted HIF was assessed for correlation with consensus pathologist NHI scores (e.g., n=627) using Spearman correlation. Additionally, the Mann-Whitney test was performed on the same set of slides to assess the distribution differences between two adjacent NHI scores for each HIF.

Prediction of NHI Scores by Random Forest Classification Model

To further assess the relevance of the extracted HIFs, the HIFs were used as input for an array of classification models that were trained to predict pathologist-assigned NHI scores. The 512 slides with consensus pathologist NHI scores from PathAI Diagnostics were split into training (281; 55%), validation (105; 21%), and held-out test (126; 25%) set, balanced across NHI scores. An additional 308 slides from Lab 2 were then added to the held-out test set. HIFs (e.g., thirteen features) were selected by pathologists as relevant to NHI scoring and these HIFs were used as input for training. The classification models included logistic regression, gradient boosting, and random forest, and were run using the scikit-learn library. Random forest classification, was determined to be an optimal model based on the produced weighted kappa scores, and was selected using 5-fold cross validation. Finally, the performance on the most optimal model was further evaluated on the held-out test set.

Statistical Analyses

To evaluate the performance of the tissue and cell model, a Bayesian approach was used to estimate the true type of each cell using the pathologists' annotations as the input (FIG. 9B). These estimated ground truths were then used to quantify the overall performance of the annotators and the model. The weighted average of precision and recall (F1 score), which equally weights false positive and false negative errors, was calculated for the cell model predictions and each pathologist annotation compared to consensus. To evaluate model-generated HIFs, each extracted HIF was assessed for correlation with consensus pathologist NHI scores (e.g., n=627) using Spearman correlation. Additionally, the Mann-Whitney test was performed on the same set of slides to assess the distribution differences between two adjacent NHI scores for each HIF.

Results

Tissue and Cell Model Development for Quantitation of UC Histological Features

Figure 7:
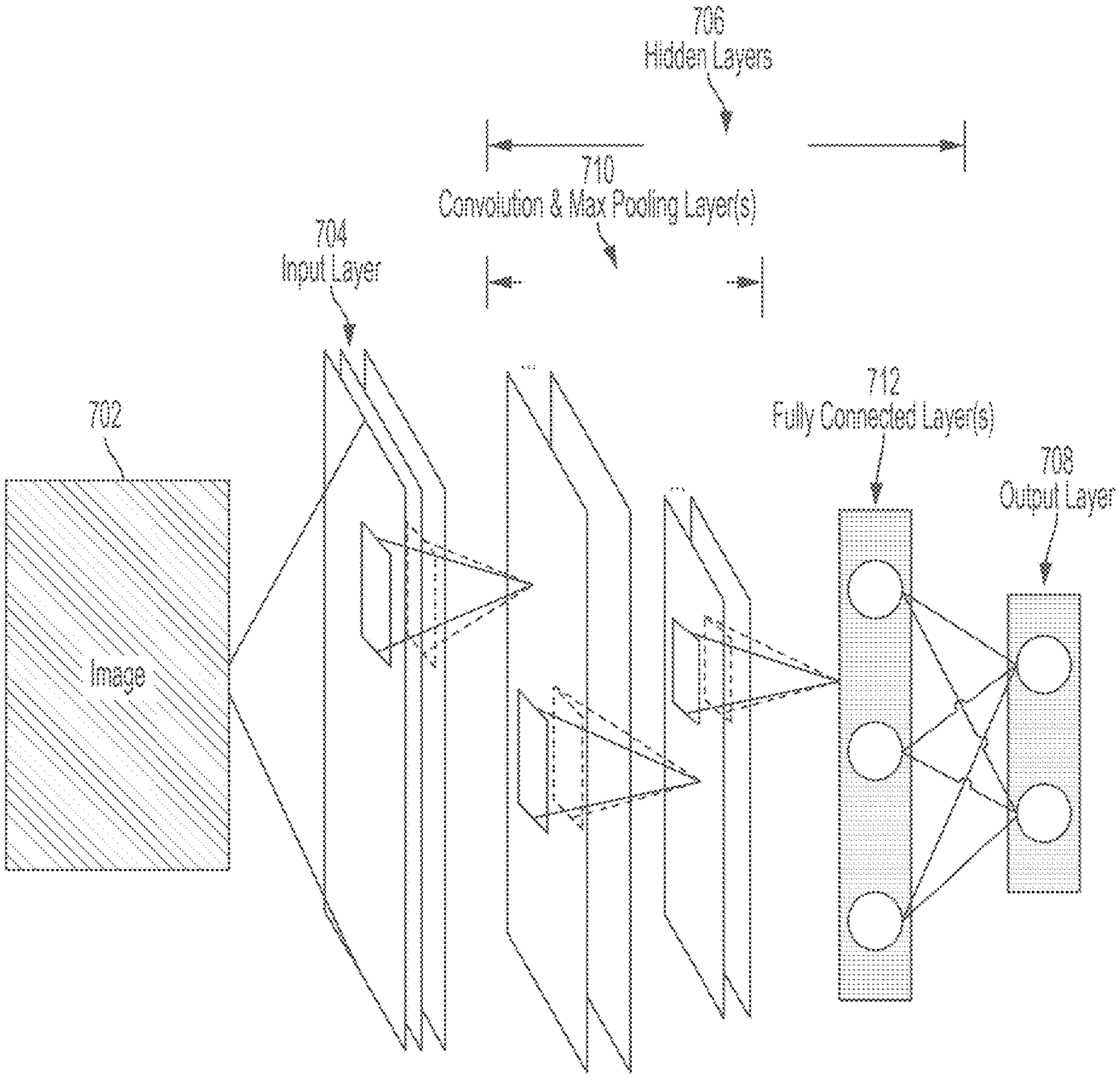
FIG. 7 schematically shows layers of a convolutional neural network, in accordance with some embodiments of the technology described herein.

To develop a quantitative and reproducible measure of UC histology, deep CNN models (such as shown in FIG. 7) were trained to predict pathological features of UC disease severity using pathologist annotations on digitized WSI of H&E-stained samples from individuals with normal colon, focal active colitis, chronic inactive colitis, and mild, moderate, or severe chronic active ulcerative colitis. Model predictions were visualized as colored overlays on the WSI, allowing for qualitative review of model performance. Tissue model overlays show predicted areas of normal epithelium, neutrophil infiltrated epithelium, goblet cell cytoplasm, crypt abscess, inter-gland lumen, blood vessels, lamina propria, muscularis mucosa, basal plasmacytosis, erosion/ulceration, and granulation tissue (see FIG. 10). Cell model overlays show predictions of neutrophils, plasma cells, intraepithelial lymphocytes, non-intraepithelial lymphocytes, eosinophils, goblet cell nuclei, and enterocytes (FIG. 10).

Figure 11A:
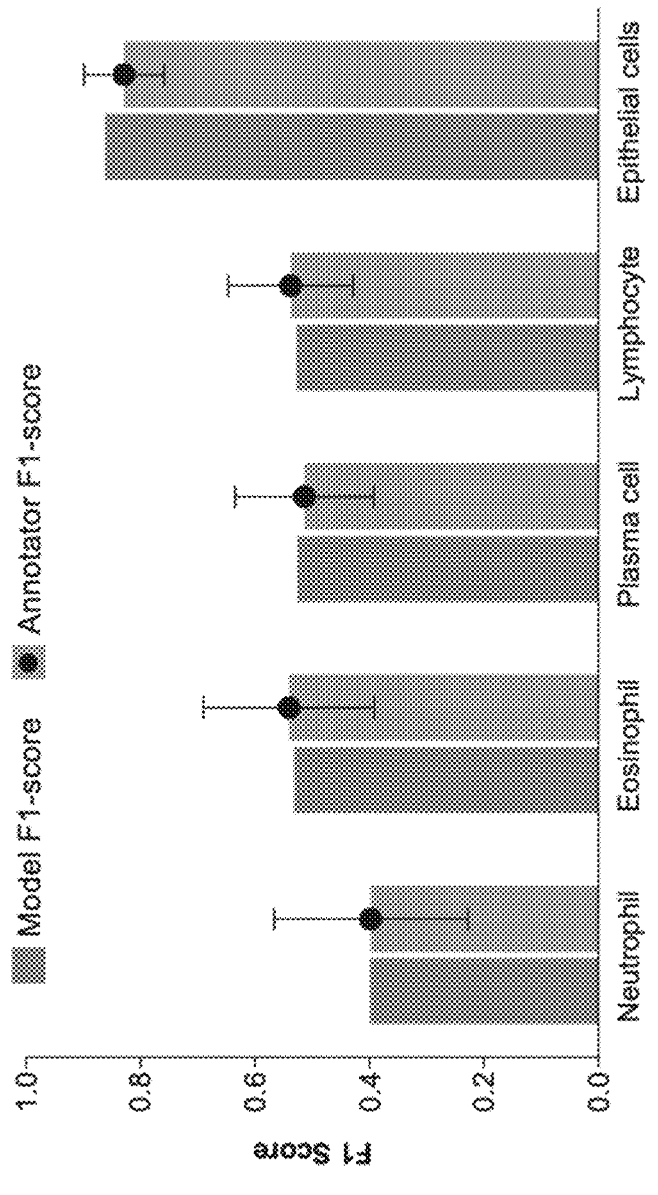
FIG. 11A shows validation of model performance in accordance with some embodiments of the technology described herein. Cell model predictions were compared to annotations from five pathologists on the image frames. Variability and bias in pathologist annotations were accounted for using a Bayesian approach. The weighted average of precision and recall is reported for both the cell model predictions (F1 score) and pathologists' annotations (average F1 score) compared to consensus of pathologists for each of 5 cell classes. The error bars represent the standard deviation across annotators.
Figure 11B:
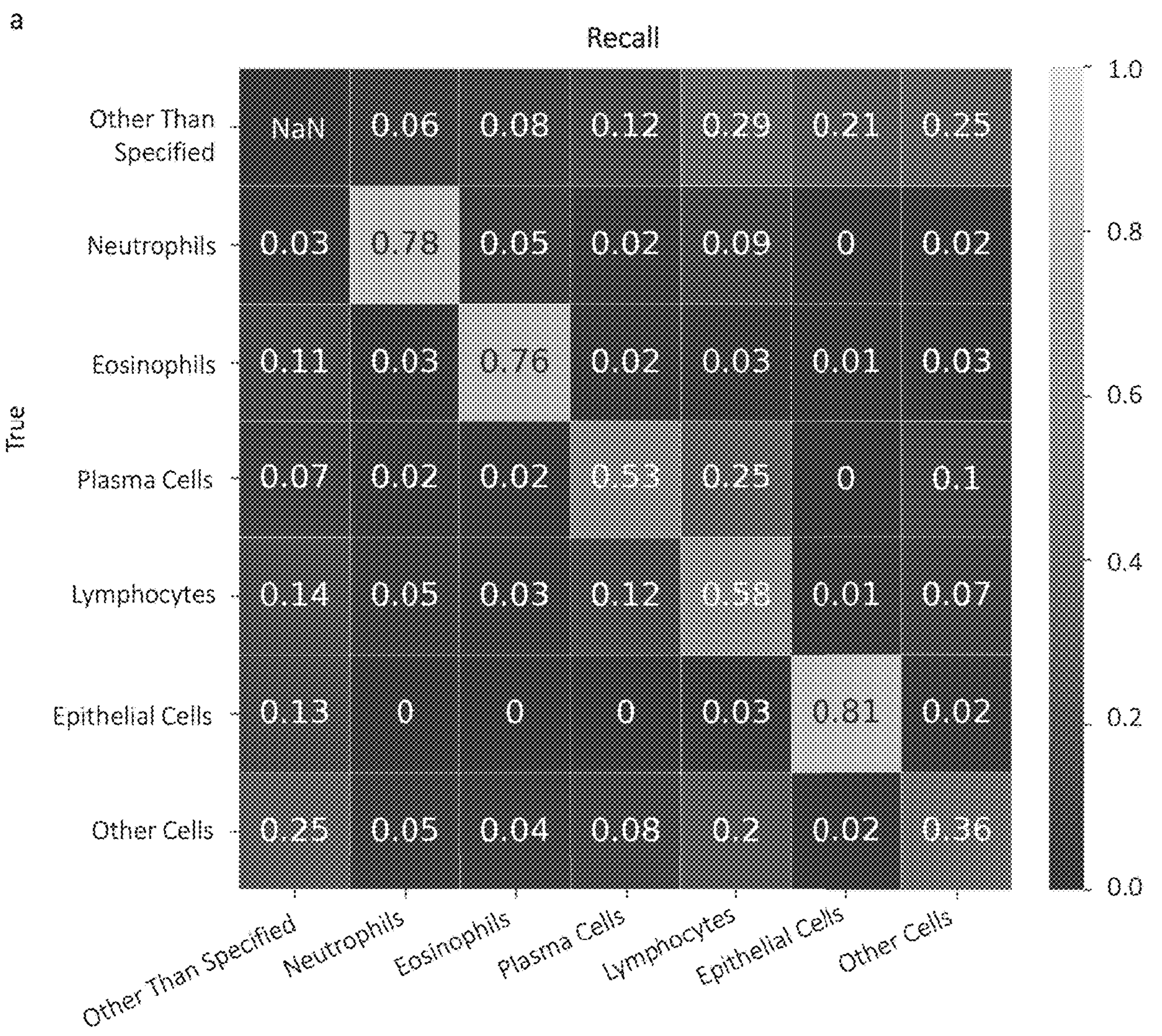
FIGS. 11B-11C show validation of model performance (recall and precision) in accordance with some embodiments of the technology described herein.
Figure 11C:
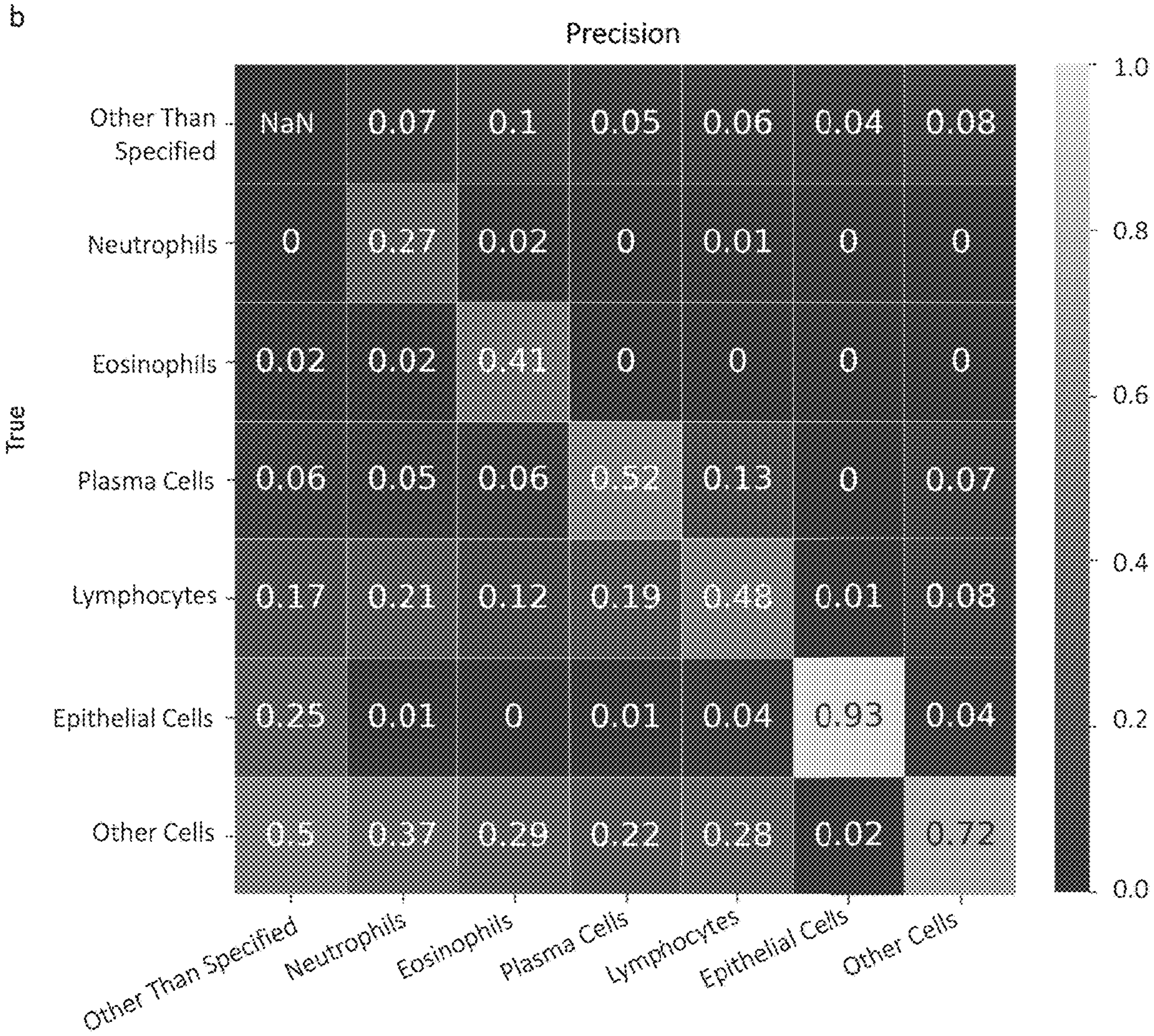

To validate cell model predictions, the performance of the model was compared to that of the pathologists using the Bayesian-derived estimated ground truths on the 134~80×80 μm frames. The model performance was either essentially equal to the mean or within 95% confidence interval of the mean seen for individual pathologists across the 5 cell types: neutrophils, eosinophils, lymphocytes (intraepithelial and non-intraepithelial lymphocytes), plasma cells, and epithelial cells (goblet cells and enterocytes) (FIGS. 11A-11C).

Correlation of Tissue and Cell Model-Generated Quantitative HIFs with Manual Pathologist Scoring The correlation between tissue and cell model-generated quantitative features and pathologist consensus NHI scores were assessed. As shown in FIG. 12A, quantitative HIFs that are indicative of disease severity and correlate with pathologist consensus NHI scores are listed. NHI scores are used in order to focus on the presence or absence of active inflammation, a primary criteria for evaluating response in clinical trials. It is appreciated that the model-generated features described in the implementation are not limited by the NHI, and can use other scoring systems, including the Geboes scoring system and the RHI.

The generalizability of the tissue and cell model across different segments of the colon (left colon, right colon and rectum) and in slides is assessed using a second, independent pathology laboratory (Lab 2), although no prior training was performed on those slides or slides from the right colon (see FIG. 12A).

FIG. 12B shows a subset of the human-interpretable features of FIG. 12A that are selected as relevant to NHI scoring and as input for training the statistical model, in accordance with some embodiments herein. As shown in FIG. 12B, these features are sorted by the permutation feature importance performed on the held-out test set, which highlights the features with the most contribution to the model's generalization ability.

FIG. 12C shows examples of cell and tissue features that may be extracted and human-interpretable features that may be selected as input for training a statistical model, in accordance with some embodiments herein. In some embodiments, a subset of these human-interpretable features may be selected from training a statistical model. Examples of such human-interpretable features may include Density of Neutrophils in Mucosa, Density of Plasma Cells in Mucosa, Density of Plasma Cells in Basal Plasmocytosis, Density of Eosinophils in Mucosa, Area Proportion Goblet Cell Cytoplasm in Epithelium, Area Proportion of Basal Plasmocytosis in All Usable Tissue, Density of Neutrophils in Infiltrated Epithelium, Density of Neutrophils in Crypt Abscess, Density of Neutrophils in Erosion/Ulceration, and/or Density of Neutrophils in Granulation Tissue.

Correlation with Overall Disease Severity (NHI 0-4)

Figure 13:
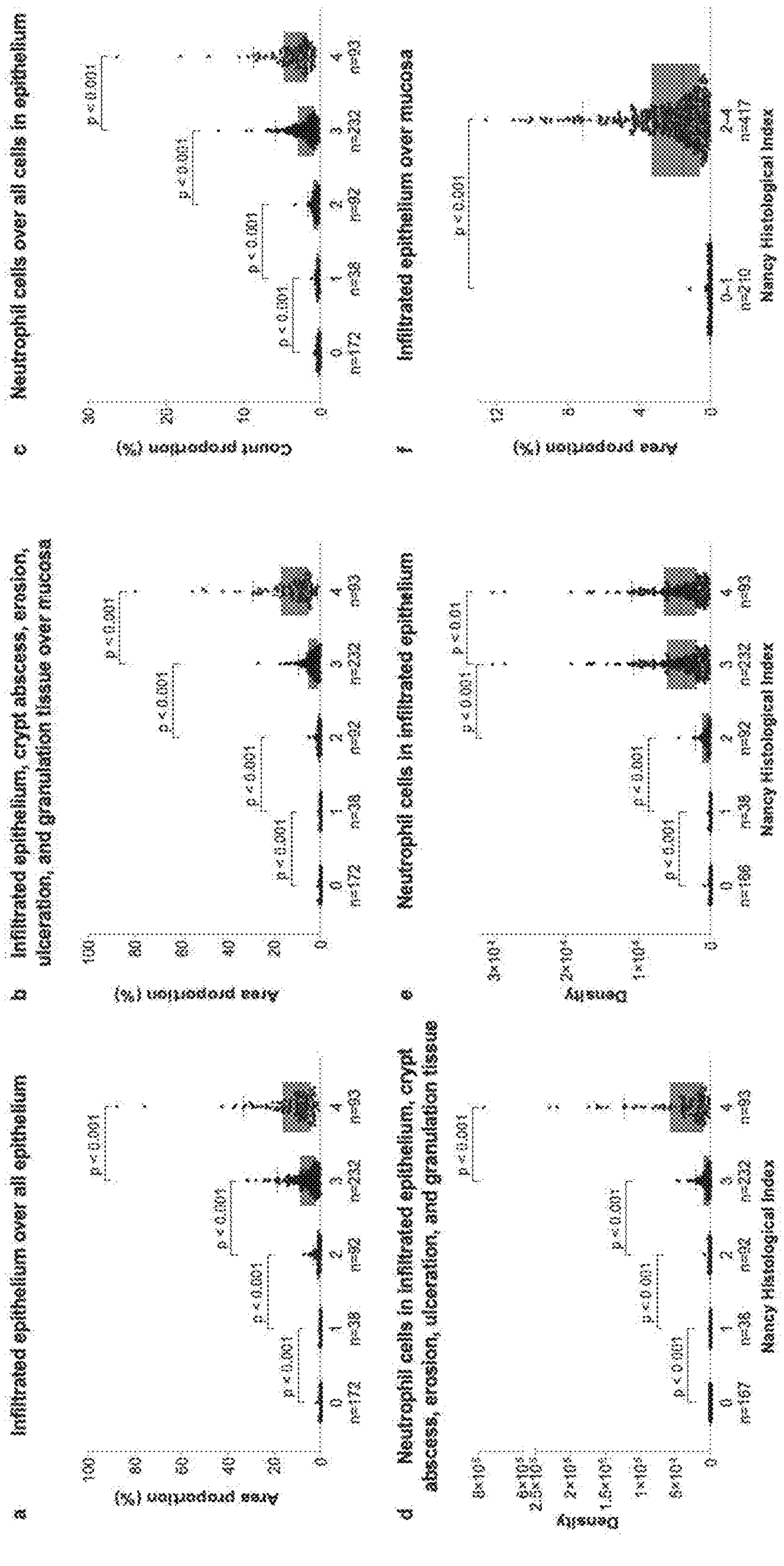
FIG. 13 shows example machine learning-generated features correlate with individual and grouped NHI scores in accordance with some embodiments of the technology described herein. Quantitative human-interpretable image features measuring tissue area proportions, cell counts, and cell densities show correlation with consensus pathologist NHI scores. Spearman correlation and significant p values are shown.

Features that showed the strongest association are those reflective of active inflammation and epithelial injury, such as combined area proportion of infiltrated epithelium (neutrophilic infiltration), crypt abscess, erosion, ulceration and associated granulation tissue over mucosa ($\rho=0.90$, $p<0.001$), area proportion of epithelium with neutrophilic infiltration over all epithelium ($\rho=0.87$, $p<0.001$), and both count proportion and density of neutrophils in epithelium, ulcer or their combination ($\rho$=range 0.83-0.90, all comparisons $p<0.001$) (FIG. 13). These features show strong correlation with increasing NHI score, highlighting the disease relevance of the quantitative predictions made by the tissue and cell models.

Correlation with Severe Active Colitis (NHI 4)

Quantitative analysis of features associated with severe disease, including area proportion of erosion, ulceration and granulation tissue in the mucosa, showed a strong positive correlation with increasing NHI scores ($\rho=0.90$, $p<0.001$) and, significant discriminating power between NHI score 3 and NHI score 4 ($p<0.001$). This highlights the model's ability to quantify areas of ulceration within the tissue that correspond to NHI score 4. Neutrophil density within infiltrated epithelium, crypt abscess, erosion, ulceration and granulation tissue, which is not an element of the NHI scoring, also produced a strong positive correlation across all NHI scores (ρ=0.90, p<0.001) and significant discriminating power between NHI score 3 and NHI score 4 (p<0.001), highlighting additional biologically relevant features that can be quantified using the tissue and cell models (FIG. 13*d*).

Correlation with Chronic Inactive Colitis (NHI 0,1)

When evaluating quantitative features that may distinguish lower NHI scores (NHI 0 from NHI 1), the inventors have noted features related to chronic inflammation, including basal plasmacytosis area proportion in mucosa (p=0.01), and combined count proportions of chronic inflammatory cells (plasma cells, lymphocytes), with and excluding eosinophils in mucosa (both comparisons p<0.001). When examining individual cell types, plasma cell count proportion (p=0.005), and eosinophil cell count proportion (p=0.019) and density (p=0.006) distinguished NHI 0 from NHI 1, while lymphocyte cell features within lamina propria did not (p=0.1).

Correlation with Grouped NHI Scores

The correlation of features with grouped NHI scores NHI 0-1 vs. NHI 2-4 was also examined to reflect the cutoff for resolution of active neutrophilic inflammation, which is an experimental histological endpoint target for clinical trials in UC. The correlation of features with group scores NHI 0-1 vs NHI 2 vs NHI 2-4 was also examined to compare features between the cases with inactive, mild, and moderate to severe activity. The inventors have noted that cell features related to neutrophils and resulting tissue features of active inflammation showed the strongest correlation (FIG. 13*f*).

Additional Features

Notably, some HIFs that showed correlation with the overall NHI score are either not components of the NHI scoring index, or are only used in a limited fashion for assigning the score of NHI 1. Such features include plasma cell features, such as basal plasmacytosis area proportion as well as plasma cell count and density within mucosa and basal plasmacytosis, which correlated with the increasing overall NHI score (see FIG. 12). Other such features include goblet cell cytoplasm mucin area proportion in the epithelium, which revealed a moderate negative correlation with increasing NHI score (ρ=−0.53, p<0.001). This feature discriminated biopsies with no activity (NHI 0-1) from those with mild active disease (NHI 2) and biopsies showing more advanced disease (NHI 3-4) (ρ=−0.46, p<0.001).

Model Generalizability

The generalizability of the tissue and cell model predictions was tested by deploying the model on a test set of UC slides from an independent laboratory ("Lab 2" in workflow) not used for model training. As shown in FIG. 12A, qualitative review of model predictions and maintained correlation between model-generated HIFs and pathologist NHI consensus scores support the generalizability of the model across samples from different laboratories and tissue preparation, staining, and scanning processes. FIG. 12A also shows model generalizability across different regions on the colon. WSI from Lab 2 included 76 slides from the right colon. Although the tissue and cell model was trained only on slides from the left colon and rectum, when the model is deployed on right colon WSI, the correlations described above for tissue and cell features of active and chronic inflammation with NHI consensus scores can still be maintained. This supports the generalizability of the model across different segments of the colon. The inventors have noted that area proportion of goblet cell cytoplasm shows a stronger negative correlation with increasing NHI score in the rectum when compared to other segments (ρ=−0.64, p<0.001) while correlation with area proportion of basal plasmacytosis is slightly weaker than the right and left colon (ρ=−0.47 compared to ρ=−64 and ρ=−68, all correlations p<0.001).

Machine Learning Prediction of UC Severity

To examine the reliability and reproducibility of manual pathology-based scoring of UC activity, five GI fellowship-trained pathologists independently graded UC activity using the NHI scoring index. The pathologist scores showed near perfect inter-observer reproducibility for overall score (based on weighted kappa average 0.95).

Then, manual pathologist NHI scores with machine learning (ML)-based NHI scores were compared. Among all the classification models, a random forest classifier was selected based on the performance of a 5-fold cross validation measured by weighted kappa, and was used to predict the NHI score using selected histologic features (e.g., features shown in FIG. 12A, 12B, or 12C) by GI pathologists (FIG. 10).

Figure 14:
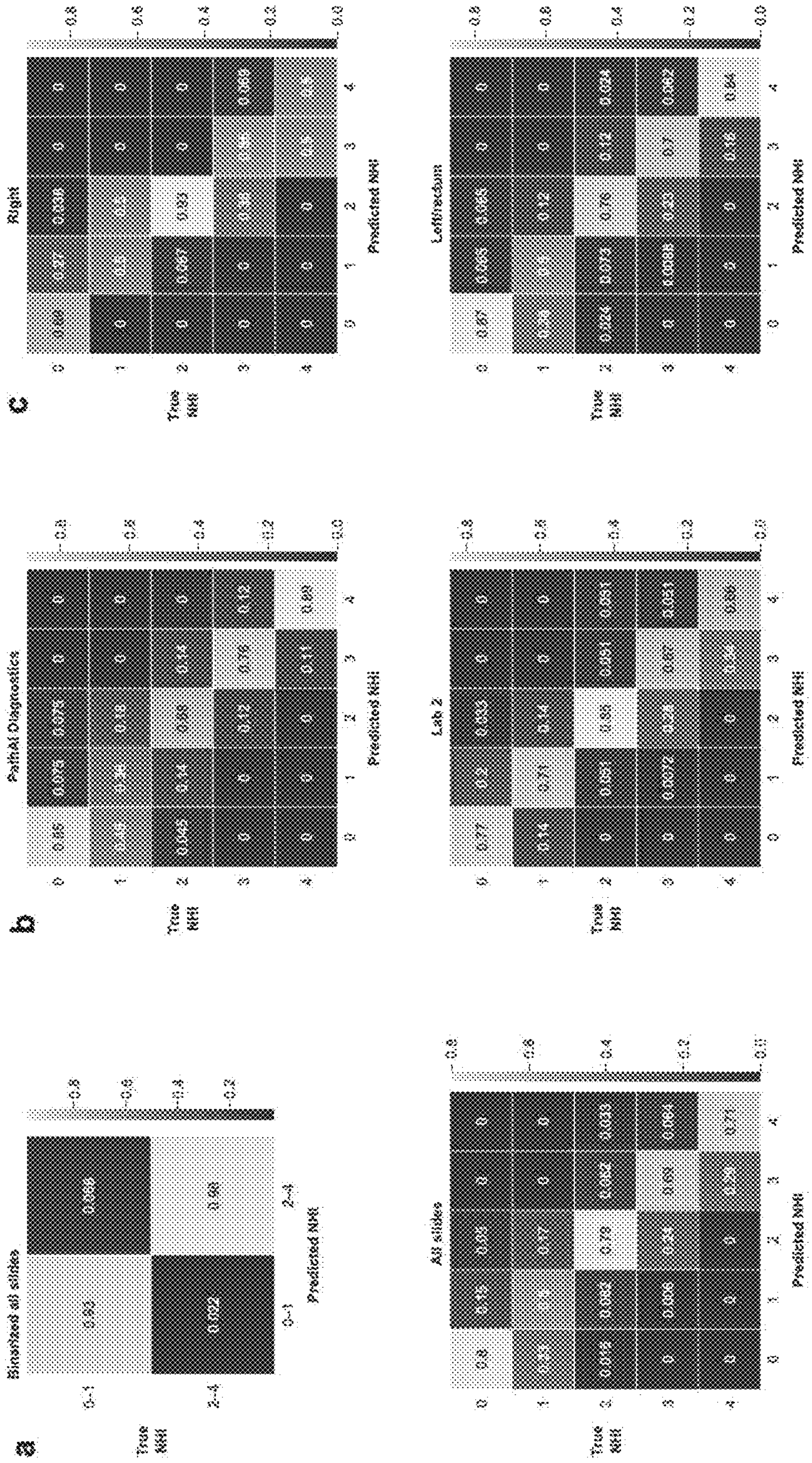
FIG. 14 shows performance of a random forest classifier trained to predict pathologist consensus NHI scores in accordance with some embodiments of the technology described herein. (a) Confusion matrices for random forest classifier predictions compared to pathologist consensus NHI scores on all slides for prediction of all NHI scores, and for binarized prediction of active colitis (NHI 2-4) vs inactive colitis and normal (NHI 0-1). (b) Confusion matrices for random forest classifier predictions compared to manual pathologist consensus NHI scores on slides categorized by source laboratory. (c) Confusion matrices for random forest classifier predictions compared to manual pathologist consensus NHI scores on slides from different colon regions: right colon and left colon/rectum.

The random forest classifier model yielded a weighted kappa k=0.91 and Spearman correlation ρ=0.89 (p<0.001) on the held out test set when compared to manual pathologist consensus NHI score (FIG. 14*a*). Performance was generalizable on slides from a different laboratory (Lab 2), where the model yielded a weighted kappa (k=0.90) and Spearman correlation (ρ=0.86, p<0.001) (FIG. 14*b*). Although the random forest classifier is trained exclusively on slides from the left colon and rectum, performance of the random forest classifier model was also generalizable across different segments of the colon. For example, the model yielded a weighted kappa k=0.89 and Spearman correlation ρ=0.90 (p<0.001) when its performance was assessed on the right colon as compared to a weighted kappa k=0.92 and Spearman correlation ρ=0.90 (p<0.001) on the left colon and rectum (FIG. 14*c*).

The inventors have noted that confusion of the random forest classifier model is most significant for scores with lower concordance among pathologists, and this is consistent between the model performance and average expert pathologists performance. For example, the model performance differentiating NHI 0-1 and NHI 1-2 (kappa 0.29 and 0.52, respectively) is similar to the average performance of expert gastrointestinal pathologists (kappa average 0.36 and 0.50 min-max ranges 0.30-0.39 and 0.43-0.58, respectively).

In order to assess the ability of the random forest classifier model to classify histologic remission, the model is evaluated in distinguishing cases with disease activity (chronic active colitis NHI 2-4) from cases with chronic inactive colitis or those that have normal or mildly increased lamina propria density (NHI 0-1). The random forest classifier model yields an accuracy of 0.97 (weighted kappa k=0.91 and Spearman correlation ρ=0.91, p<0.001) (FIG. 14*a*). The model performance was comparable to the average performance of expert pathologist(s) (kappa average 0.94), indicating that the model performed at a level of expert review, while at the same time enabling complete repeatability.

Repeatability of Model Predictions

To assess the repeatability of the models, first, all artifact models (for detecting artifacts from slide images), cell and/or tissue models (for extracting cell-type labels and/or tissue-type segmentations) are deployed on 20 randomly selected slides ten times. Then, 610 tissue and cell HIFs are extracted in each deployment, and a pairwise comparison of HIF values is performed across deployments. An epsilon value of 1e-10 is utilized for floating point comparisons. It is shown that all of the HIF values are fully identical across deployments, which would produce the same correlation analysis results for the same NHI scores. In other words, so long as the NHI score for a whole slide image did not change across deployments, since the HIF values are identical across deployments, then the HIF values would correlate repeatably in the same manner with the same NHI scores. Additionally, the randomness of sample bootstrapping and feature sampling in the random forest classifier is controlled such that the trained classifier model is reproducible and the same set of slides would generate the same prediction result.

Discussion

Histopathology is an essential component of disease activity assessment for patients with UC. As a shift to routinely incorporating biopsy collection and histologic read out for most UC drug development programs starts to occur, the various embodiments in the present disclosure describe ML-based approaches to quantify key HIFs pertinent to UC disease activity from H&E-stained WSI of mucosal biopsies, verify these HIFs by correlation with pathologist consensus NHI scores, and demonstrate that relevant HIFs can be used as input to a statistical model for predicting slide-level UC severity (e.g., NHI scores) similar to subspecialty-trained pathologists.

Some of the HIFs directly quantify features of neutrophils, which are widely accepted to be an essential components of disease activity, with the absence of neutrophil infiltration indicating a characteristic of histologic remission. These HIFs include count proportions and/or density of neutrophils in lamina propria, epithelium, crypt abscess, ulcer and granulation tissue, and the area proportion of various compartments occupied by neutrophils, such as infiltrated epithelium, crypt abscess, ulcer, and granulation tissue. These HIFs show strong correlation with disease activity, both when examined individually and in combination (see FIG. 13). It is appreciated that these model-generated features are not only relevant to the NHI, but are also essential components of other scoring systems such as the Geboes, RHI, and the recently reported PHRI score. The HIFs may also include additional features that are not part of any of the above mentioned formalized scoring systems (e.g., NHI, Geboes, and RHI scoring systems). For example, the HIFs quantize the goblet cell mucin depletion, a known histologic feature of epithelial injury in UC and show that the area proportion of epithelium occupied by goblet cell mucin is inversely correlated with UC disease severity. The various embodiments use selected HIFs (e.g., HIFs shown in FIG. 12A, 12B, or 12C) as input for a random forest classifier to predict consensus NHI scores collected from 5 independent subspecialty-trained pathologists (weighted k=0.91, Spearman correlation r=0.89). The HIFs selected in this manner can predict active disease, distinguishing chronic active colitis (NHI 2-4) from normal and chronic inactive colitis (NHI 0-1) (weighted k=0.91, Spearman correlation r=0.91). Notably, in various embodiments described herein, the repeatability of both the image segmentation model predictions (e.g., prediction of cell-type labels and/or tissue-type segmentations from which the HIFs are derived) and the random forest classifier outputs can be maintained. These statistical models achieve the generalizability across WSIs from different data sources or images of different colon segments.

The various embodiments described in the present disclosure provide advantages in histological evaluation in clinical practice. The supervised cell and tissue models can empower the flexible and context-aware interpretation of a skilled surgical pathologist by providing precise and comprehensive quantitation of features that can only be estimated by humans. Furthermore, overlay of the results from the models over the original whole-slide images enables real-time qualitative assessment of model performance.

Exemplary Model Architecture

In some embodiments, the deep learning model or other statistical models described herein may include a convolutional neural network. In some embodiments, the model architecture described herein may implement the statistical model (e.g., cell-type model and/or tissue-type model) for extracting cell-type labels and/or tissue-type segmentations described in the present disclosure. The model architecture may also implement other statistic model(s), such as the statistical model for detecting background and/or artifacts in a whole-slide image (e.g., training whole-slide image(s)). The convolutional neural network may be fully convolutional or may have one or more fully connected layers. In some embodiments, the model may be a different type of neural network model such as, for example, a recurrent neural network, a multi-layer perceptron, or a restricted Boltzmann machine. It should be appreciated that the model is not limited to being implemented as a neural network and, in some embodiments, may be a different type of model that may be used to predict annotations for one or more portions of a whole-slide image. For example, the model may be any suitable type of non-linear regression model such as a random forest regression model, a support vector regression model, or an adaptive basis function regression model. As another example, the model may be a Bayesian regression model or any other suitable Bayesian Hierarchical model. In some embodiments, a neural network includes an input layer, an output layer, and one or more hidden layers that define connections from the input layer to the output layer. Each layer may have one or more nodes. For example, the neural network may include at least 5 layers, at least 10 layers, at least 15 layers, at least 20 layers, at least 25 layers, at least 30 layers, at least 40 layers, at least 50 layers, or at least 100 layers. FIG. 7 provides details for training a convolutional neural network in accordance with some embodiments for model predictions of annotations for whole-slide images using the training data.

In some embodiments, the deep learning model can be implemented based on a variety of topologies or architectures including deep neural networks with fully connected (dense) layers, Long Short-Term Memory (LSTM) layers, convolutional layers, Temporal Convolutional Layers (TCL), or other suitable type of deep neural network topology or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

FIG. 7 schematically shows layers of a convolutional neural network in accordance with some embodiments of the technology described herein. The convolutional neural network may be used to predict annotations for a whole-slide image in accordance with some embodiments of the technology described herein. For example, the convolutional neural network may be used to predict annotations for a whole-slide image. The convolutional neural network may be used because such networks are suitable for analyzing visual images. The convolutional neural network may require no pre-processing of a visual image in order to analyze the visual image. As shown, the convolutional neural network comprises an input layer 704 configured to receive information about the image 702 (e.g., pixel values for all or one or more portions of a whole-slide image), an output layer 708 configured to provide the output (e.g., a classification), and a plurality of hidden layers 706 connected between the input layer 704 and the output layer 708. The plurality of hidden layers 706 include convolution and pooling layers 710 and fully connected layers 712.

The input layer 704 may be followed by one or more convolution and pooling layers 710. A convolutional layer may comprise a set of filters that are spatially smaller (e.g., have a smaller width or height) than the input to the convolutional layer (e.g., the image 702). Each of the filters may be convolved with the input to the convolutional layer to produce an activation map (e.g., a 2-dimensional activation map) indicative of the responses of that filter at every spatial position. The convolutional layer may be followed by a pooling layer that down-samples the output of a convolutional layer to reduce its dimensions. The pooling layer may use any of a variety of pooling techniques such as max pooling or global average pooling. In some embodiments, the down-sampling may be performed by the convolution layer itself (e.g., without a pooling layer) using striding.

The convolution and pooling layers 710 may be followed by fully connected layers 712. The fully connected layers 712 may comprise one or more layers each with one or more neurons that receives an input from a previous layer (e.g., a convolutional or pooling layer) and provides an output to a subsequent layer (e.g., the output layer 708). The fully connected layers 712 may be described as "dense" because each of the neurons in a given layer may receive an input from each neuron in a previous layer and provide an output to each neuron in a subsequent layer. The fully connected layers 712 may be followed by an output layer 708 that provides the output of the convolutional neural network. The output may be, for example, an indication of which class, from a set of classes, the image 702 (or any portion of the image 702) belongs to. The convolutional neural network may be trained using a stochastic gradient descent type algorithm or another suitable algorithm. The convolutional neural network may continue to be trained until the accuracy on a validation set (e.g., held out images from the training data) saturates or using any other suitable criterion or criteria.

It should be appreciated that the convolutional neural network shown in FIG. 7 is only one example implementation and that other implementations may be employed. For example, one or more layers may be added to or removed from the convolutional neural network shown in FIG. 7. Additional example layers that may be added to the convolutional neural network include: a pad layer, a concatenate layer, and an upscale layer. An upscale layer may be configured to upsample the input to the layer. An ReLU layer may be configured to apply a rectifier (sometimes referred to as a ramp function) as a transfer function to the input. A pad layer may be configured to change the size of the input to the layer by padding one or more dimensions of the input. A concatenate layer may be configured to combine multiple inputs (e.g., combine inputs from multiple layers) into a single output.

As another example, in some embodiments, one or more convolutional, transpose convolutional, pooling, unpooling layers, or batch normalization may be included. As yet another example, the architecture may include one or more layers to perform a nonlinear transformation between pairs of adjacent layers. The non-linear transformation may be a rectified linear unit (ReLU) transformation, a sigmoid, or any other suitable type of non-linear transformation, as aspects of the technology described herein are not limited in this respect. In some embodiments, any suitable optimization technique may be used for estimating neural network parameters from training data. For example, one or more of the following optimization techniques may be used: stochastic gradient descent (SGD), mini-batch gradient descent, momentum SGD, Nesterov accelerated gradient, Adagrad, Adadelta, RMSprop, Adaptive Moment Estimation (Adam), AdaMax, Nesterov-accelerated Adaptive Moment Estimation (Nadam), AMSGrad.

Convolutional neural networks may be employed to perform any of a variety of functions described herein. For example, a convolutional neural network may be employed to predict tissue or cellular characteristics for a whole-slide image. It should be appreciated that more than one convolutional neural network may be employed to make predictions in some embodiments. For example, a first convolutional neural network may be trained on a set of annotated whole-slide images and a second, different convolutional neural network may be trained on the same set of annotated whole-slide images, but magnified by a particular factor, such as 5×, 10×, 20×, or another suitable factor. The first and second neural networks may comprise a different arrangement of layers or be trained using different training data. In some embodiments, the convolutional neural network does not include padding between layers. The layers may be designed such that there is no overflow as pooling or convolution operations are performed. Moreover, layers may be designed to be aligned. For example, if a layer has an input of size N*N, and has a convolution filter of size K, with stride S, then (N−K)/S must be an integer in order to have alignment.

Exemplary Computer Architecture

FIG. 8 shows a block diagram of a computer system on which various embodiments of the technology described herein may be practiced. The system includes at least one computer 833. Optionally, the system may further include one or more of a server computer 809 and an imaging instrument 855 (e.g., one of the instruments described above), which may be coupled to an instrument computer 851. Each computer in the system includes a processor 837 coupled to a tangible, non-transitory memory device 875 and at least one input/output device 835. Thus the system includes at least one processor 837 coupled to a memory subsystem 875 (e.g., a memory device or collection of memory devices). The components (e.g., computer, server, instrument computer, and imaging instrument) may be in communication over a network 815 that may be wired or wireless and wherein the components may be remotely located or located in close proximity to each other. Using those components, the system is operable to receive or obtain image data such as whole-slide images, pathology images, histology images, or tissue images and annotation and score data as well as test sample images generated by the imaging instrument or otherwise obtained. In certain embodiments, the system uses the memory to store the received data as well as the model data which may be trained and otherwise operated by the processor.

In some embodiments, some or all of the system is implemented in a cloud-based architecture. The cloud-based architecture may offer on-demand access to a shared pool of configurable computing resources (e.g. processors, graphics processors, memory, disk storage, network bandwidth, and other suitable resources). A processor in the cloud-based architecture may be operable to receive or obtain training data such as whole-slide images, pathology images, histology images, or tissue images and annotation and score data as well as test sample images generated by the imaging instrument or otherwise obtained. A memory in the cloud-based architecture may store the received data as well as the model data which may be trained and otherwise operated by the processor. In some embodiments, the cloud-based architecture may provide a graphics processor for training the model in a faster and more efficient manner compared to a conventional processor.

Processor refers to any device or system of devices that performs processing operations. A processor will generally include a chip, such as a single core or multi-core chip (e.g., 12 cores), to provide a central processing unit (CPU). In certain embodiments, a processor may be a graphics processing unit (GPU) such as an Nvidia Tesla K80 graphics card from NVIDIA Corporation (Santa Clara, CA). A processor may be provided by a chip from Intel or AMD. A processor may be any suitable processor such as the microprocessor sold under the trademark XEON E5-2620 v3 by Intel (Santa Clara, CA) or the microprocessor sold under the trademark OPTERON 6200 by AMD (Sunnyvale, CA). Computer systems may include multiple processors including CPUs and or GPUs that may perform different steps of the described methods. The memory subsystem 875 may contain one or any combination of memory devices. A memory device is a mechanical device that stores data or instructions in a machine-readable format. Memory may include one or more sets of instructions (e.g., software) which, when executed by one or more of the processors of the disclosed computers can accomplish some or all of the methods or functions described herein. Each computer may include a non-transitory memory device such as a solid state drive, flash drive, disk drive, hard drive, subscriber identity module (SIM) card, secure digital card (SD card), micro SD card, or solid state drive (SSD), optical and magnetic media, others, or a combination thereof. Using the described components, the system is operable to produce a report and provide the report to a user via an input/output device. An input/output device is a mechanism or system for transferring data into or out of a computer. Exemplary input/output devices include a video display unit (e.g., a liquid crystal display (LCD) or a cathode ray tube (CRT)), a printer, an alphanumeric input device (e.g., a keyboard), a cursor control device (e.g., a mouse), a disk drive unit, a speaker, a touchscreen, an accelerometer, a microphone, a cellular radio frequency antenna, and a network interface device, which can be, for example, a network interface card (NIC), Wi-Fi card, or cellular modem.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, or ordinary meanings of the defined terms.

The use herein of “including,” “comprising,” “having,” “containing,” “involving,” and variations thereof is meant to encompass the items listed thereafter and equivalents thereof as well as additional items. References to “or” may be construed as inclusive so that any terms described using “or” may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As referred to herein, the term “in response to” may refer to initiated as a result of or caused by. In a first example, a first action being performed in response to a second action may include interstitial steps between the first action and the second action. In a second example, a first action being performed in response to a second action may not include interstitial steps between the first action and the second action.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In this application, unless otherwise clear from context, (i) the term “a” means “one or more”; (ii) the term “or” is used to mean “and/or” unless explicitly indicated to refer to alternatives only or the alternative are mutually exclusive, although the disclosure supports a definition that refers to only alternatives and “and/or”; (iii) the terms “comprising” and “including” are understood to encompass itemized components or steps whether presented by themselves or together with one or more additional components or steps; and (iv) where ranges are provided, endpoints are included.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the systems and methods described herein. Accordingly, the foregoing description and drawings are by way of example only.

The invention claimed is:

1. A method for training one or more models to predict a ulcerative colitis (UC) severity based on human-interpretable image features extracted from a whole-slide image, the method comprising, by at least one processor:

accessing a plurality of training whole-slide images associated with a plurality of UC patients, each of the training whole-slide images includes an associated UC severity obtained from one or more pathologists;

determining a plurality of human-interpretable image features based on cell-type labels and tissue-type segmentations associated with the plurality of training whole-slide images, wherein the plurality of human-interpretable image features is selected based on a degree of correlation with consensus pathologist assessment according to Nancy Histological Index (NHI) scoring, and includes one or more features selected from: area proportion of infiltrated epithelium, crypt abscess, erosion, ulceration and associated granulation tissue over mucosa, basal plasmacytosis area proportion in mucosa, goblet cell cytoplasm mucin area proportion in the epithelium, area proportion of epithelium with neutrophilic infiltration over all epithelium, and/or count proportion and density of neutrophils in epithelium, ulcer or their combination;

training a first statistical model based on the plurality of human-interpretable image features to predict a NHI score for a whole-slide image, by training the model to discriminate between NHI scores associated with chronic inactive colitis and NHI scores associated with active colitis based on goblet cell cytoplasm mucin area proportion in the epithelium determined from the plurality of training whole-slide images; and storing the trained model on at least one storage device.

2. The method of claim 1, further comprising:

determining the cell-type labels and tissue-type segmentations associated with the plurality of training whole-slide images using a second statistical model trained to determine one or more tissue-type segmentations and/or one or more cell-type segmentations from a whole-slide image.

3. The method of claim 2, wherein the second statistical model comprises a cell-type model configured to predict one or more cell-type labels from a whole-slide image.

4. The method of claim 2, wherein the second statistical model comprises a tissue-type model configured to predict one or more tissue-type segmentations from a whole-slide image.

5. The method of claim 2, wherein the cell-type labels include one or more of: neutrophils, plasma cells, intraepithelial lymphocytes, non-intraepithelial lymphocytes, eosinophils, goblet cell nuclei, enterocytes, or a combination thereof.

6. The method of claim 2, the tissue-type segmentations include one or more of: normal epithelium, neutrophil-infiltrated epithelium, goblet cell cytoplasm, crypt abscess, inter-gland lumen, blood vessels, lamina propria, muscularis mucosa, basal plasmacytosis, erosion/ulceration, granulation tissue, or a combination thereof.

7. The method of claim 2, further comprising training the second statistical model with a plurality of annotated whole-slide images, wherein the plurality of annotated whole-slide images include at least one annotation describing a cell-type label or a tissue-type segmentation for a portion of a whole-slide image.

8. The method of claim 1, wherein determining the plurality of human-interpretable image features further comprises:

evaluating at least one of the plurality of human-interpretable image features for correlation with one or more pathologist scores associated with the plurality of training whole-slide images; and determining to include the at least one human-interpretable image feature in training the first statistical model based on the evaluating.

9. The method of claim 8, wherein evaluating the at least one of the plurality of human-interpretable image features comprises determining a Spearman correlation.

10. The method of claim 1, wherein the first statistical model comprises a random forest classifier.

11. The method of claim 1, wherein the plurality of human-interpretable image features are reflective of active inflammation and epithelial injury, chronic inflammation, cell features related to neutrophils and resulting tissue features of active inflammation, and/or plasma cell features.

12. The method of claim 11, wherein the plurality of human-interpretable image features are reflective of one or more cell features related to neutrophils and/or resulting tissue features of active inflammation.

13. The method of claim 11, wherein the plurality of human-interpretable image features comprise one or more of: area proportion of erosion, ulceration and granulation tissue in mucosa, neutrophil density within infiltrated epithelium, crypt abscess, erosion, ulceration and granulation tissue, or a combination thereof.

14. The method of claim 11, wherein the plurality of human-interpretable image features comprise one or more of: basal plasmacytosis area proportion in mucosa, combined count proportions of chronic inflammatory cells (plasma cells, lymphocytes), or a combination thereof.

15. The method of claim 11, wherein the plurality of human-interpretable image features comprise one or more of: basal plasmacytosis area proportion, plasma cell count and density within mucosa and basal plasmacytosis, or a combination thereof.

16. The method of claim 1, wherein training the first statistical model based on the plurality of human-interpretable image features to predict an NHI score comprises:

training the model to discriminate between NHI scores of 3 and 4 based on the area proportion of erosion, ulceration and granulation tissue in the mucosa determined from the plurality of training whole-slide images.

17. The method of claim 1, wherein training the first statistical model based on the plurality of human-interpretable image features to predict an NHI score comprises:

training the model to discriminate between NHI scores of 0 and 1 based on the basal plasmacytosis area proportion in mucosa, and/or combined count proportions of chronic inflammatory cells determined from the plurality of training whole-slide images.

18. A system for training one or more models to predict a ulcerative colitis (UC) severity based on human-interpretable image features extracted from a whole-slide image, the system comprising at least one processor configured to:

access a plurality of training whole-slide images associated with a plurality of UC patients, each of the training whole-slide images includes an associated UC severity obtained from one or more pathologists;

determine a plurality of human-interpretable image features based on cell-type labels and tissue-type segmentations associated with the plurality of training whole-slide images, wherein the plurality of human-interpretable image features is selected based on a degree of correlation with consensus pathologist assessment according to Nancy Histological Index (NHI) scoring, and includes one or more features selected from: area proportion of infiltrated epithelium, crypt abscess, erosion, ulceration and associated granulation tissue over mucosa, basal plasmacytosis area proportion in mucosa, goblet cell cytoplasm mucin area proportion in the epithelium, area proportion of epithelium with neutrophilic infiltration over all epithelium, and/or count proportion and density of neutrophils in epithelium, ulcer or their combination;

train a first statistical model based on the plurality of human-interpretable image features to predict a NHI score for a whole-slide image, by training the model to discriminate between NHI scores associated with chronic inactive colitis and NHI scores associated with active colitis based on goblet cell cytoplasm mucin area proportion in the epithelium determined from the plurality of training whole-slide images; and store the trained model on at least one storage device.

19. A method for predicting a ulcerative colitis (UC) severity based on human-interpretable image features extracted from a whole-slide image, the method comprising:

using a first statistical model to determine one or more cell-type labels and/or one or more tissue-type segmentations associated with the whole-slide image;

determining a plurality of human-interpretable image features based on the one or more cell-type labels and/or the one or more tissue-type segmentations associated with the whole-slide images, wherein the plurality of human-interpretable image features is selected based on a degree of correlation with consensus pathologist assessment according to Nancy Histological Index (NHI) scoring, and includes one or more features selected from: area proportion of infiltrated epithelium, crypt abscess, erosion, ulceration and associated granulation tissue over mucosa, basal plasmacytosis area proportion in mucosa, goblet cell cytoplasm mucin area proportion in the epithelium, area proportion of epithelium with neutrophilic infiltration over all epithelium, and/or count proportion and density of neutrophils in epithelium, ulcer or their combination; and using a second statistical model to predict a NHI score for the whole-slide image based on the plurality of human-interpretable image features, wherein the second statistical model is trained by training the model to discriminate between NHI scores associated with chronic inactive colitis and NHI scores associated with active colitis based on goblet cell cytoplasm mucin area proportion in the epithelium determined from the plurality of training whole-slide images.

20. The method of claim 19, wherein the second statistical model comprises a random forest classifier.

21. The method of claim 19, wherein the cell-type labels include one or more of: neutrophils, plasma cells, intraepithelial lymphocytes, non-intraepithelial lymphocytes, eosinophils, goblet cell nuclei, enterocytes, or a combination thereof.

22. The method of claim 19, wherein the tissue-type segmentations include one or more of: normal epithelium, neutrophil-infiltrated epithelium, goblet cell cytoplasm, crypt abscess, inter-gland lumen, blood vessels, lamina propria, muscularis mucosa, basal plasmacytosis, erosion/ulceration, granulation tissue, or a combination thereof.

23. The method of claim 19, wherein the plurality of human-interpretable image features are reflective of active inflammation and epithelial injury, chronic inflammation, cell features related to neutrophils and resulting tissue features of active inflammation, and/or plasma cell features.

24. The method of claim 23, wherein the plurality of human-interpretable image features comprise one or more of: area proportion of erosion, ulceration and granulation tissue in mucosa, neutrophil density within infiltrated epithelium, crypt abscess, erosion, ulceration and granulation tissue, or a combination thereof.

25. The method of claim 23, wherein the plurality of human-interpretable image features comprise one or more of: basal plasmacytosis area proportion in mucosa, combined count proportions of chronic inflammatory cells (plasma cells, lymphocytes), or a combination thereof.

26. The method of claim 23, wherein the plurality of human-interpretable image features are reflective of one or more cell features related to neutrophils and/or resulting tissue features of active inflammation.

* * * * *